US011664703B2

(12) United States Patent
French, Jr. et al.

(10) Patent No.: US 11,664,703 B2
(45) Date of Patent: May 30, 2023

(54) POWER AND HOME TOOLS

(71) Applicant: Black & Decker Inc., New Britain, CT (US)

(72) Inventors: Timothy W. French, Jr., Hampstead, MD (US); Tyler Knight, Ellicott City, MD (US); David Proudlock, Durham (GB); Graham Bone, Durham (GB); Jonathan Priestley, Durham (GB); Andrew Walker, Durham (GB); Shaun Lovelass, Durham (GB)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 17/872,362

(22) Filed: Jul. 25, 2022

(65) Prior Publication Data

US 2022/0360138 A1      Nov. 10, 2022

Related U.S. Application Data

(63) Continuation of application No. 15/887,209, filed on Feb. 2, 2018, now Pat. No. 11,431,224.
(Continued)

(51) Int. Cl.
*H02K 7/14* (2006.01)
*H02K 11/33* (2016.01)
(Continued)

(52) U.S. Cl.
CPC ............... *H02K 7/145* (2013.01); *A47L 9/22* (2013.01); *A47L 9/2884* (2013.01); *A47L 9/322* (2013.01);
(Continued)

(58) Field of Classification Search
CPC .......... H02K 7/145; H02K 11/33; A47L 9/22; A47L 9/2884; A47L 9/322; A47L 5/24; A47L 9/28; B25B 21/00; B25F 5/02
See application file for complete search history.

(56) References Cited

U.S. PATENT DOCUMENTS 3,757,194 A    9/1973 Weber et al.
4,209,875 A    7/1980 Pugh et al.
(Continued)

FOREIGN PATENT DOCUMENTS

DE        3004734        8/1981
DE    102006012470    10/2006
(Continued)

OTHER PUBLICATIONS

EP EESR dated, Oct. 1, 2020 in corresponding EP application 18753974.7.
(Continued)

*Primary Examiner* — Thomas Truong
(74) *Attorney, Agent, or Firm* — Stephen R. Valancius

(57) ABSTRACT

A hand-held tool that includes a housing. The housing includes a handle. A tool also includes a motor assembly, a battery assembly and a circuit board. The motor assembly includes a motor, the motor including a rotatable motor output shaft, a motor positive terminal and a motor negative terminal. The motor assembly also includes a first rigid conductive electrical connector having a first end fixed to the motor positive terminal and a second end fixed to the circuit board. The battery assembly includes a battery cell with a battery cell positive terminal and a battery cell negative terminal. The battery assembly further includes a second rigid conductive electrical connector having a first end fixed to the battery cell positive terminal and a second end fixed to the circuit board.

19 Claims, 54 Drawing Sheets

Related U.S. Application Data

(60) Provisional application No. 62/622,378, filed on Jan. 26, 2018, provisional application No. 62/609,012, filed on Dec. 21, 2017, provisional application No. 62/459,333, filed on Feb. 15, 2017.

(51) Int. Cl.
  *B25B 21/00* (2006.01)
  *B25F 5/02* (2006.01)
  *A47L 9/28* (2006.01)
  *A47L 9/32* (2006.01)
  *A47L 9/22* (2006.01)
  *A47L 5/24* (2006.01)

(52) U.S. Cl.
  CPC ............... *B25B 21/00* (2013.01); *B25F 5/02* (2013.01); *H02K 11/33* (2016.01); *A47L 5/24* (2013.01); *A47L 9/28* (2013.01)

(56) References Cited

U.S. PATENT DOCUMENTS

| | | | |
|---|---|---|---|
| 4,348,603 A | 9/1982 | Huber | |
| 4,523,115 A | 6/1985 | Cuneo | |
| 4,707,052 A | 11/1987 | Bouley | |
| 5,136,900 A | 8/1992 | Chapin | |
| 6,144,122 A | 11/2000 | Covell | |
| 6,229,280 B1 | 5/2001 | Sakoh et al. | |
| 6,683,396 B2 | 1/2004 | Ishida et al. | |
| 7,024,966 B2 | 4/2006 | Chao | |
| 7,134,364 B2 | 11/2006 | Kageler et al. | |
| D548,028 S | 8/2007 | Mooney | |
| 7,414,337 B2 | 8/2008 | Wilkinson et al. | |
| 7,497,275 B2 | 3/2009 | Brotto | |
| 7,508,171 B2 | 3/2009 | Carrier et al. | |
| 7,546,785 B2 | 6/2009 | Roehm et al. | |
| 7,818,864 B2 | 10/2010 | Wilkinson et al. | |
| 7,863,857 B2 | 1/2011 | Becker et al. | |
| 8,044,640 B2 | 10/2011 | Cruise et al. | |
| 8,089,247 B2 | 1/2012 | Pellenc | |
| 8,148,941 B2 | 4/2012 | Fiebig et al. | |
| 8,319,475 B2 | 11/2012 | Choksi et al. | |
| 8,384,353 B2 | 2/2013 | Miyazaki et al. | |
| 8,549,704 B2 | 10/2013 | Milligan et al. | |
| 8,619,430 B2 | 12/2013 | Kynast et al. | |
| 8,698,457 B2 | 4/2014 | Hogari et al. | |
| 8,896,240 B2 | 11/2014 | Dai et al. | |
| 8,922,164 B2 | 12/2014 | Fiebig et al. | |
| 9,281,770 B2 | 3/2016 | Wood et al. | |
| 2006/0092674 A1 | 5/2006 | Belton et al. | |
| 2006/0202571 A1 | 9/2006 | Wilkinson | |
| 2009/0260179 A1 | 10/2009 | Walker | |
| 2011/0253406 A1 | 10/2011 | Glauning | |
| 2012/0274244 A1 | 11/2012 | Funabashi et al. | |
| 2012/0293103 A1* | 11/2012 | Forster | H01R 12/718 318/503 |
| 2013/0335013 A1 | 12/2013 | Suzuki et al. | |
| 2014/0014385 A1 | 1/2014 | Kosugi et al. | |
| 2014/0295257 A1 | 10/2014 | Harada | |
| 2015/0357684 A1 | 12/2015 | Willgert et al. | |
| 2016/0241065 A1 | 8/2016 | Kondo et al. | |
| 2018/0054076 A1 | 2/2018 | Wagner | |

FOREIGN PATENT DOCUMENTS

| | | |
|---|---|---|
| DE | 102014111214 | 2/2016 |
| DE | 102015100391 | 7/2016 |
| EP | 0935943 | 8/1999 |
| EP | 1225828 | 7/2002 |
| EP | 1703619 A1 | 9/2006 |
| EP | 2233992 | 2/2010 |
| EP | 2234464 | 3/2010 |
| EP | 2859601 | 4/2015 |
| EP | 2929986 A2 | 10/2015 |
| EP | 2961038 | 12/2015 |
| EP | 3059783 A1 | 8/2016 |
| JP | 01298918 | 1/1989 |
| WO | WO2013117901 | 8/2013 |

OTHER PUBLICATIONS

Notification of Transmittal of the International Search Report and Written Opinion of the International Searching Authority dated Mar. 30, 2018, and dated Apr. 19, 2018, for PCT Application PCT/US18/17049.
Picture of prior art Black + Decker hand-held vacuum cleaner HNV115B.
Picture of prior art Black + Decker screwdriver BDCS40B1.
Picture of prior art Black + Decker charger block.

* cited by examiner

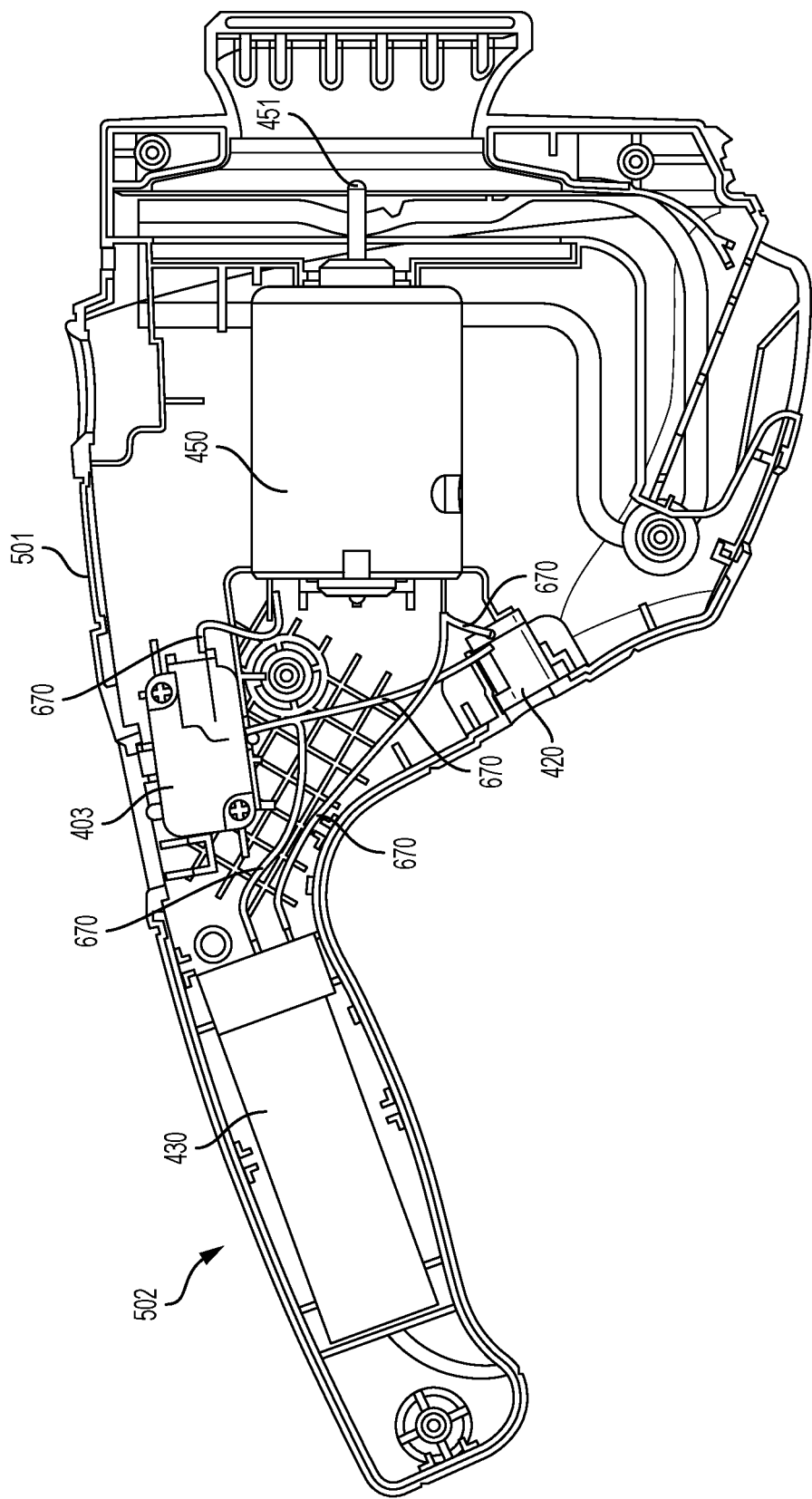

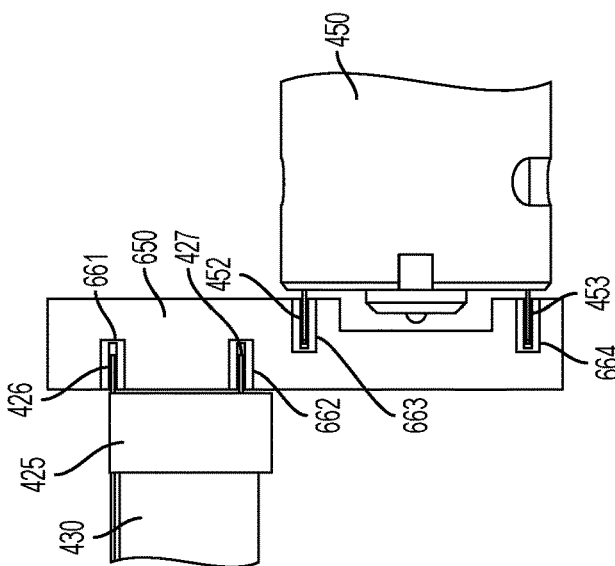
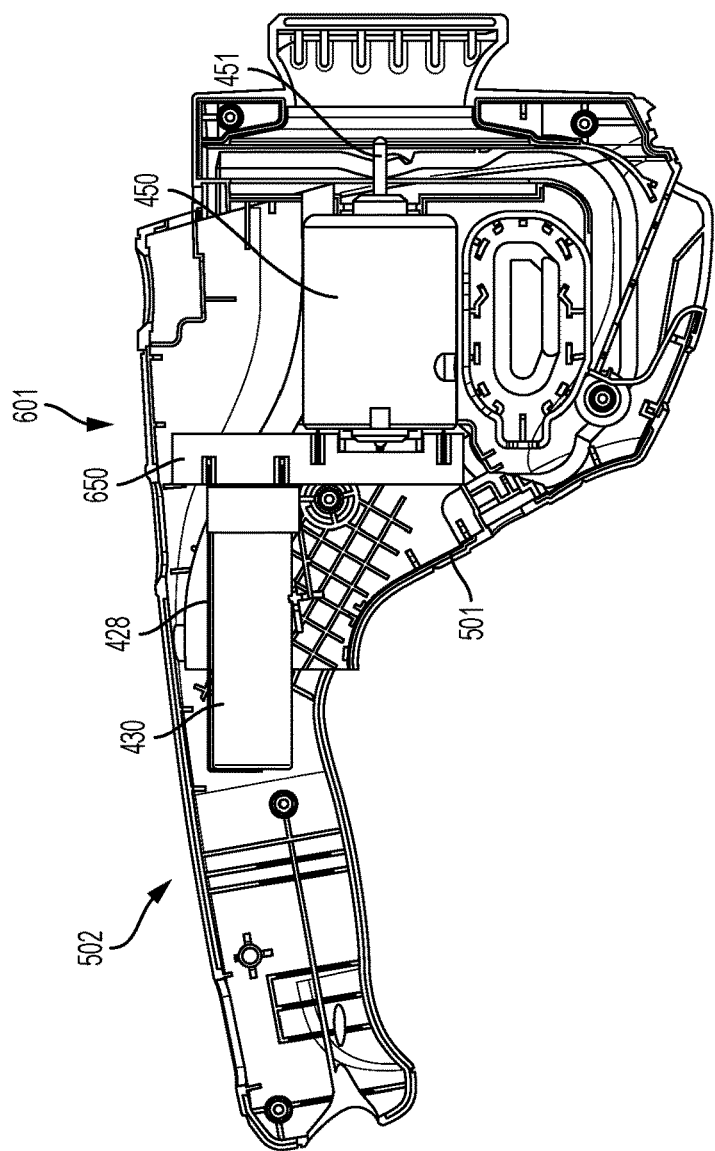
FIG. 9
FIG. 8

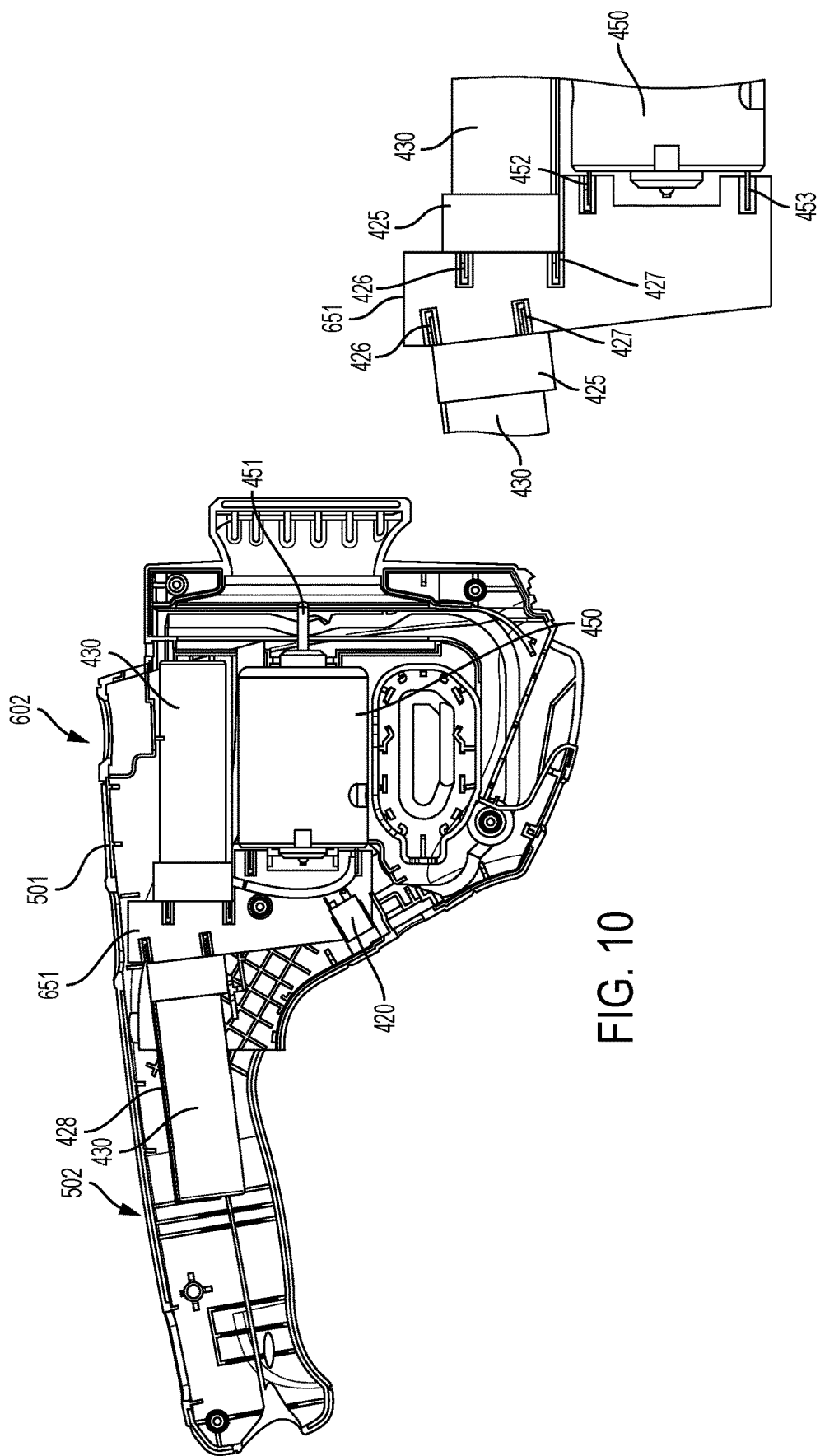

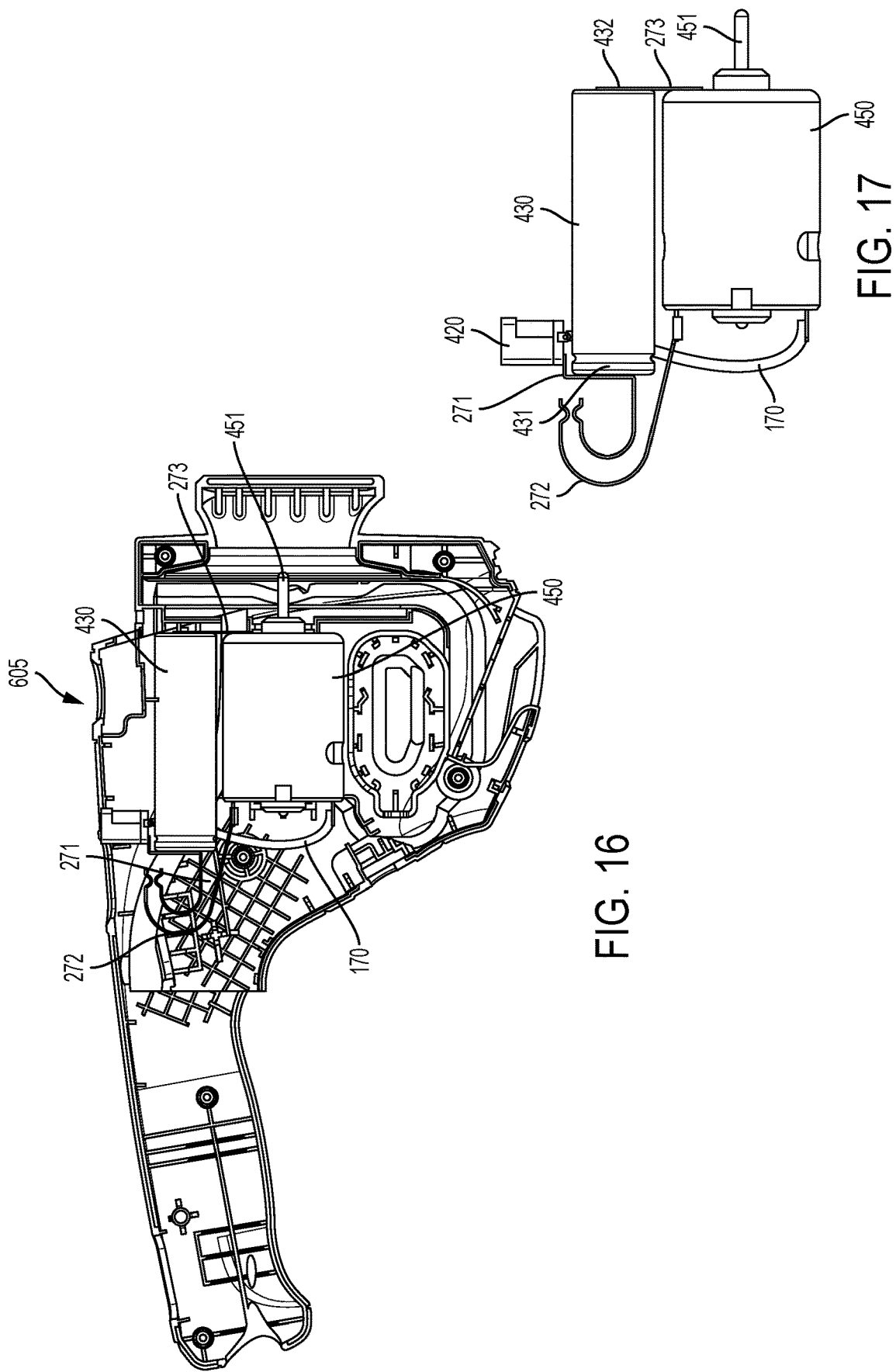

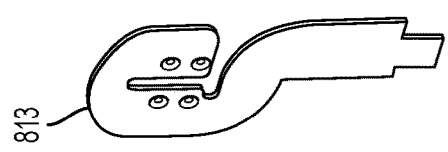
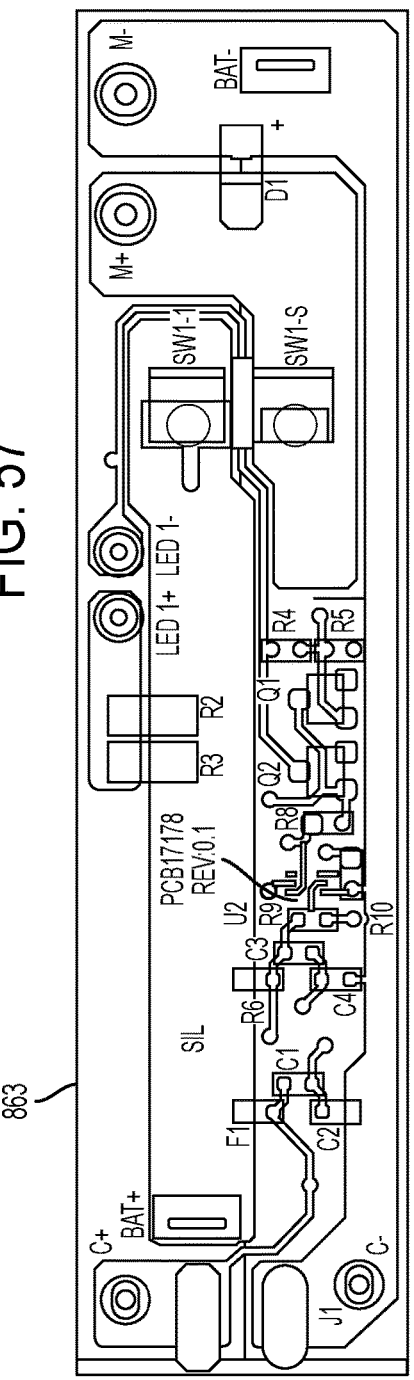
FIG. 59
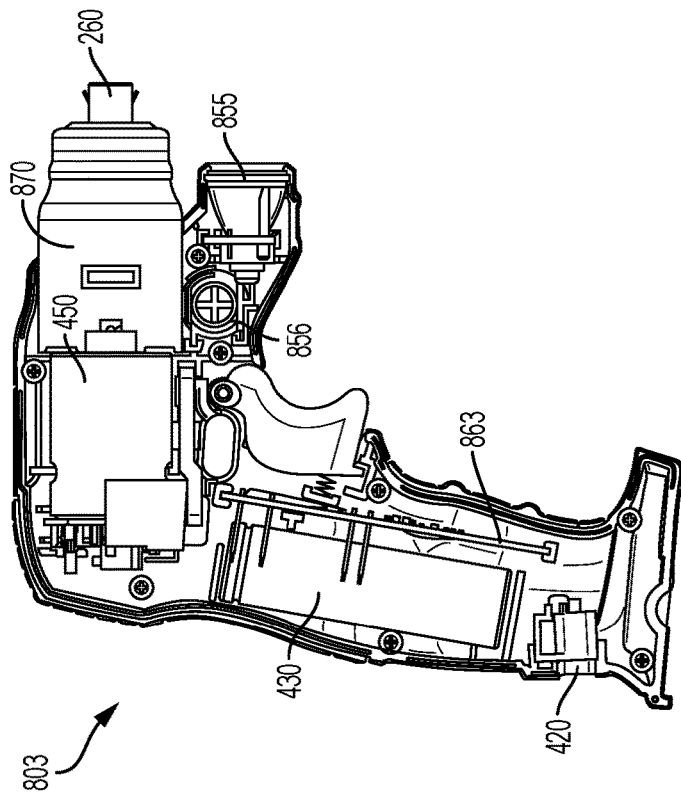
FIG. 57
FIG. 58

POWER AND HOME TOOLS

CROSS-REFERENCE TO RELATED APPLICATION

This application is a continuation application of U.S. patent application Ser. No. 15/887,209 filed on Feb. 2, 2018, which claims the benefit of U.S. Provisional Application No. 62/622,378 filed on Jan. 26, 2018, entitled Power and Home Tools; and U.S. Provisional Application No. 62/609,012 filed on Dec. 21, 2017; and U.S. Provisional Application No. 62/459,333 filed on Feb. 15, 2017. The entire contents of all are incorporated herein by reference.

FIELD OF THE INVENTION

The present invention relates to simplified design of tools. The tools may include a home tool, such as a cordless vacuum, or a power tool, such as a screwdriver. The simplified design may lend itself to automated manufacturing.

BACKGROUND

There are various existing tools. It is desired to provide tools with a simplified design which may provide a simplified assembly.

SUMMARY

According to an aspect of an exemplary embodiment, there is a screwdriver and charger system. The screwdriver and charger system includes a charger and a screwdriver. The charger includes at least one cell monitor which monitors a voltage of a battery and configured to provide a charging current to the battery. The screwdriver includes a housing, the battery housed in the housing, a motor housed in the housing and a rotatable spindle driven by the motor and configured to hold and drive a bit.

The least one cell monitor may include two cell monitors.

The charger may further include an independent charge shut-off.

The charger may include a circuit board.

The at least one cell monitor may be mounted on the circuit board.

The independent charge shut-off may be mounted on the circuit board.

The screwdriver may not include any printed circuit boards.

The screwdriver may not include any cell monitors.

The screwdriver may not include an independent charge shut-off.

The screwdriver may include a user-actuatable switch.

The switch may include a stamped metal connector.

Actuating the switch may connect the stamped metal connector on the switch to stamped metal connectors in the screwdriver housing to complete a circuit and provide power from the battery to the motor.

According to another aspect, there is an exemplary embodiment of a screwdriver. The screwdriver includes a housing, a battery housed in the housing, a motor housed in the housing and a rotatable spindle driven by the motor and configured to hold and drive a bit. An electrical connection between the battery and the motor for powering the motor by the battery is provided through a circuit board.

The screwdriver may further include a light and power from the battery to the light for powering the light is provided through the circuit board.

The screwdriver may further include a light and power from the battery to the light for powering the light is provided through a second circuit board.

The battery may be soldered to the circuit board.

The motor may be soldered to the circuit board.

The battery may be connected to the circuit board by tulip clips.

The motor may be connected to the circuit board by tulip clips.

The battery may be connected to the circuit board in an insertion method.

The motor may be connected to the circuit board by an insertion method.

The screwdriver may have a housing and the battery may be placed in the housing and the circuit board slid into connection with the battery while the battery is in the housing.

The screwdriver may have a housing and the motor may be placed in the housing and the circuit board slid into connection with the battery while the motor is in the housing.

The screwdriver may have a housing and the battery and motor may be placed in the housing and the circuit board slid into connection with the battery and motor while the battery and motor are in the housing.

The screwdriver may have a housing and the battery may be connected to the circuit board and then the battery and circuit board together are inserted into the housing.

The screwdriver may have a housing and the motor may be connected to the circuit board and then the motor and circuit board together are inserted into the housing.

The screwdriver may have a housing and the battery and motor may be connected to the circuit board and then the battery, motor and circuit board together are inserted into the housing.

The connection between the battery and the motor may be made without wires.

The connection between the battery and the motor may be made by enameled wires.

The connection between the battery and the motor may be made by uninsulated wires.

According to another aspect, there is an exemplary embodiment of a hand-held vacuum cleaner. The hand-held vacuum cleaner includes a housing and a motor, a fan driven by the motor and a battery which powers the motor housed in the housing. The fan creates suction for drawing dirt into a canister.

The housing may not contain a circuit board.

The battery may be electrically connected to the motor via enameled wires.

The battery may be electrically connected to the motor via uninsulated wires.

The housing may house two or more batteries which are connected to and power the motor.

The battery may be connected to the motor via a circuit board.

The hand vac may include a switch for activating the motor.

The switch may include two stamped metal connectors which connect to form a circuit and provide power from the battery to the motor.

The switch may include a stamped metal connector disposed between the positive terminal of the battery pack and a positive terminal of the motor, the stamped metal connector may be movable between a position where it provides an electrical path between the positive terminal of the battery pack and a positive terminal of the motor and a position where it does not provide an electrical path between the positive terminal of the battery pack and a positive terminal of the motor.

According to another aspect, there is an exemplary embodiment of a hand vac and charger system. The hand vac and charger system includes a charger and a hand vac. The charger includes at least one cell monitor which monitors a voltage of a battery and configured to provide a charging current to the battery. The hand vac includes a housing, the battery housed in the housing, a motor housed in the housing and a rotatable spindle driven by the motor and configured to hold and drive a bit.

According to another aspect, there is an exemplary embodiment of a hand held portable power tool with an integral battery and charger system. The power tool and charger system includes a charger and a power tool. The charger includes at least one cell monitor which monitors a voltage of a battery and configured to provide a charging current to the battery. The power tool includes a housing, the battery housed in the housing, a motor housed in the housing and an output driven by the motor.

The integral battery may include one battery cell.

The integral battery may include two battery cells.

The integral battery may be a lithium-ion battery.

The integral battery may have a nominal voltage of approximately 3.6 to 4 volts.

The integral battery may have a nominal voltage of approximately 7.2 to 8 volts.

The integral battery may have a nominal voltage of 9 volts or less.

The integral battery may have a nominal voltage of 8 volts or less.

The least one cell monitor may include two cell monitors.

The charger may further include an independent charge shut-off.

The charger may include a circuit board.

The at least one cell monitor may be mounted on the circuit board.

The independent charge shut-off may be mounted on the circuit board.

The power tool may not include any printed circuit boards.

The power tool may not include any cell monitors.

The power tool may not include an independent charge shut-off.

The power tool may include a user-actuatable switch.

The switch may include a stamped metal connector.

Actuating the switch may connect the stamped metal connector on the switch to stamped metal connectors in the screwdriver housing to complete a circuit and provide power from the battery to the motor.

According to another aspect, there is an exemplary embodiment a hand held portable power tool with an integral battery. The power tool includes a housing, a battery housed in the housing, a motor housed in the housing and a rotatable spindle driven by the motor and configured to hold and drive a bit. An electrical connection between the battery and the motor for powering the motor by the battery is provided through a circuit board.

The battery may have a nominal voltage of 9 volts or less and may include one or more battery cells.

The battery may be soldered to the circuit board.

The motor may be soldered to the circuit board.

The battery may be connected to the circuit board by tulip clips.

The motor may be connected to the circuit board by tulip clips.

The battery may be connected to the circuit board in an insertion method.

The motor may be connected to the circuit board by an insertion method.

The power tool may have a housing and the battery may be placed in the housing and the circuit board slid into connection with the battery while the battery is in the housing.

The power tool may have a housing and the motor may be placed in the housing and the circuit board slid into connection with the battery while the motor is in the housing.

The power tool may have a housing and the battery and motor may be placed in the housing and the circuit board slid into connection with the battery and motor while the battery and motor are in the housing.

The power tool may have a housing and the battery may be connected to the circuit board and then the battery and circuit board together are inserted into the housing.

The power tool may have a housing and the motor may be connected to the circuit board and then the motor and circuit board together are inserted into the housing.

The power tool may have a housing and the battery and motor may be connected to the circuit board and then the battery, motor and circuit board together are inserted into the housing.

The connection between the battery and the motor may be made without wires.

The connection between the battery and the motor may be made by enameled wires.

The connection between the battery and the motor may be made by uninsulated wires.

According to another aspect, there is an exemplary embodiment of a hand-held drill or screwdriver. The drill or screwdriver includes a housing; a motor assembly held in the housing; a battery assembly held in the housing; and a circuit board adjacent to the battery assembly and the motor assembly. The motor and the battery assembly are electrically connected to the circuit board.

The battery assembly may include a battery and an electrical connecter.

The electrical connector may extend from a terminal of the battery to the circuit board.

The electrical connector may be soldered to the circuit board.

The motor assembly may include a motor and an electrical connector.

The electrical connector may extend from a terminal of the motor to the circuit board.

The electrical connector may be soldered to the circuit board.

There may be two electrical connectors extending from that battery to the circuit board, one connected to a positive terminal of the battery and one connected to the negative terminal of the battery. Each electrical connector may be electrically connected to the circuit board by, for example, soldering. There may be multiple batteries connected to the circuit board in this manner.

There may be two electrical connectors extending from the motor to the circuit board, one connected to a positive terminal of the motor and one connected to the negative terminal of the motor. Each electrical connector may be electrically connected to the circuit board by, for example, soldering.

The screwdriver or drill may have a chuck. The drill or screwdriver may have a transmission. The drill or screwdriver may have an output spindle. The drill or screwdriver may have a bit holder, such as a hexagonal bit holder.

The circuit board may dispose at an angle with respect to the battery.

The angle may be more than 5 degrees.

The angle may be more than 10 degrees.

The angle may be more than 20 degrees.

The angle may be more than 25 degrees.

The circuit board may be disposed at an angle with respect to the motor.

The angle may be more than 5 degrees.

The angle may be more than 10 degrees.

The angle may be more than 20 degrees.

The angle may be more than 25 degrees.

The circuit board may be generally flat and lie in a plane.

The motor may have a longitudinal axis.

The battery may have a longitudinal axis.

The longitudinal axis of the motor may be parallel to the longitudinal axis of the battery.

The plane may be disposed at an angle with respect to the longitudinal axis of the battery and the longitudinal axis of the motor.

The angle may be greater than 5 degrees.

The angle may be greater than 10 degrees.

The angle may be greater than 15 degrees.

The angle may be greater than 20 degrees.

The angle may be greater than 25 degrees.

The hand-held powered tool may be a vacuum cleaner. The vacuum cleaner may include a fan. The vacuum cleaner may include a canister.

According to another aspect, there is a hand-held powered tool, including a housing; a motor assembly held in the housing; a battery assembly held in the housing; and a circuit board adjacent to the battery assembly and the motor assembly. The motor and the battery assembly are electrically connected to the circuit board.

The battery assembly may include a battery and an electrical connecter.

The electrical connector may extend from a terminal of the battery to the circuit board.

The electrical connector may be soldered to the circuit board.

The motor assembly may include a motor and an electrical connector.

The electrical connector may extend from a terminal of the motor to the circuit board.

The electrical connector may be soldered to the circuit board.

The circuit board may be disposed at an angle with respect to the battery.

The angle may be more than 5 degrees.

The angle may be more than 10 degrees.

The angle may be more than 20 degrees.

The angle may be more than 25 degrees.

The circuit board may be disposed at an angle with respect to the motor.

The angle may be more than 5 degrees.

The angle may be more than 10 degrees.

The angle may be more than 20 degrees.

The angle may be more than 25 degrees.

The circuit board may be generally flat and lie in a plane.

The motor may have a longitudinal axis.

The battery may have a longitudinal axis.

The longitudinal axis of the motor may be parallel to the longitudinal axis of the battery.

The plane may be disposed at an angle with respect to the longitudinal axis of the battery and the longitudinal axis of the motor.

The angle may be greater than 5 degrees.

The angle may be greater than 10 degrees.

The angle may be greater than 15 degrees.

The angle may be greater than 20 degrees.

The angle may be greater than 25 degrees.

BRIEF DESCRIPTION OF THE DRAWINGS

FIG. 7 is another partial side view of an exemplary embodiment of a cordless hand held vacuum cleaner with one housing side removed;

FIG. 8 is another partial side view of an exemplary embodiment of a cordless hand held vacuum cleaner with one housing side removed;

FIG. 9 is close-up view of a portion of the cordless hand held vacuum cleaner of FIG. 8;

FIG. 10 is another partial side view of an exemplary embodiment of a cordless hand held vacuum cleaner with one housing side removed;

FIG. 11 is close-up view of a portion of the cordless hand held vacuum cleaner of FIG. 10;

FIG. 16 is another partial side view of an exemplary embodiment of a cordless hand held vacuum cleaner with one housing side removed;

FIG. 17 is close-up view of a portion of the cordless hand held vacuum cleaner of FIG. 16;

FIG. 57 is a side view of another exemplary embodiment of a screwdriver with housing parts removed;

FIG. 58 is a top view of a circuit board;

FIG. 59 is a perspective view of a connector;

DETAILED DESCRIPTION OF EXEMPLARY EMBODIMENTS

It may be desirable to provide simplified manufacture of powered tools or home products. Simplified manufacturing may result in improvements in costs, manufacturing and reliability.

Figure 1:
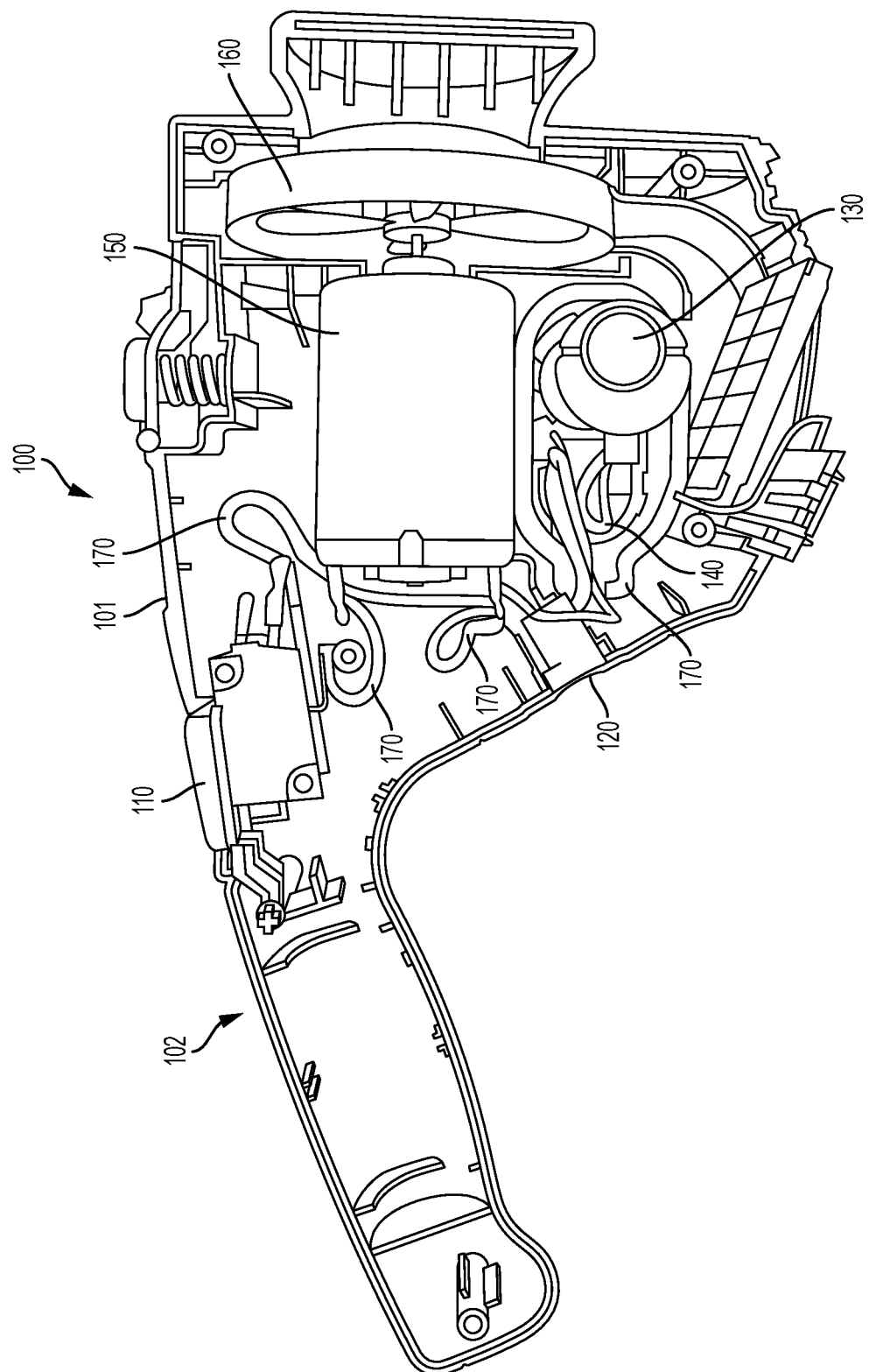
FIG. 1 is a partial side view of a cordless hand held vacuum cleaner of the related art with one housing side removed.

FIG. 1 illustrates a partial view of a related art hand held vacuum cleaner ("hand vac") 100 with one housing side removed. The hand vac 100 has a housing 101 with a handle section 102. The hand vac 100 further includes a motor 150 which drives a fan 160. The fan 160 creates suction for drawing dirt, dust and debris into a canister (not shown), as is well known in the art. The motor 150 is powered by a battery 130 and the battery 130 is mounted on a PCB 140. The battery 130 may be a lithium-ion battery. The hand vac 100 also includes a switch 110 for activating the motor 150 and a socket 120 through which the battery 130 can be charged. As is shown and will be appreciated, there are a number of wires 170 which connect the various components. For example, wires 170 are used to connect the switch 110, motor 150 and battery 130 so that when a user actuates the switch 110, the battery 130 provides power to the motor 150. Wires 170 are also used to connect the socket 120 to the battery 130 so that the battery 130 can be charged.

The wires 170 of FIG. 1 may contact one another. Accordingly, the related art of FIG. 1 includes wires 170 which are insulated with a thermoplastic so that they can contact one another without causing a short circuit or other malfunction. Thermoplastic wires 170 are generally installed by hand, are stripped to expose their ends and also soldered at the appropriate points. Thus, manufacture of the related art hand vac 100 of FIG. 1 may require various steps related to the wires.

The basic operation and construction of a hand-held vacuum cleaner is known, and is shown in, for example, U.S. Pat. Nos. 4,209,875 and 8,549,704 and US Patent Application Publication No. 2009/0260179; each of which are herein incorporated by reference in their entirety.

Figure 3:
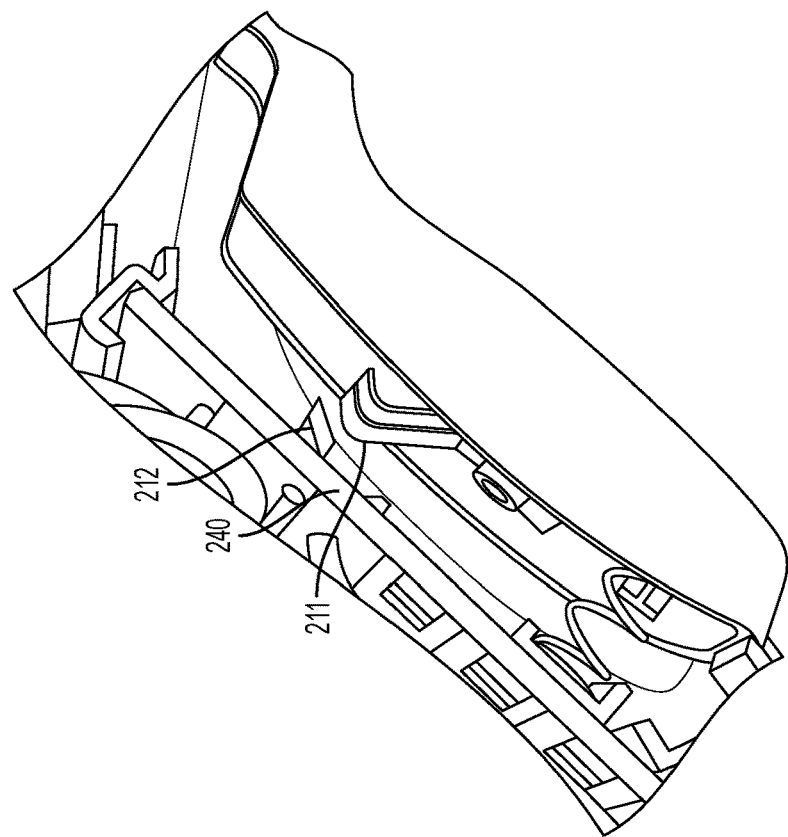
FIG. 3 is a close-up partial side view of a cordless hand held screwdriver of the related art with one housing side removed.
Figure 2:
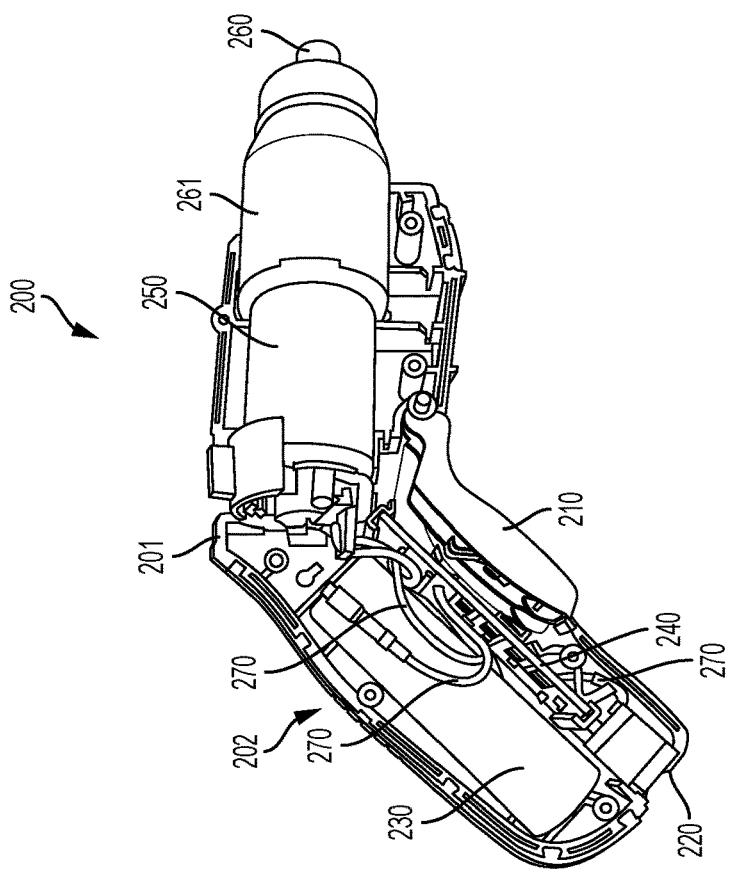
FIG. 2 is a partial side view of a cordless hand held screwdriver of the related art with one housing side removed.

A power tool 200 in the form of a related art screwdriver is shown in FIGS. 2 and 3. FIG. 2 illustrates the screwdriver 200 with one housing side removed and FIG. 3 illustrates the same in the close-up area of a switch. The screwdriver 200 includes a motor 250 which drives an output spindle 260. The output spindle 260 holds a screwdriver bit for performing a screwdriving operation. A transmission 261 may be disposed between the motor 250 and the output spindle 260.

As shown, the screwdriver 200 includes a housing 201 with a handle section 202. A battery 230 is disposed in the handle section 202 and is adjacent a printed circuit board ("PCB") 240. The battery 230 may be a lithium-ion battery. The screwdriver 200 has a socket for providing a charge to the battery 230 and there is a switch 210 so that a user can operate the screwdriver 200. Wires 270 connect the various parts such as providing a connection from the battery 230 to the motor 250 so that the motor 250 can be powered. Similarly, wires 270 are provided from the socket 220 to the circuit board 240. In this case, contacts 211 on the switch 210 engage contacts 212 on the circuit board 240 to complete a circuit and engage the motor 250.

Wires 270 are insulated with a thermoplastic, and are of the same type as wires 170 described above with respect to hand vac 100.

The basic operation of a screwdriver is well known and one example is shown in U.S. Pat. No. 7,134,364, which is hereby incorporated by reference in its entirety.

Figure 4A:
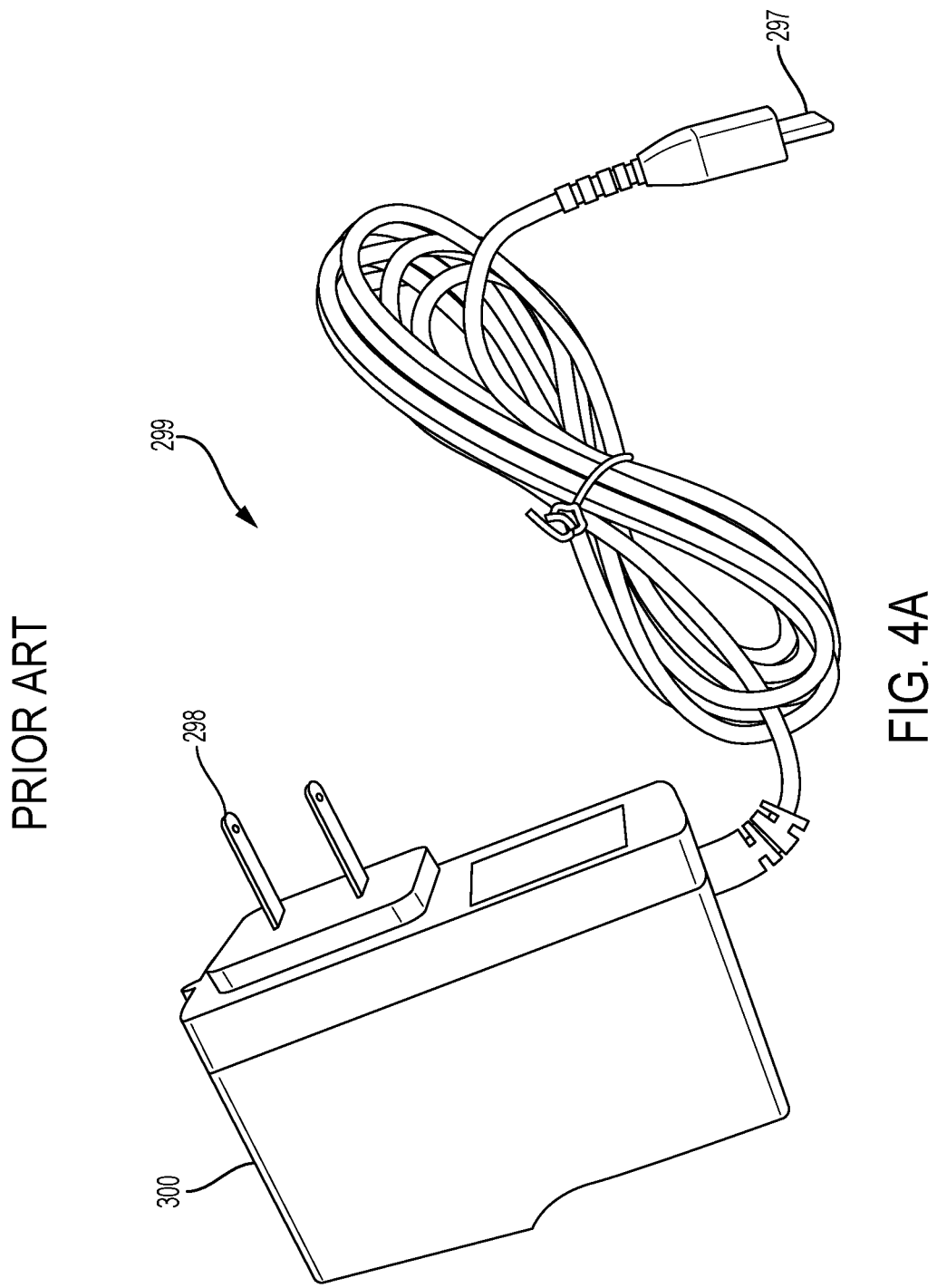
FIG. 4A illustrates a charger.

FIG. 4A illustrates a charger 299 with a charging block 300. As will be appreciated, the charger 299 can be plugged into an electrical outlet at one end 298 and plugs into socket 120 or 220 at the other end 297 to charge the respective tools 100/200.

Figure 4B:
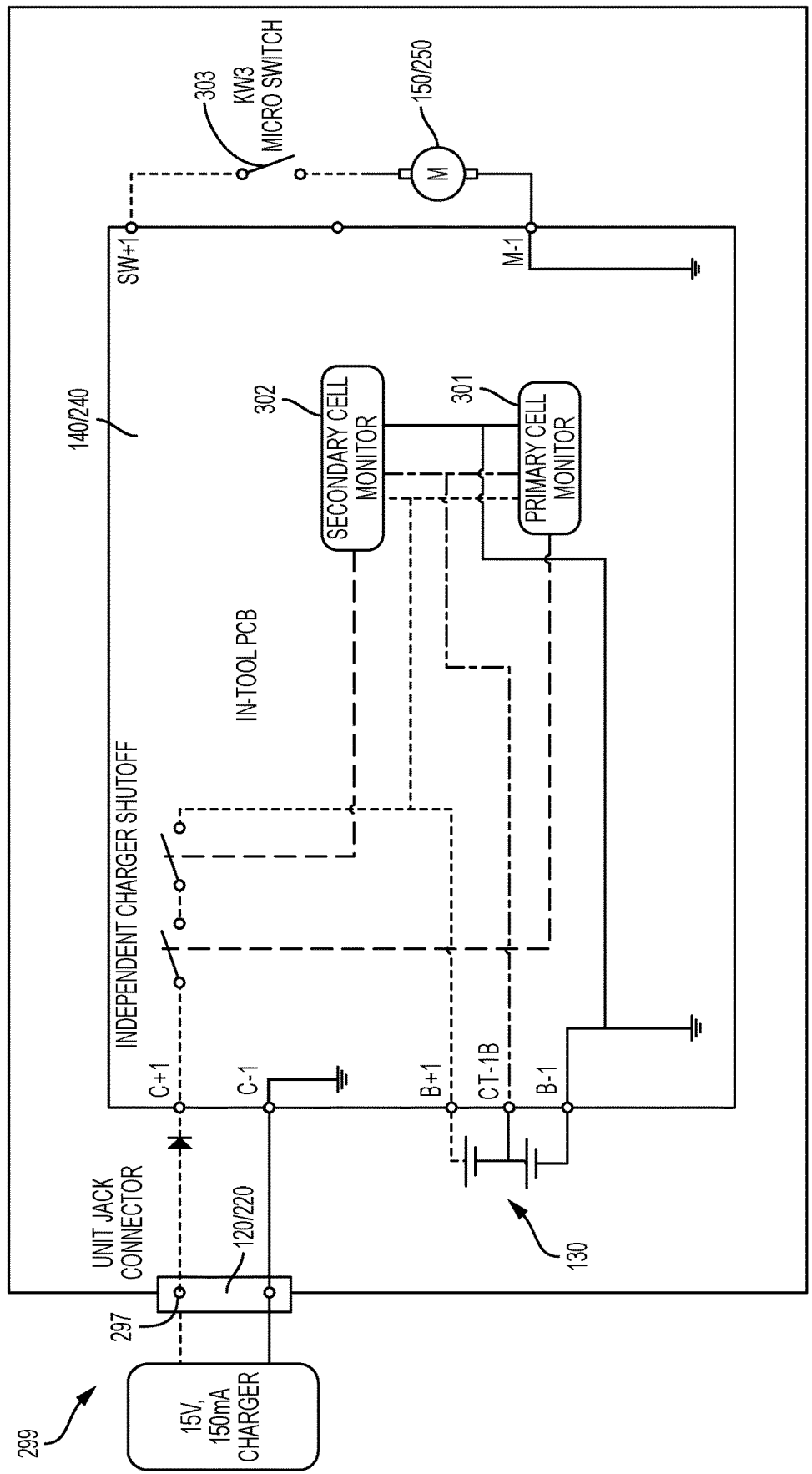
FIG. 4B schematically illustrates a charger and a hand-held vacuum cleaner or screwdriver which the charger may charge.

FIG. 4B schematically illustrates the charger 299 and the in tool circuit boards 140/240. As shown, the charger 299 provides a charge through socket 120/220. The charger 299 provides a constant current supply of, for example, 150 mA. It does not include any overcharge protection. The circuit boards 140/240 each include a primary cell monitor 301 and a secondary cell monitor 302. The primary cell monitor 301 monitors the voltage and prevents an overvoltage in the batteries 130 or 230. The secondary cell monitor 302 also monitors the voltage and prevents overvoltage in the batteries 130, 230 in the event of a malfunction of the primary cell monitor 301. An independent charger shut-off 303 for shutting off charge to prevent an overvoltage when indicated by the primary or secondary cell monitors 301/302 is provided on the in-tool circuit board 140/240.

Figure 5A:
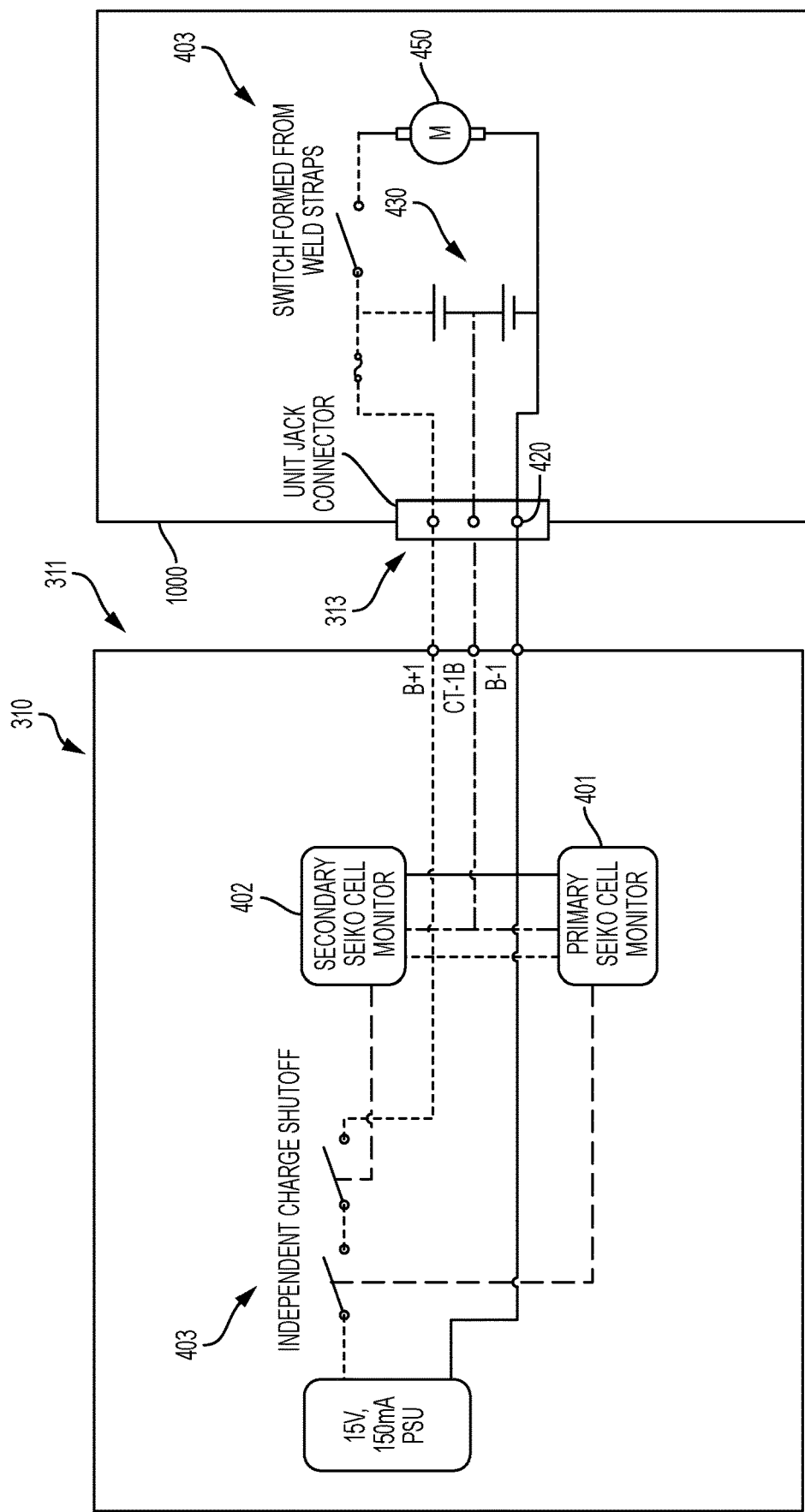
FIG. 5A schematically illustrates a charger and a hand-held vacuum cleaner or screwdriver which the charger may charge according to an exemplary embodiment of the present application.
Figure 5B:
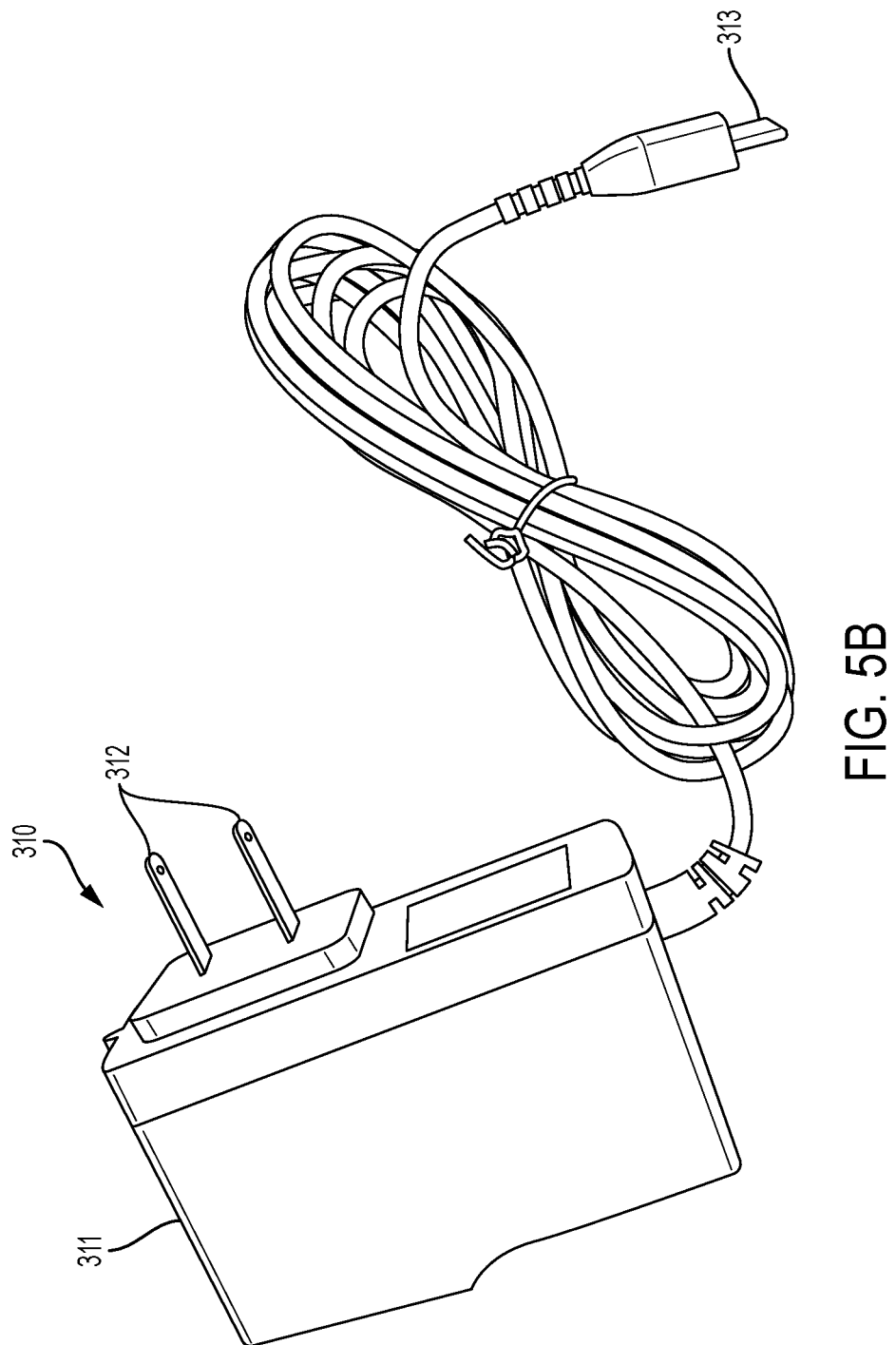
FIG. 5B illustrates the exemplary embodiment of the charger shown schematically in FIG. 5A.

Exemplary embodiments of the present application include various structures for a simplified design. FIG. 5A illustrates a schematic of a charger and a tool and FIG. 5B shows a charger 310. The charger 310 is visually similar to the charger 299 and has the same outside structural features. In particular, the charger 310 has a charging block 311 with prongs for fitting into a wall outlet. It also has a far end 313 which fits into a socket 120/220 of a tool 1000 (hand vac or screwdriver). Accordingly, it plugs into a wall outlet one end and a socket of a power tool or home product on the other end and provides a constant current supply of 150 mA. However, unlike the charger 299, the charger 310 also includes a primary cell monitor 401, secondary cell monitor 402 and an independent charge shutoff 403. In the embodiment of FIG. 4B, these features are in the tool. The primary cell monitor 401, secondary cell monitor 402 and independent charge shutoff 403 work in the same manner as the elements 301, 302 and 303. That is, the primary cell monitor 401 monitors the voltage of one or more batteries 430 so that an overvoltage can be prevented. The secondary cell monitor 402 similarly monitors the voltage of the one or more batteries 430 so that an overvoltage can be prevented. The battery 430 may be a lithium-ion battery. The independent charge shutoff 403 can shut off a charge in the event an overvoltage is detected. In FIG. 5A, the primary cell monitor 401, secondary cell monitor 402 and the independent charge shutoff 403 are now located in the charger, particularly on a circuit board contained in the charging block 311 portion of the charger 310. Accordingly, these features are not necessary in the tool.

Hand vac or power tool 1000 is shown schematically in FIG. 5A and the schematics there are applicable to the various hand vacs and power tools described later in the application. As shown in FIG. 5A, the hand vac or power tool 1000 no longer requires cell monitors or an independent charge shutoff. Accordingly, it may simply have a socket 420 and a motor 450. Since the vac or tool 1000 does not include cell monitoring, a circuit board is no longer necessary. However, as discussed below, some embodiments may include a circuit board. This configuration allows a variety of different constructions for hand vacs and power tools. The schematic for the hand vac or power tool 1000 is applicable to the specific hand vacs and power tools shown and discussed below.

Figure 6:
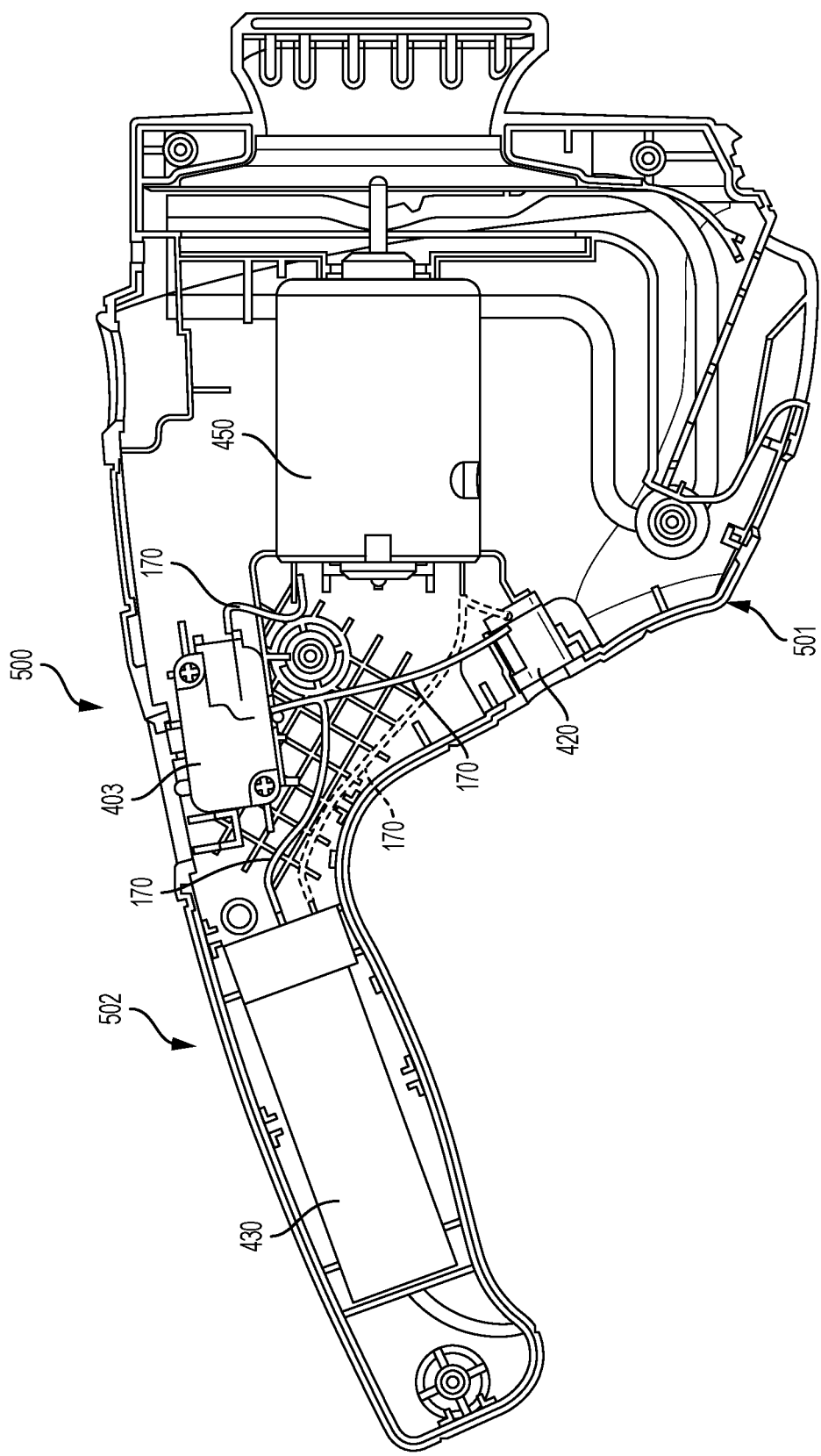
FIG. 6 is a partial side view of an exemplary embodiment of a cordless hand held vacuum cleaner with one housing side removed.

FIG. 6 illustrates a partial view of an exemplary embodiment of a hand-held vacuum cleaner ("hand vac") 500 with one housing side removed which can be used in conjunction with the charger 310 and tool 1000 configuration shown in FIG. 5A. That is, the hand vac 500 may have the general operation of the schematically described hand vac 1000 in FIG. 5. Additionally, the hand vac 500 may be used with the charging block 310 described above with reference to FIGS. 5A and 5B.

The hand vac 500 has a housing 501 with a handle section 502. The hand vac 500 further includes a motor 450 which drives a fan (not shown). The fan (not shown) creates suction for drawing dirt, dust and debris into a canister (not shown), as is well known in the art. The motor 450 is powered by a battery 430. The battery 430 may be a lithium-ion battery or another battery type which requires voltage monitoring and control. The hand vac 500 also includes a switch 403 for activating the motor 450 and a socket 420 through which the battery 430 can be charged. The same reference numerals will be used below for the same components.

As shown in FIG. 6, since the primary cell monitor 401, secondary cell monitor 402 and independent charge shut-off 403 are included in the charging block 310, it is not required to include them in the hand vac 500. In the exemplary embodiment of the hand vac 500 in FIG. 6, no circuit board at all is necessary. As shown in FIG. 6, wires 170 are used to connect the battery 430, switch 403, socket 420 and motor 450. In this case, the battery 430 can be disposed in the handle section 502. As can be seen, the wiring of this exemplary embodiment is simplified. This can both reduce the cost of manufacturing the hand vac 500.

FIG. 7 illustrates another exemplary embodiment of a hand vac 600. Hand vac 600 is essentially the same as hand vac 500, except that it uses different wires. Hand vac 500 uses traditionally insulated wires 170. Hand vac 600 utilizes wires 670 which may be enameled or uninsulated. Enameled wire (also known as magnet wire) is a solid copper conductor which is covered with a thin layer of insulation. The insulation may be made of a tough polymer film. Enameled wire lends itself to automatic feeding. Accordingly, the wiring of FIG. 7 more easily lends itself to machine wiring. The simplified construction of the vac 600 allows for wires 670 to be used instead of the thermoplastic insulated wires 170 as the wiring is simpler and less prone to inadvertent contact. The wires 670 may be used to connect the socket 420 and the battery 430, the switch 403 and the motor 450 in a way that allows the power to be transferred through the socket 420 to the battery 430 in order to charge the battery 430. The wires 670 also allow the battery 430 to power the motor 450, per control of the switch 403.

As noted, the wires 670 may even be uninsulated wires in some embodiments. Uninsulated wires can simply be a solid copper wire. Use of an uninsulated wire is particularly simple as no insulating layer needs to be removed to make electrical connections.

FIGS. 8 and 9 illustrate another exemplary embodiment of a hand vac 601. The hand vac 601 illustrates another simplified construction. In this instance, the connection between the motor 450 and the battery 430 is provided by a circuit board 650. As shown, the motor 450 and the battery 430 are each soldered onto the circuit board 650 and no wires are necessary for the connection. In the hand vac 601, the entire assembly of the battery 430, motor 450 and circuit board 650 can be placed into the housing 501 in one operation. That is, the battery 430 and the motor 450 can each be soldered to the circuit board 650. Then, the resulting assembly can all be inserted into the housing 501 together. This can reduce the number of steps needed for assembly. Additionally, it lends itself to machine assembly.

As shown in FIG. 9, the battery cell 430 may have a battery cap 425 with a positive electrode 426 and a negative electrode 427 so that the positive and negative terminals from the battery cell 430 are provided at a similar location. The battery cell 430 includes a positive end and a negative end. A cell strap 428 may be provided from one end of the battery cell 430 to the battery cap 425 and the battery cap 425 may be located at the other end. That provides the battery cap 425 with access to both the positive and negative terminals of the battery and allows it to provide the positive and negative electrodes 426, 427. The positive and negative electrodes 426, 427 may be stamped metal connectors and, as such, may have rigidity. Additionally, they may mate with locations 661 and 662 on the circuit board 650. The locations 661 may be designed to receive electrodes. They may include slots.

The motor 450 includes a positive terminal 452 and a negative terminal 453. The positive terminal 452 is connected to the circuit board at location 663 and the negative terminal 453 is connected to the circuit board at location 664. The positive and negative terminals 452 and 453 may be stamped metal and have rigidity. The locations 663, 664 may be designed to receive terminals and may include slots.

As will be appreciated, power is provided from the battery 430 to the motor 450 through the circuit board 650. The circuit board 650 may include conductive traces to provide the connection.

The order of operations for assembly may be different in different embodiments. For example, the battery 430, motor 450 and circuit board 650 can all be inserted into the housing 501 and then they can be soldered together. It is also possible that some sub-assemblies can be inserted and soldered together at different times. For example, the battery 430 can be soldered to the circuit board 650 and it can be inserted into the housing 501. Then, the motor 450 can be inserted into the housing 501 and soldered to the circuit board 650.

Various components, such as the socket 420 are not shown in FIG. 8. The hand vac 601 operates similarly to previously and subsequently described vacs.

FIGS. 10 and 11 illustrate another exemplary embodiment of a hand vac 602. The hand vac 602 is similar to the hand vac 601, but includes two batteries 430 and a circuit board 651 designed to connect to both batteries 430. In this exemplary embodiment, the two batteries 430, the motor 450 and the socket 420 all are soldered directly onto a circuit board 651. This provides another easy to manufacture hand vac design. As with the embodiment of FIGS. 8 and 9, the two batteries 430 and the motor 450 can all be soldered to the circuit board 651 and the entire assembly can be inserted into the housing 501 together. Also, the order can be changed, as described above. Power from both of the batteries 430 can be provided to the motor 450 through the circuit board 651. As discussed previously, this may be done by having conductive traces on the circuit board 651.

Figure 13:
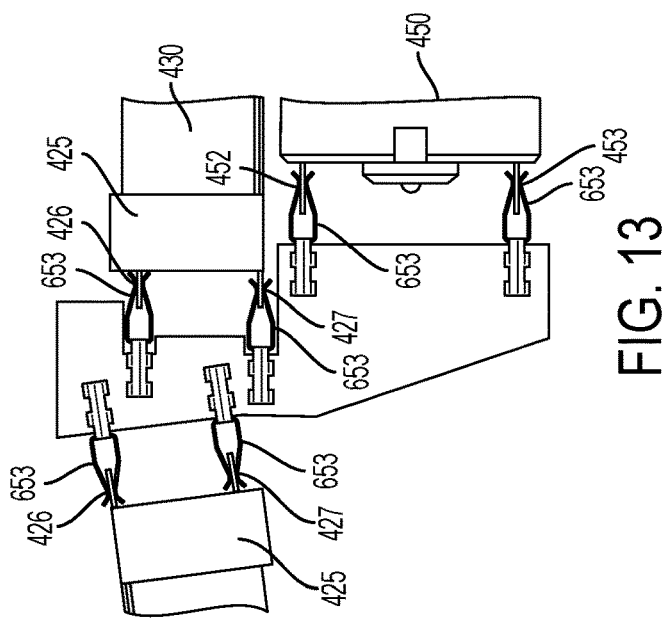
FIG. 13 is close-up view of a portion of the cordless hand held vacuum cleaner of FIG. 12.
Figure 12:
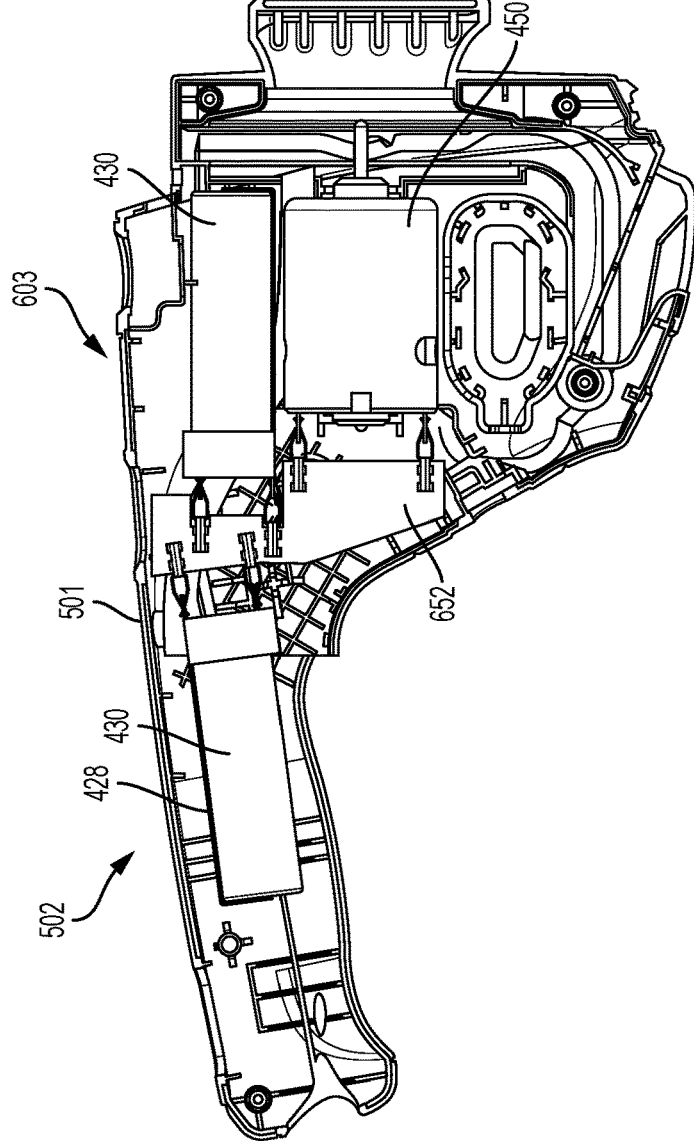
FIG. 12 is another partial side view of an exemplary embodiment of a cordless hand held vacuum cleaner with one housing side removed.

FIGS. 12 and 13 illustrate another exemplary embodiment of a hand vac 603. The exemplary embodiment of a hand vac 603 shown in FIGS. 12 and 13 is similar to hand vac 602. However, the motor 450 and batteries 430 are connected to circuit board 652 by tulip connectors 653. Thus, the motor 450 and batteries 430 may be connected by sliding contacts into the tulip connectors 653 rather than soldering. For example, the circuit board 652 may be positioned in the housing 501. Ribs or other placement features in the housing 501 may hold the circuit board 652 in the appropriate location. Then, the batteries 430 may be slid into place in the housing 501 and the motor 450 may be slid into place in the housing 501. Ribs or other placement features of the housing 501 may serve as a type of placement device or jig to assist with assembly. Although not shown, the circuit board 652 could also connect to a socket 420 via tulip connectors 653.

In other embodiments, tulip connectors 653 and soldering could both be used. For example, the motor may be connected to a circuit board by tulip connectors and a battery may be connected by soldering.

Figure 15:
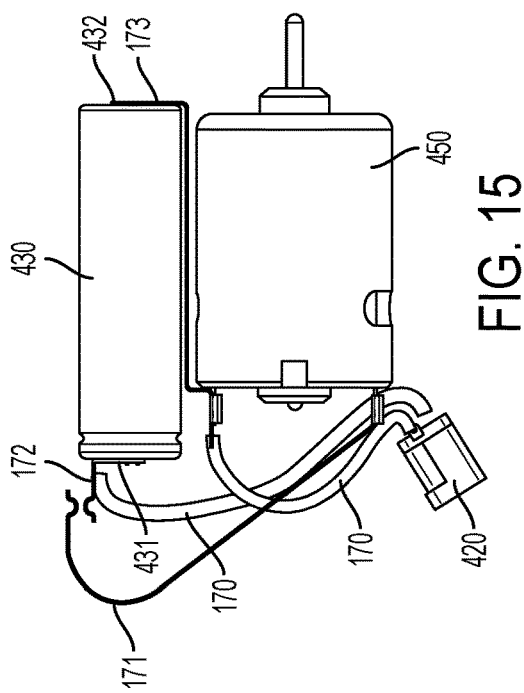
FIG. 15 is close-up view of a portion of the cordless hand held vacuum cleaner of FIG. 14.
Figure 14:
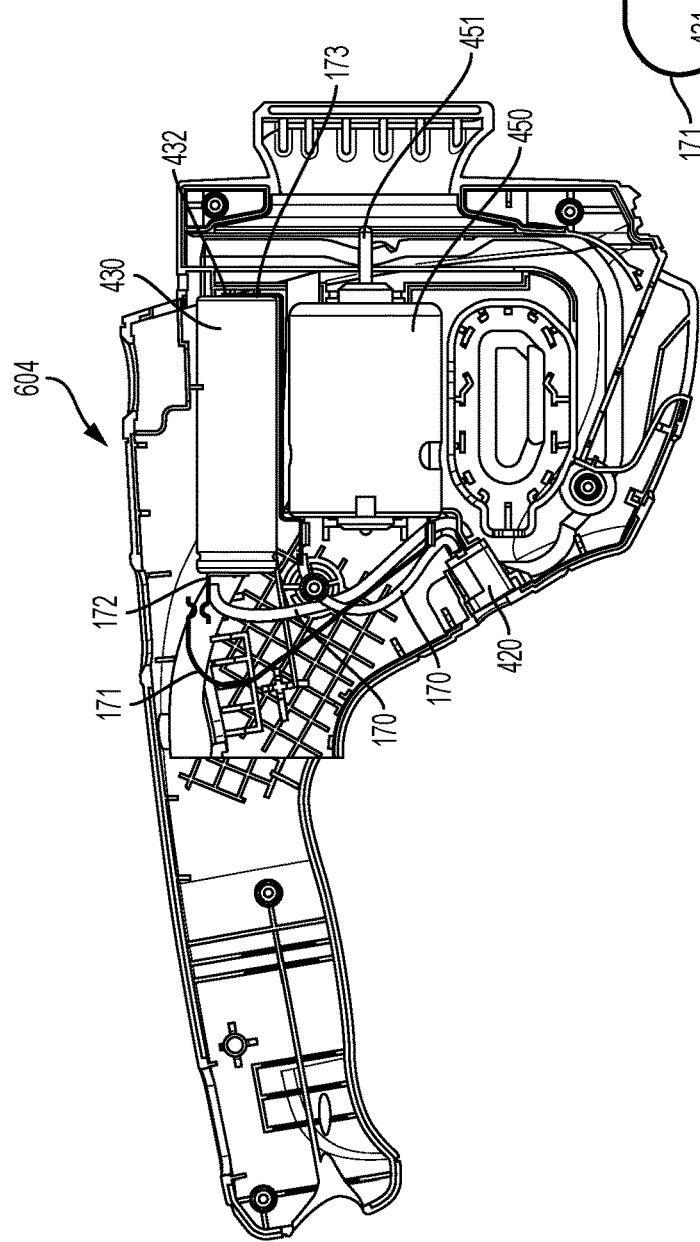
FIG. 14 is another partial side view of an exemplary embodiment of a cordless hand held vacuum cleaner with one housing side removed.
Figure 18:
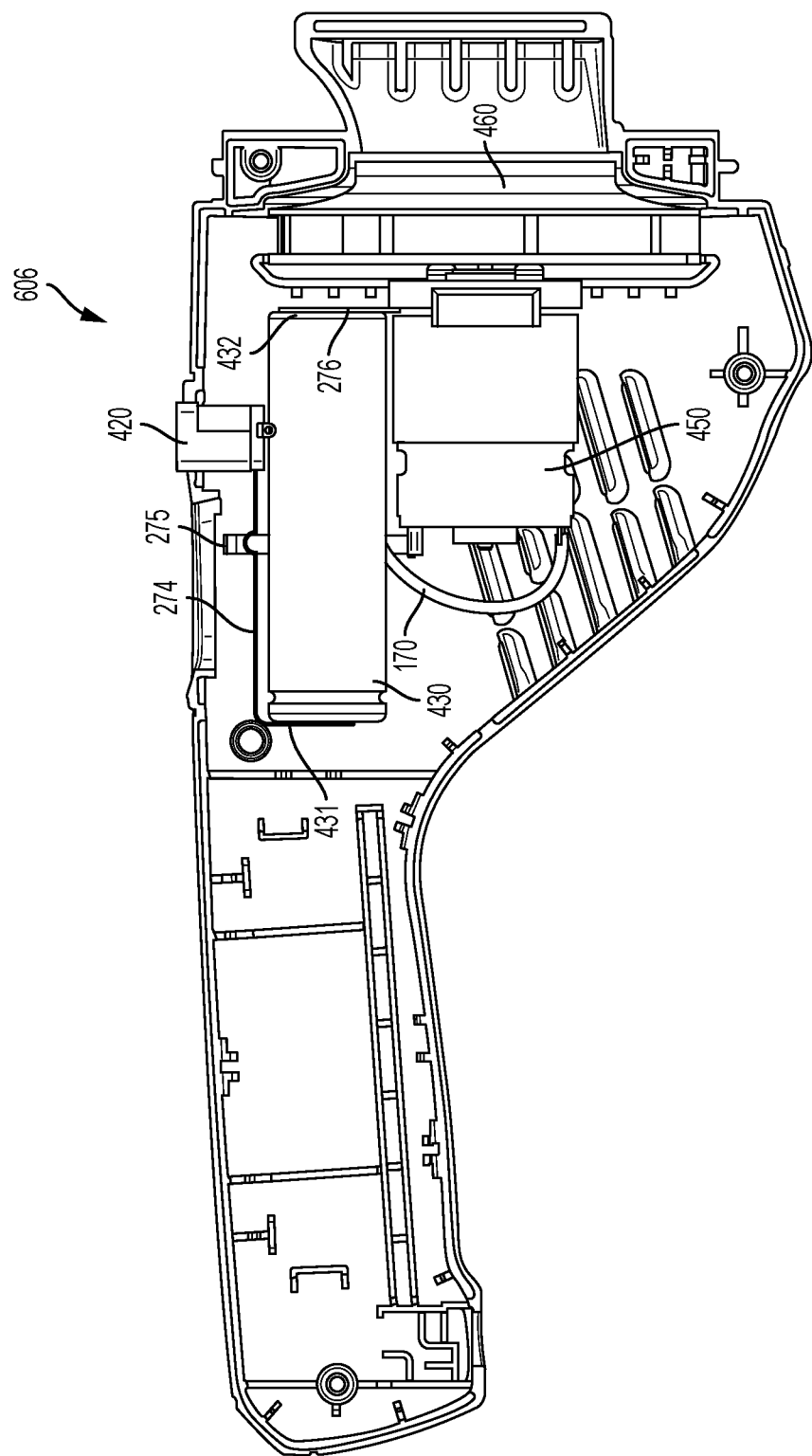
FIG. 18 is another partial side view of an exemplary embodiment of a cordless hand held vacuum cleaner with one housing side removed.
Figure 20:
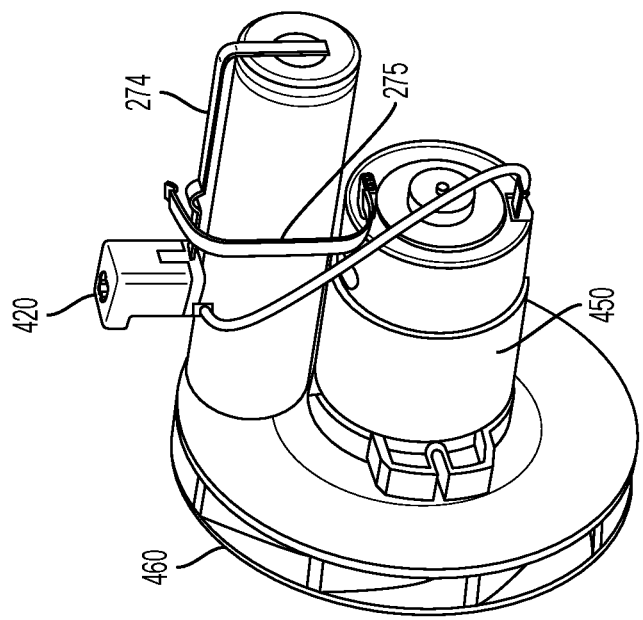
FIG. 20 is close-up view of a portion of the cordless hand held vacuum cleaner of FIG. 18.
Figure 19:
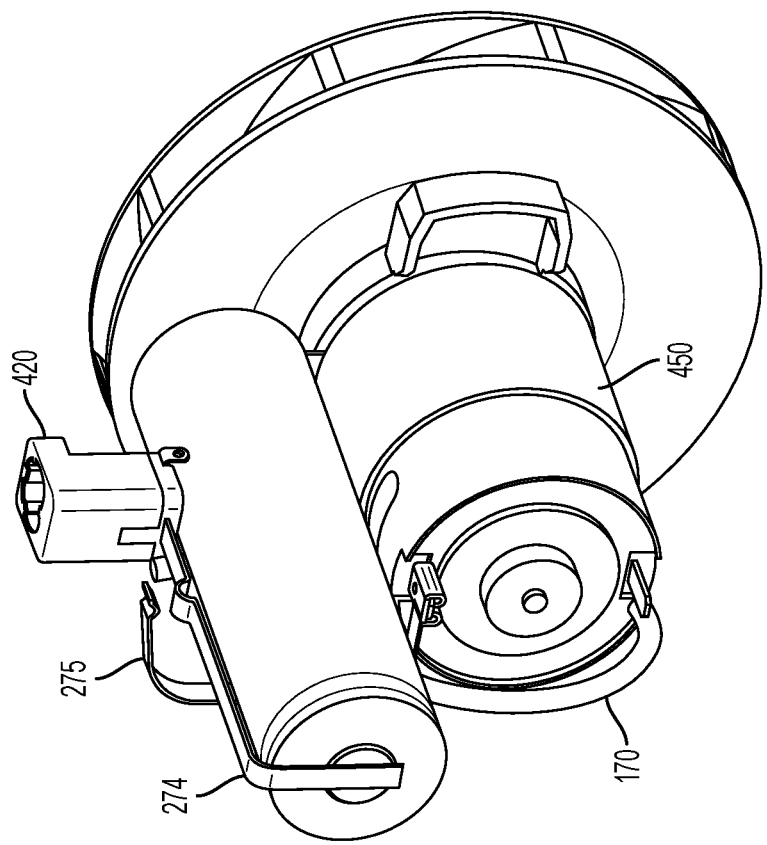
FIG. 19 is close-up view of a portion of the cordless hand held vacuum cleaner of FIG. 18.
Figure 22:
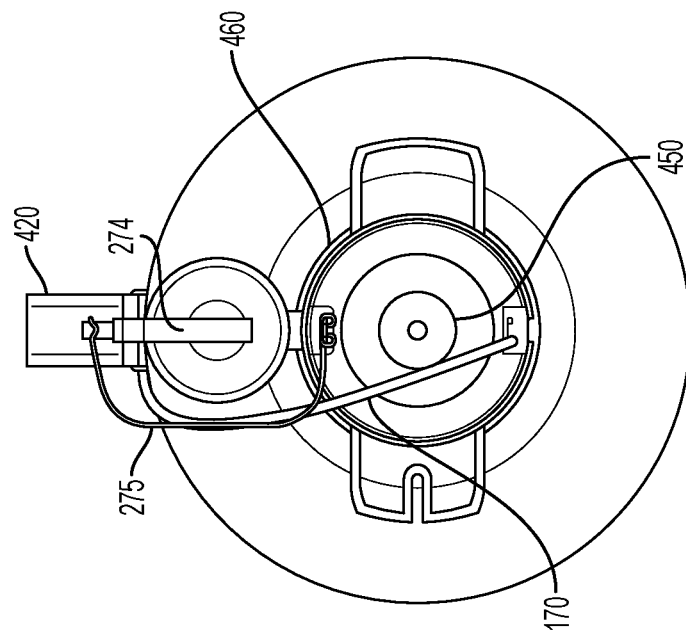
FIG. 22 is close-up view of a portion of the cordless hand held vacuum cleaner of FIG. 18.
Figure 21:
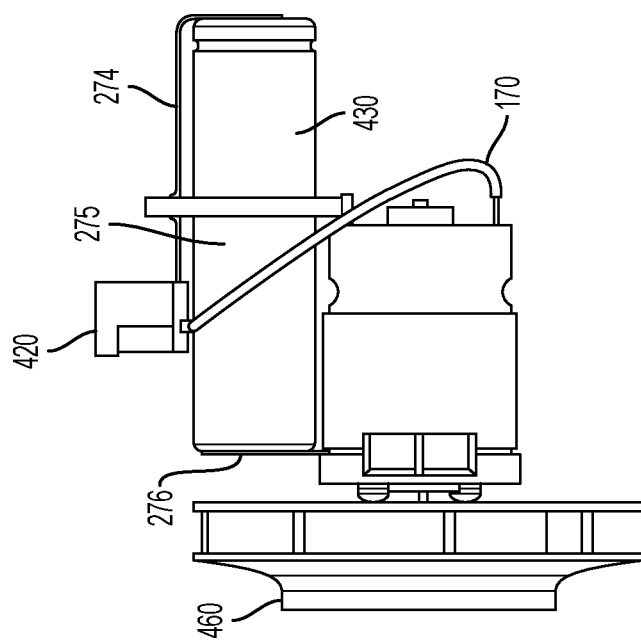
FIG. 21 is close-up view of a portion of the cordless hand held vacuum cleaner of FIG. 18.

FIGS. 14 and 15 illustrate another exemplary embodiment of a hand vac 604. This embodiment includes two wires as well as several stamped metal connectors. In particular, one wire 170 is connected between socket 420 and a first, positive end of the battery 430. A second wire 170 is connected between the socket 420 and an end of the motor 450. As noted, there are also three stamped metal connectors 171, 172 and 173. The stamped connector 173 connects a negative end of the battery 430 to a negative terminal of the motor 450. Stamped connector 171 selectively connects a positive terminal of the motor to a positive end of the battery 430. Stamped connector 172 is affixed to a positive terminal of the battery and cooperates with stamped connector 171 to turn on and off the hand vac 604.

In usage, when the charging block 310 is plugged into the hand vac 604 at the socket 420, a charging current is provided to the battery 430 to charge the battery. The socket 420 is connected to the negative end of the battery 430 through a first wire 170 and stamped connector 173. The socket 420 is connected to the positive end of the battery through a second wire 170 and stamped connector 172. The second wire 170 may be connected to the stamped connector 172 and provide an electrical path through the connector 172 or the second wire 170 may be directly attached to the positive end of the battery 430. The motor 450 is connected to a negative end of the battery 430 by connector 173.

The motor 450, and thus the hand vac 604, is off when the connectors 171 and 172 are spaced, as is shown in FIG. 15. In order to activate the motor 450 (and thus the hand vac 406), a user may use a switch (not shown) which will move the connector 171 so that it contacts connector 172 and completes the circuit. Specifically, when the connector 171 and 172 are in contact, the positive end of the battery 430 is connected to a positive terminal of the motor 450. This turns on the motor 450 so as to operate the hand vac 604.

FIGS. 16 and 17 illustrate another exemplary embodiment of a hand vac 605. This embodiment includes a single wire 170 and several stamped metal electrical connectors 271, 272 and 273. As shown, the wire 170 provides a connection between the socket 420 and a negative terminal of the motor 450. A stamped metal electrical connector 271 is provided between the socket 420 and a positive end 431 of the battery 430. The stamped connector 271 also serves as one part of the activation switch. A second stamped connector 272 is connected to a positive terminal of the motor 450 and serves as the other part of the activation switch mechanism. A third stamped connector 273 connects a negative end of the battery 430 to the motor. As shown in FIGS. 16 and 17, the connector 273 connects to a far end of the motor can. The motor can itself is then used to electrically connect to the negative terminal. Thus, the connector 273 can connect to the motor 450 near the motor output shaft 451, but provide the appropriate connection to the negative terminal.

In usage, when the charging block 310 is plugged into the hand vac 605 at the socket 420, a charging current is provided to the battery 430 to charge the battery. The socket 420 is connected to a negative terminal of the motor 450 through a wire 170. The negative terminal of the motor 450 is connected to the connector 273 through the motor can, as described above. The connector 273 connects the motor can to the negative end 432 of the battery 430. The socket 420 is connected to the positive end 431 of the battery 430 directly through connector 271. Accordingly, a charge can be provided to the battery 430 through the socket to charge the battery 430.

The hand vac 605 is turned on in a similar manner as the hand vac 604, described above. Particularly, it is turned on by creating a connection between two connectors 271 and 272. When not turned on, the connectors 271 and 272 are separated (as show in FIGS. 16 and 17) and the circuit to the motor is not completed. In order to turn on the motor 450, and thus the hand vac 605, the connectors 271 and 272 are brought into contact to complete the circuit (done by user switch; not shown). In particular, the positive terminal 431 of the battery 430 is connected to the positive terminal of the motor through connectors 271 and 272. The negative terminal 432 of the battery 430 connects to the negative terminal of the motor 450 through the connector 273 and the motor can.

The user switch (not shown) may be a simple mechanical switch which depresses the connector 272 towards the connector 271. The switch may be a momentary switch, which the user needs to maintain in a depressed state to keep the power on or it may be a non-momentary switch.

FIGS. 18-22 illustrate another exemplary embodiment of a hand vac 606. As with the previous embodiments, a charging current can be provided to the battery 430 through the socket 420. The socket 420 is connected to a positive terminal 431 of the battery 430 through a stamped metal electrical connector 274. The socket 420 is connected to a negative terminal 432 of the battery 430 through a wire 170, the motor can and stamped metal electrical connector 276. Particularly, the socket 420 is connected to a negative terminal of the motor 450 through wire 170. The negative terminal 423 of the battery 430 connects to the motor can and in this way provides the connections necessary for charging the battery 430.

Similar to the previous embodiments, the motor 450 is activated by providing a connection between stamped metal electrical connectors 274 and 275. As shown, connector 275 is connected to a terminal of the motor 450. When the connector 275 is depressed so that it contacts connector 274, a circuit is completed in order to run the motor 450. As with the previous embodiments, this connection can be made by a user switch (not shown).

Figure 23:
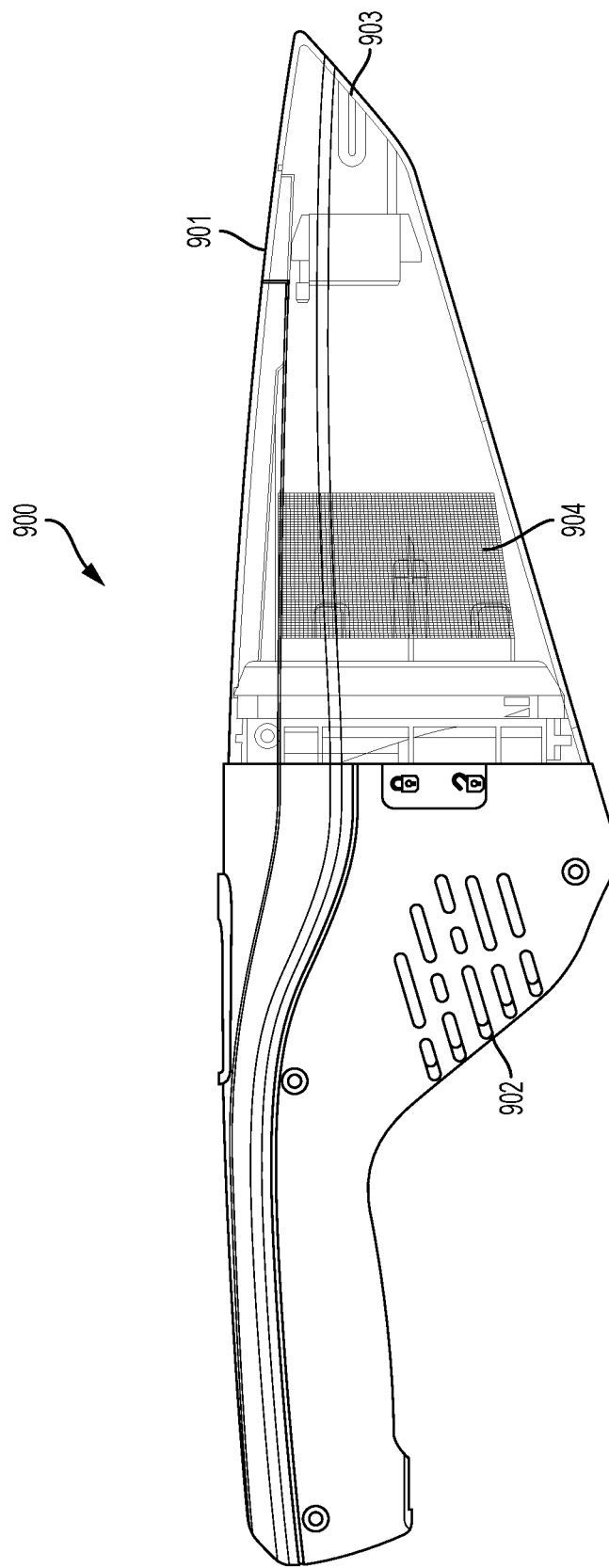
FIG. 23 is a side view of a hand held cordless vacuum cleaner which may include the internal configuration of the exemplary embodiments shown in FIGS. 6 to 22.

FIG. 23 illustrates a fully assembled hand vac. This arrangement is applicable to any of the embodiments shown in FIGS. 6-22 or later embodiments of hand vacs. As shown, the hand vac has a dust canister 901 into which dust, dirt and debris is drawn. This occurs because of the suction force provided by the motor driven fan. In particular air is pushed out of exhaust 902 and sucked in at opening 903. A user can hold the hand vac by the handle so that it is a hand-held vacuum. The hand vac 900 may also have a filter 904 in the dust canister 901 for filtering the dust from the air.

The configuration of the charging block 310 and product 1000 shown in FIG. 5 and those shown for specific vac configurations in FIGS. 6-22 may also be applied to power tools such as screwdrivers and drills and particularly to handheld power tools. Several specific exemplary embodiments for screwdrivers are shown below, but other applications of the principles of the hand vac configurations may also be applied.

Figure 24:
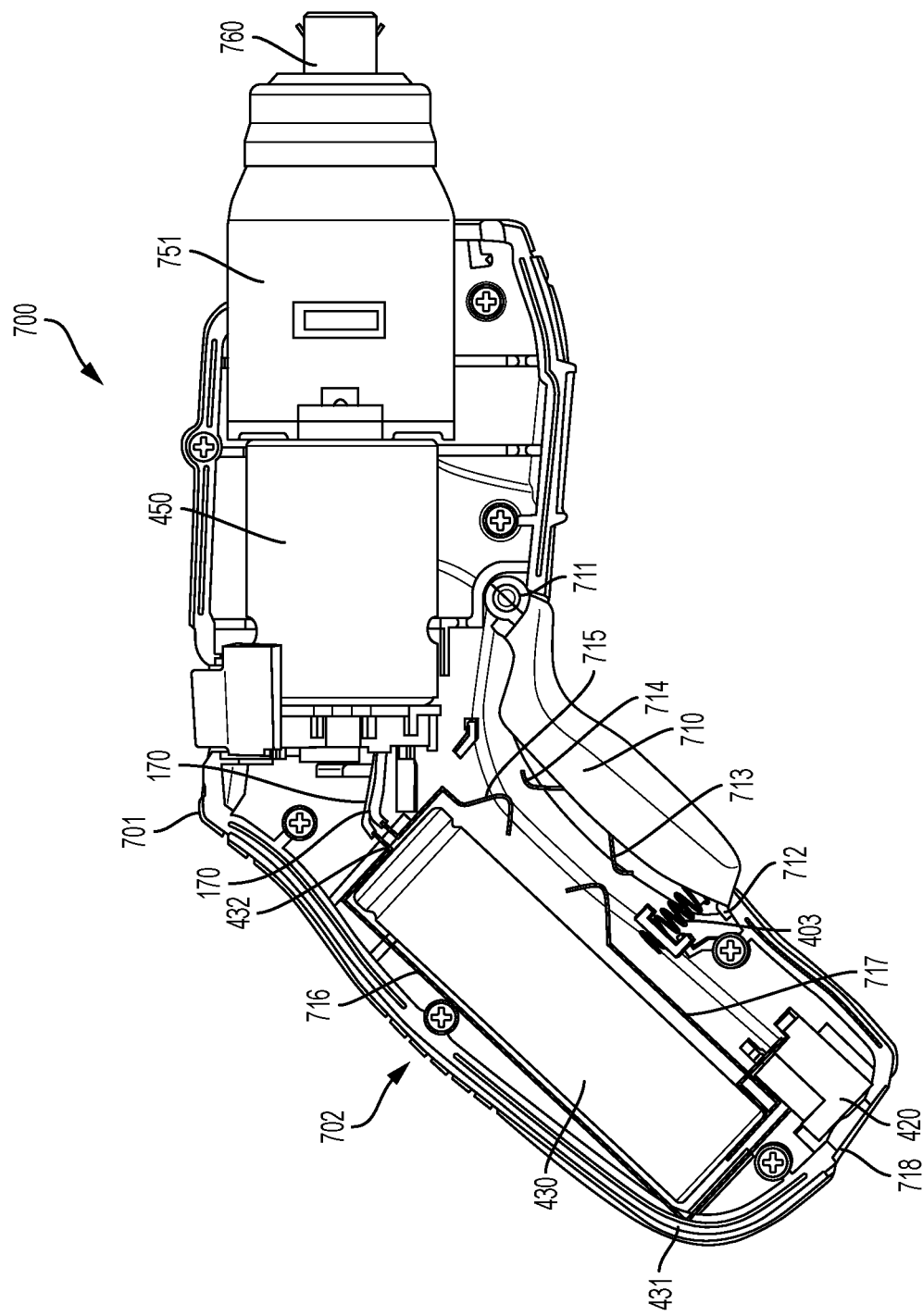
FIG. 24 is a side view of a cordless screwdriver according to an exemplary embodiment with one housing side removed.
Figure 25:
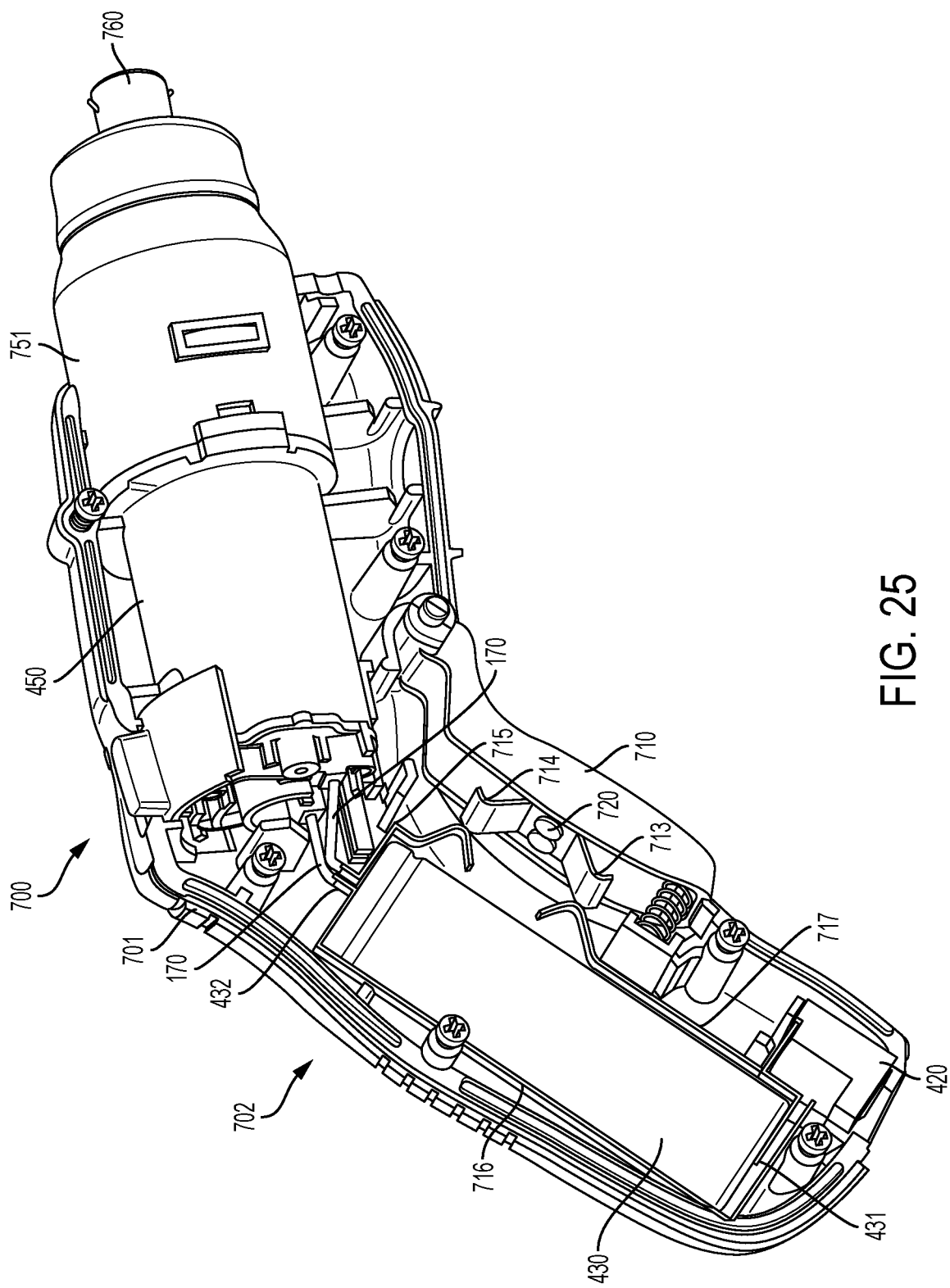
FIG. 25 is a perspective view of the cordless screwdriver of FIG. 24.
Figure 26:
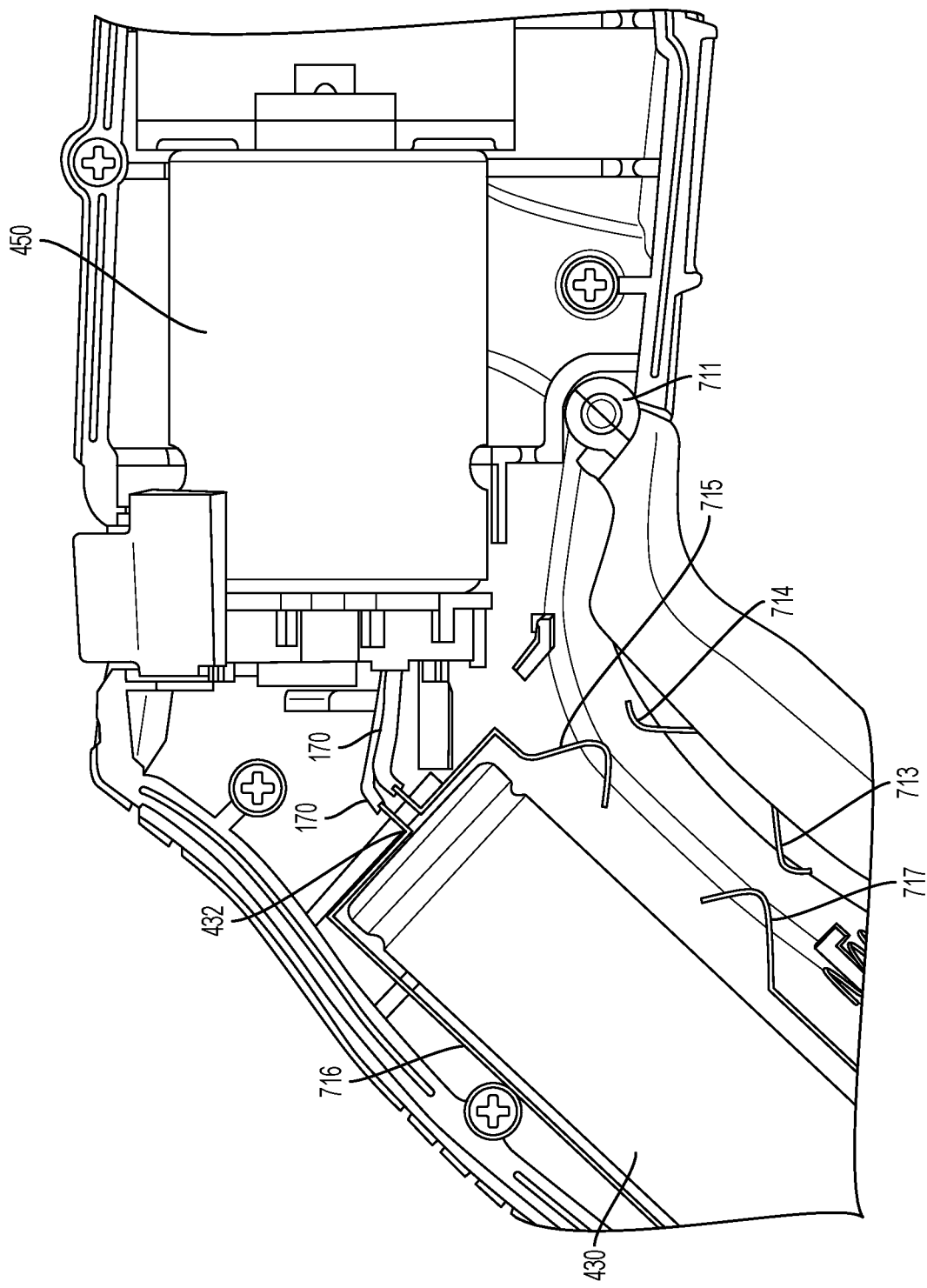
FIG. 26 is a close-up side view of the cordless screwdriver of FIG. 24.

FIGS. 24-26 illustrate an exemplary embodiment of a screwdriver 700 with a simplified construction. As shown in FIGS. 2 and 3, and discussed above, related art screwdrivers include a circuit board 240 which cooperates in the switching on and off of the screwdriver and on which charging circuitry is included. In the exemplary embodiment of FIGS. 24-26, the primary cell monitor 401, secondary cell monitor 402 and independent charge shut-off 403 are located in the charging block 310. Accordingly, the screwdriver 700 does not need to include the monitoring or shut off circuitry 401, 402, 403. As a result, the screwdriver 700 also does not require a circuit board for such circuitry.

FIG. 24 is a side view of the screwdriver 700 with one side of a housing 701 removed. FIG. 25 is a perspective view of the screwdriver 700 with one side of the housing 701 removed. FIG. 26 is a close-up side view of the screwdriver with one side of the housing 701 removed.

The exemplary embodiment of the screwdriver 700 includes a motor 450 which drives an output spindle 760. The output spindle 760 holds a screwdriver bit for performing a screwdriving operation. A transmission 751 is disposed between the motor 450 and the output spindle 760.

As shown, the screwdriver 700 includes a housing 701 with a handle section 702. A battery 430 is disposed in the handle section 702. As discussed above, the battery 430 may be a lithium-ion battery. The screwdriver 700 has a socket 420 for providing a charge to the battery 430 and there is a switch 710 so that a user can operate the screwdriver 700. The switch has a pivot 711 around which the switch 710 pivots. The end of the switch 710 opposite the pivot 711 is biased outwardly by a spring 712.

The screwdriver 700 includes a number of stamped metal electrical connectors 713/714/720, 715, 716, 717 and 718. It also includes a pair of wires 170. It will be appreciated As with the vac embodiments above, the battery 430 can be charged through the socket 420 when the charging block is connected with the socket 420 to provide a charging current. The socket 420 is connected to a positive terminal 431 of the battery 430 by connector 718 and is connected to the negative terminal 432 through connector 716. Accordingly, the battery 430 can be charged through the socket 420.

In order to turn on the motor 450 so as to use the screwdriver 700, a user depresses the switch 710. As noted above, the switch pivots about 711 against the force of spring 712. The connector 720 is disposed on the switch 710 and has ends 713 and 714. When a user depresses the switch 710, ends 713 and 714 of connector 720 contact ends of connectors 715 and 717 to complete a circuit and provide power from the battery 430 to the motor 450. When the user releases the switch 710, the ends 713 and 714 of connector 720 move away from connectors 715 and 717 and the circuit is not completed, so that the motor 450 is not provided with power from the battery 430 and the motor 450 does not operate.

Connector 716 is connected to a negative terminal of the battery and a wire 170 connects the connector 716 to a negative terminal of the motor 450. Another wire 170 is connected to a positive terminal of the motor 450. When the switch 710 is depressed, power from the positive terminal 431 travels through the connector 717, through connector 720 and through connector 715. Connector 715 is connected to the wire 170 which is connected to the positive terminal of the motor 450. In this manner, power from the battery 430 flows to the motor 450 and the screwdriver 700 is turned on. In FIGS. 24-26, the switch 710 is shown in a position where the motor is not activated.

Connection of the connector 720 with the connectors 715 and 717 make the switch that is shown schematically in FIG. 5 as switch 403.

Figure 27:
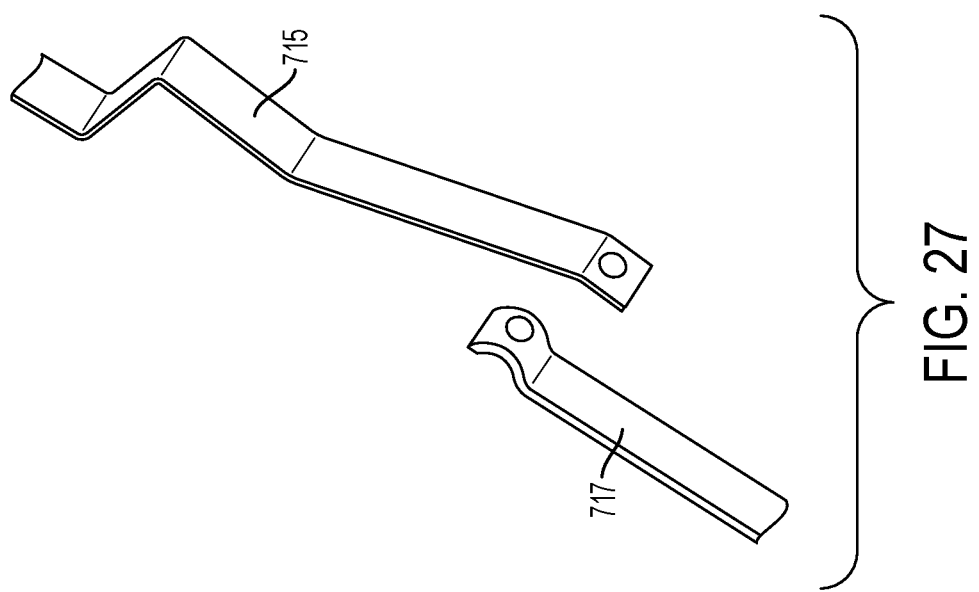
FIG. 27 is an illustration of another embodiment of a switch.

FIG. 27 shows another method of implementing the switch 403 in the screwdriver 700. In the embodiment of FIG. 27, the connector 720 is eliminated. The connector 715 is extended and made with a hinge so that the connectors 715 and 717 can contact one another directly. In this case, the connectors 715 and 717 are separated in the off position. A user can then depress switch 710 to push connector 715 towards connector 717 so that the two connectors make contact and an electrical current runs between them. The screwdriver 700 otherwise operates the same as is shown in FIGS. 24-26.

Figure 28:
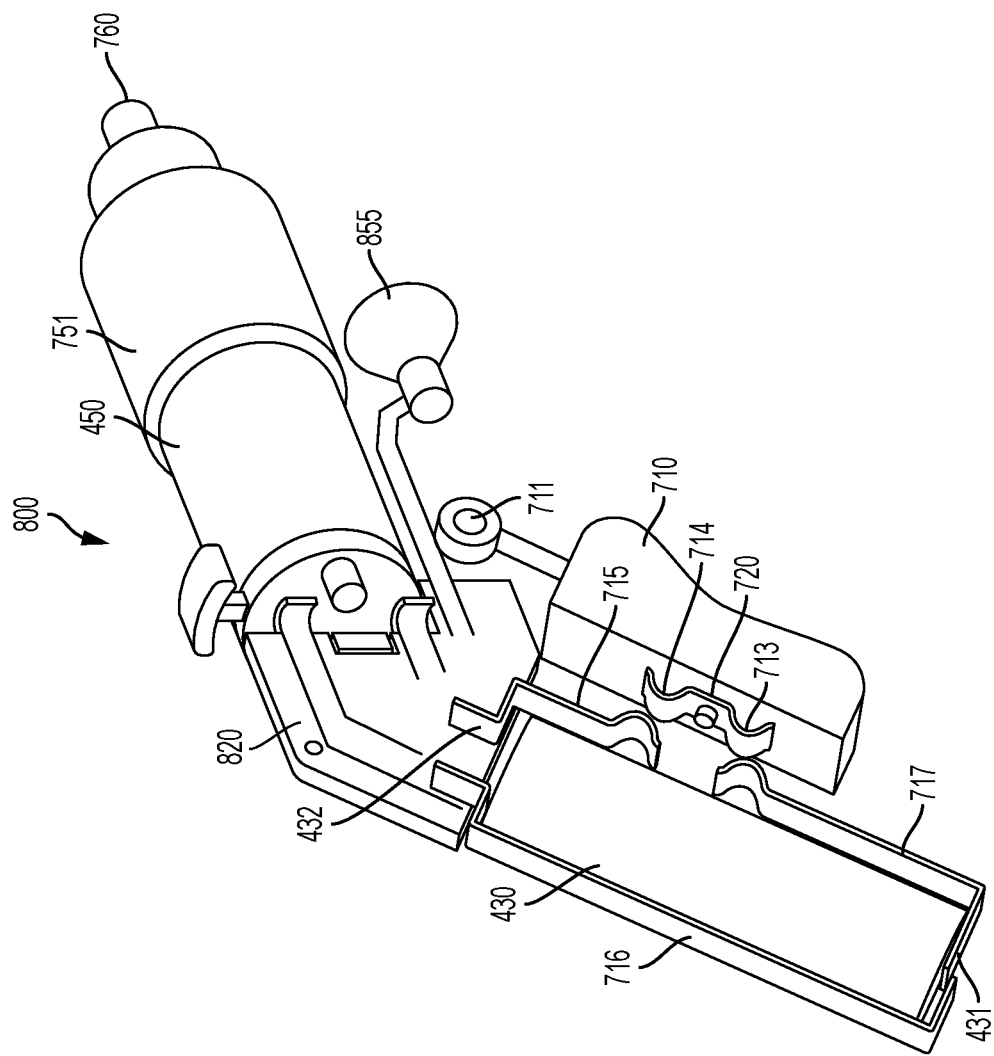
FIG. 28 is a perspective view of another exemplary embodiment of a cordless screwdriver shown with the housing side.
Figure 29:
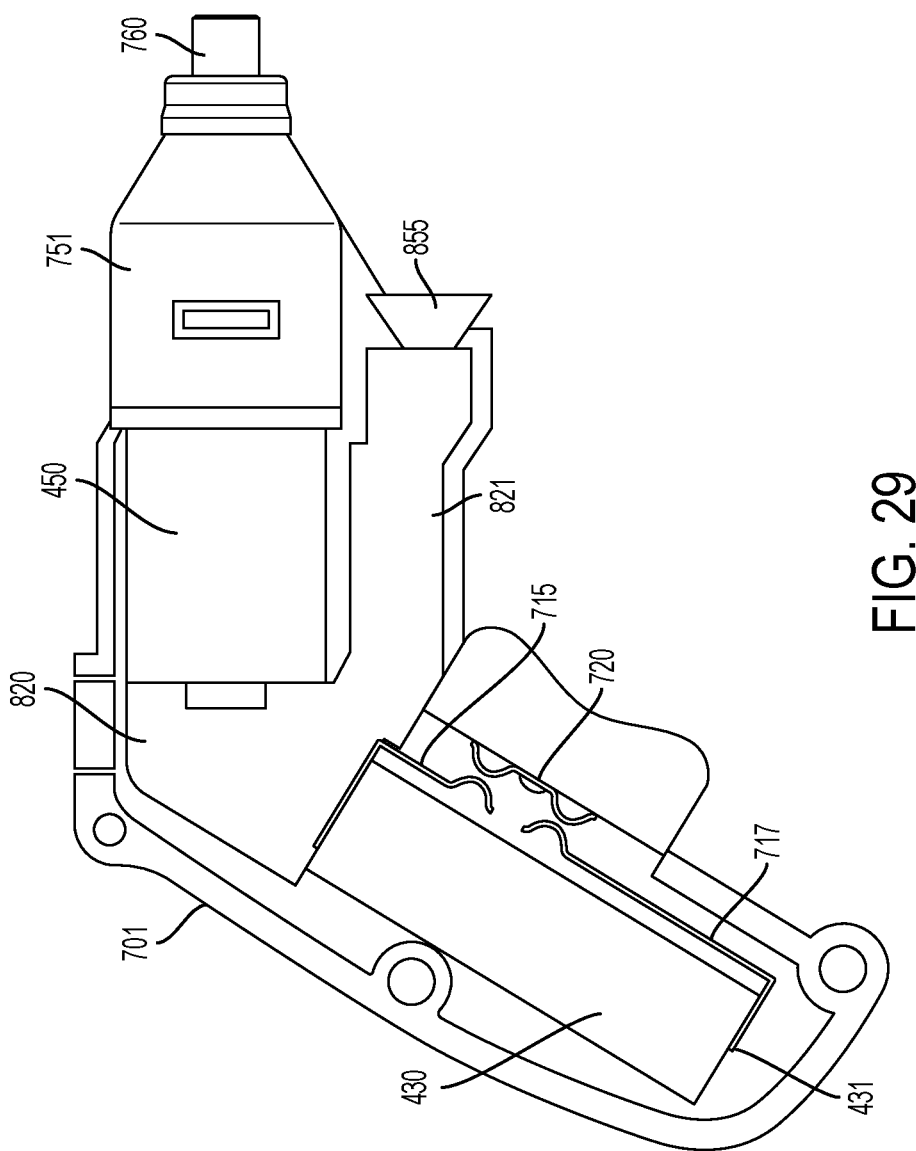
FIG. 29 is a sideview of the exemplary embodiment of the screwdriver of FIG. 28 shown with one housing side removed.

Another exemplary embodiment of a screwdriver is shown in FIGS. 28 and 29. The screwdriver 800 is similar to the screwdriver 700. However, it includes different electrical connections and a circuit board 820 to provide connections between the battery 430 and the motor 450. As shown in FIGS. 28 and 29, battery 430 is soldered onto a circuit board 820. Circuit board 820 is also connected to motor 450. In order to turn on the motor, the switch 710 is depressed to connect connector 717 and 715 and close the circuit to provide power to the motor.

As shown in FIG. 29, the screwdriver 800 may include a second circuit board 821 which connects the battery to a light 855. Accordingly, when the switch 710 is depressed, a connection is also made to provide electric power to the light 855.

Figure 30:
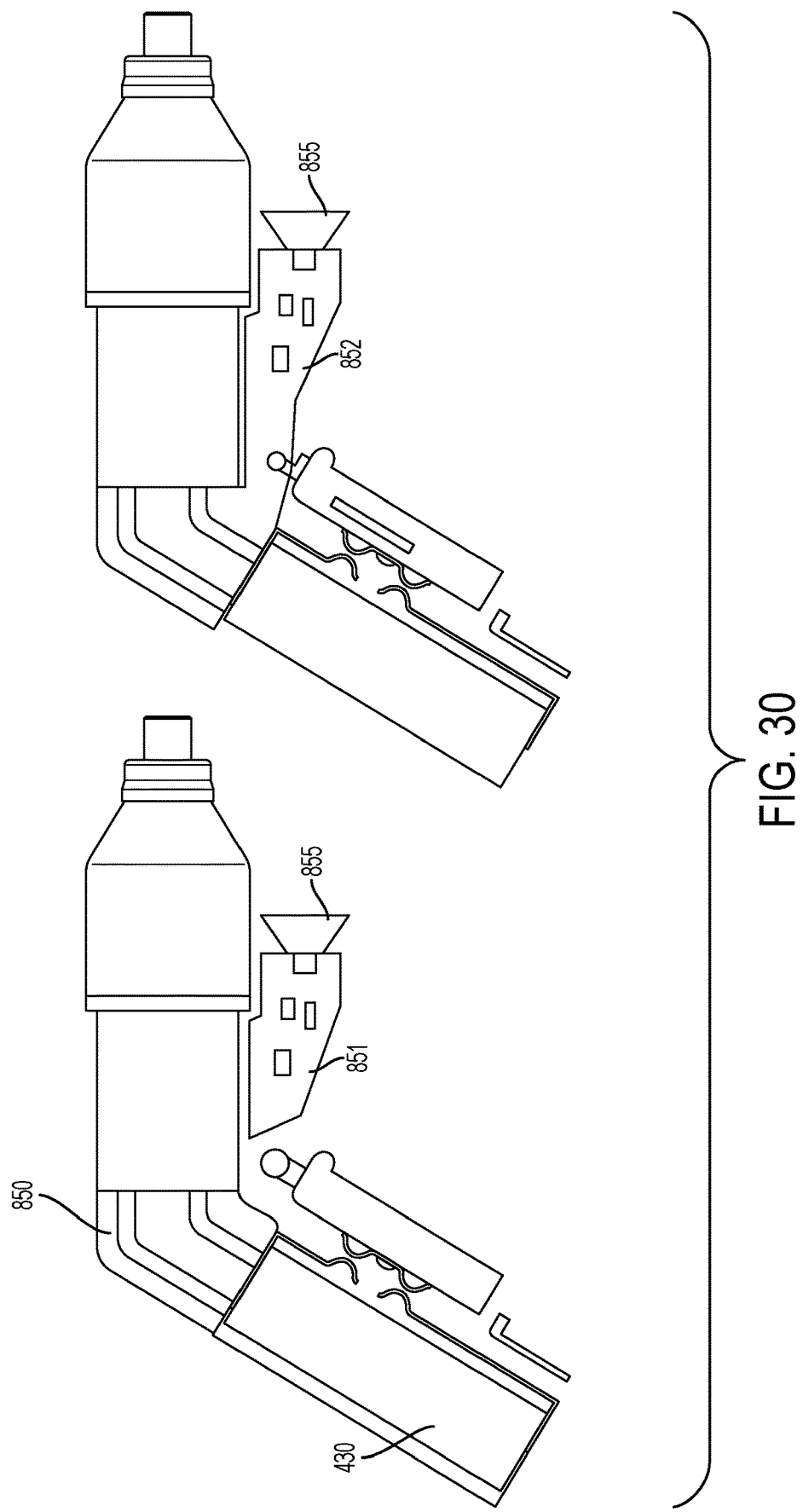
FIG. 30 is a side view of the internals of screwdrivers of exemplary embodiments of the present application.

As shown in FIG. 30, there may separate circuit boards 850 and 851 for the motor and the light or a single combined circuit board 852. Additionally, as shown in FIG. 30, the switch may 710 may be moved to provide a connection directly onto the circuit board 850.

Figure 31:
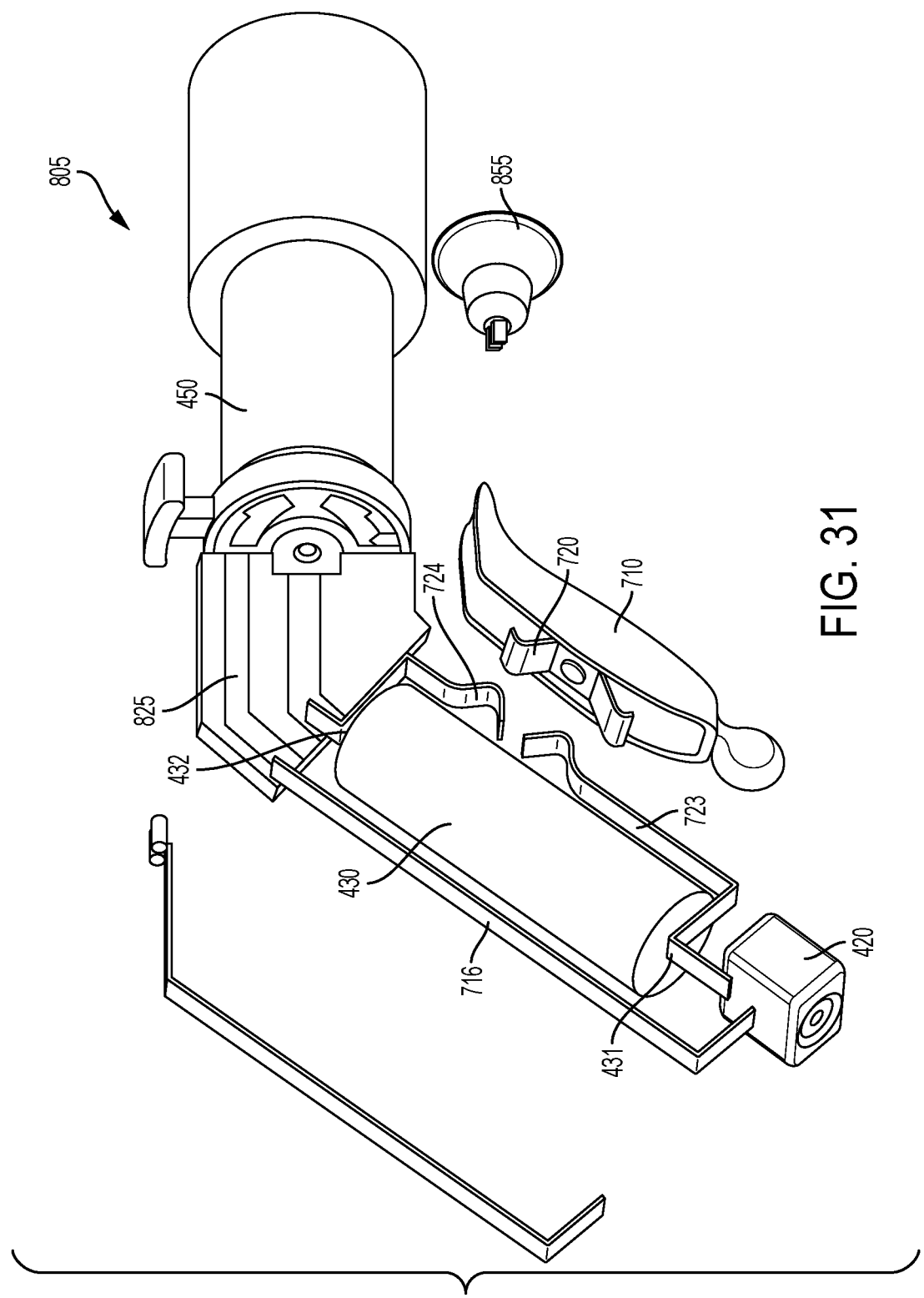
FIG. 31 is a perspective side view of internals of a screwdriver according to another exemplary embodiment.

FIG. 31 illustrates another exemplary embodiment of internals of a screwdriver 805. As shown, a circuit board 825 connects the battery to the motor. In particular, a charger 310 connects to the socket 420 to provide a charging current. Stamped metal connector 723 connects the socket 420 to a positive terminal 431 of the battery 430. The socket 420 is connected to the circuit board 825 through another stamped metal connector 724. The circuit board then connects to a negative terminal 432 of the battery 430 through the circuit board. Accordingly, the battery 430 can be provided with a charge. In order to operate the screwdriver, the user actuatable switch 710 is depressed to bring the connector 720 into contact with connectors 723 and 724. The connector 724 connects a negative terminal of the battery 430 to the circuit board 825. When the connection is completed by contacting the connector 720 with the connectors 723 and 724, the positive terminal 431 is also connected to the circuit board 825 so that a circuit can be completed and power provided to the motor 450 to operate the screwdriver. As will be appreciated, various electrical connections can be made in the circuit board 825 by printings on the board, such as conductive traces. This is the case will all of the circuit boards disclosed in the various embodiments. It will additionally be appreciated that similar constructions may be applied to, for example, a drill.

Another exemplary embodiment of a hand vac will be described with respect to FIGS. 32-51. Like parts are described with the same reference numbers as previously. The hand vac 607 is shown with part of the housing 610 removed in FIG. 32 and without the canister section shown in FIG. 23. It will be appreciated that, as with the other hand vac embodiments, the hand vac 607 operates in the same manner described with respect to FIG. 23.

Figure 32:
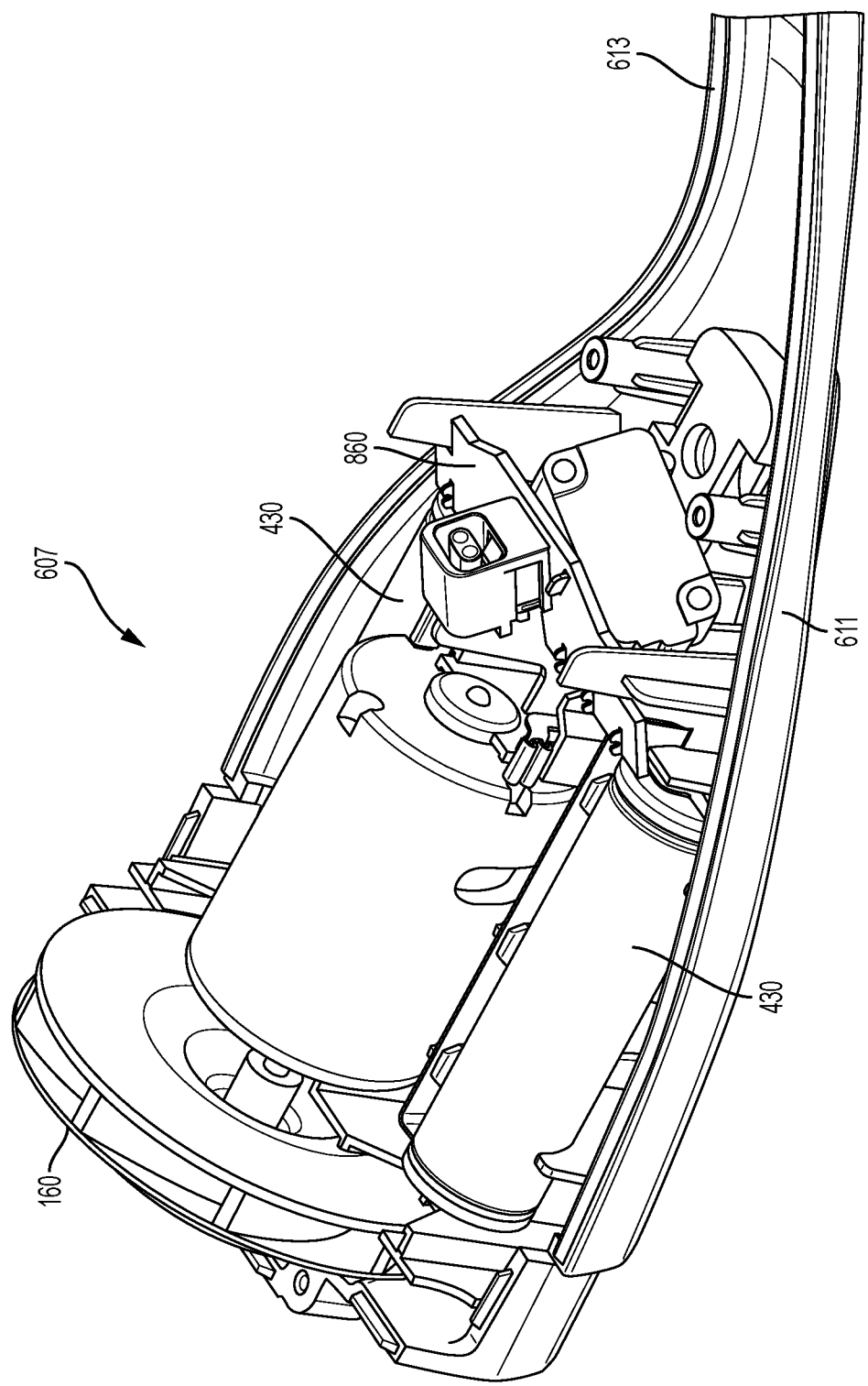
FIG. 32 is a perspective view of a portion of another exemplary embodiment of a hand-held vacuum cleaner with a housing shell section removed.

As shown in FIG. 32, the hand vac 607 of this exemplary embodiment includes a pair of batteries 430 and a motor 450 located between the batteries 430. The batteries 430 are attached to a circuit board 860. A switch 865 is also attached to the circuit board 860 and is used to turn on the hand vac 607. Assembly of the hand vac 607 and further details of its structure are shown in FIGS. 33-51.

Figure 33:
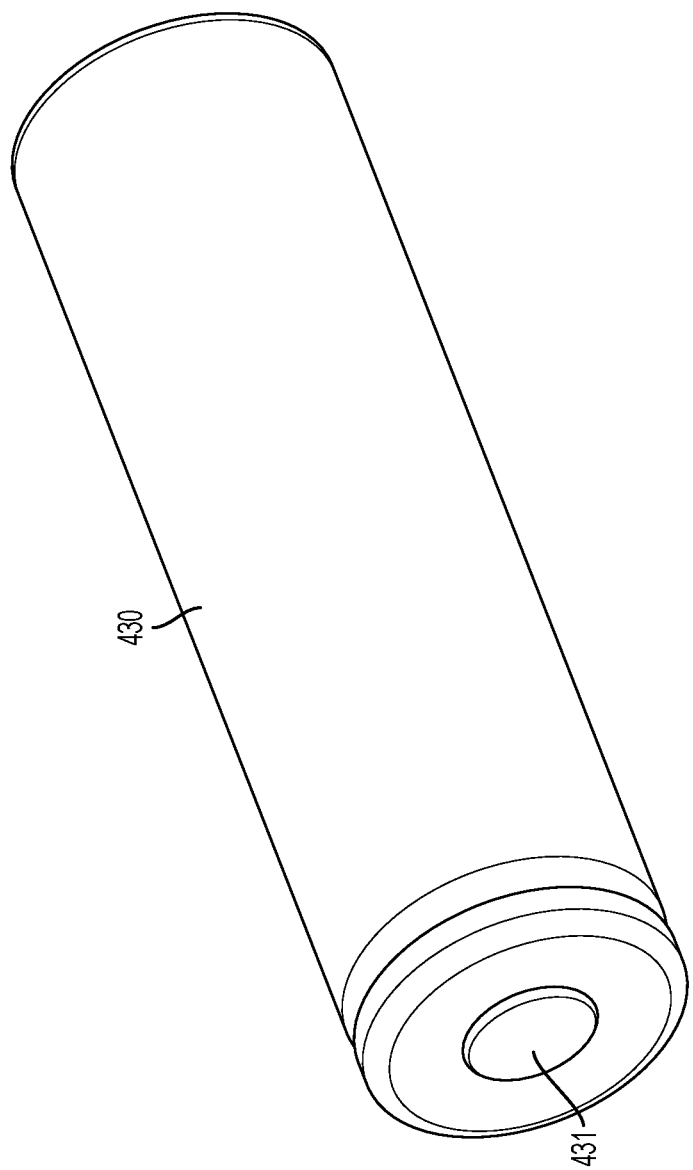
FIG. 33 is a perspective view of a battery cell.

FIG. 33 illustrates one of the batteries 430. As previously discussed, the battery 430 may be a cylindrical battery cell, such as an 18650 size cylindrical battery cell, with a lithium-ion chemistry. Other shapes, sizes and battery chemistries are also possible.

Figure 34:
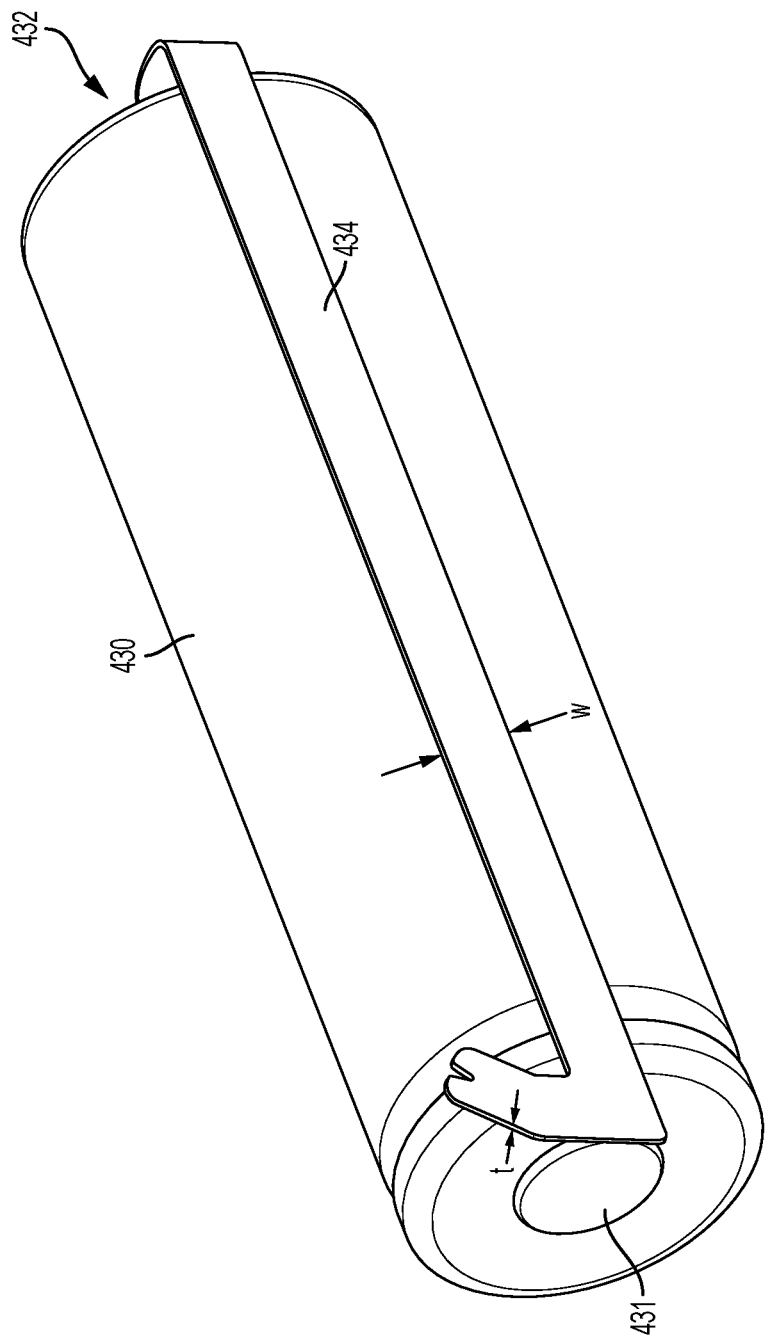
FIG. 34 is a perspective view of the battery cell with a negative cell strap.

As shown in FIG. 34, a negative cell strap 434 is welded to the negative terminal 432 of the battery 430. The negative cell strap 434 is conductive and may be a stamped metal connector. As shown in FIG. 34, the negative cell strap 434 travels from the negative battery terminal 432 along a side of the battery 430 and extends to a position adjacent the positive terminal 431.

The negative cell strap 434 may have a width w which is significantly greater than the thickness. For example, the negative cell strap 434 may have a width w of 4 mm and a thickness t of 1 mm. The width w may be twice as much as the thickness t or more; three times as much as the thickness t or more; or four times as much as the thickness t or more. The relative large size of a width versus the thickness may be true for all of the stamped metal connectors discussed previously or subsequently. For example, each may have a width that is two or more times, three or more times; or four or more times as great as its thickness.

Figure 35:
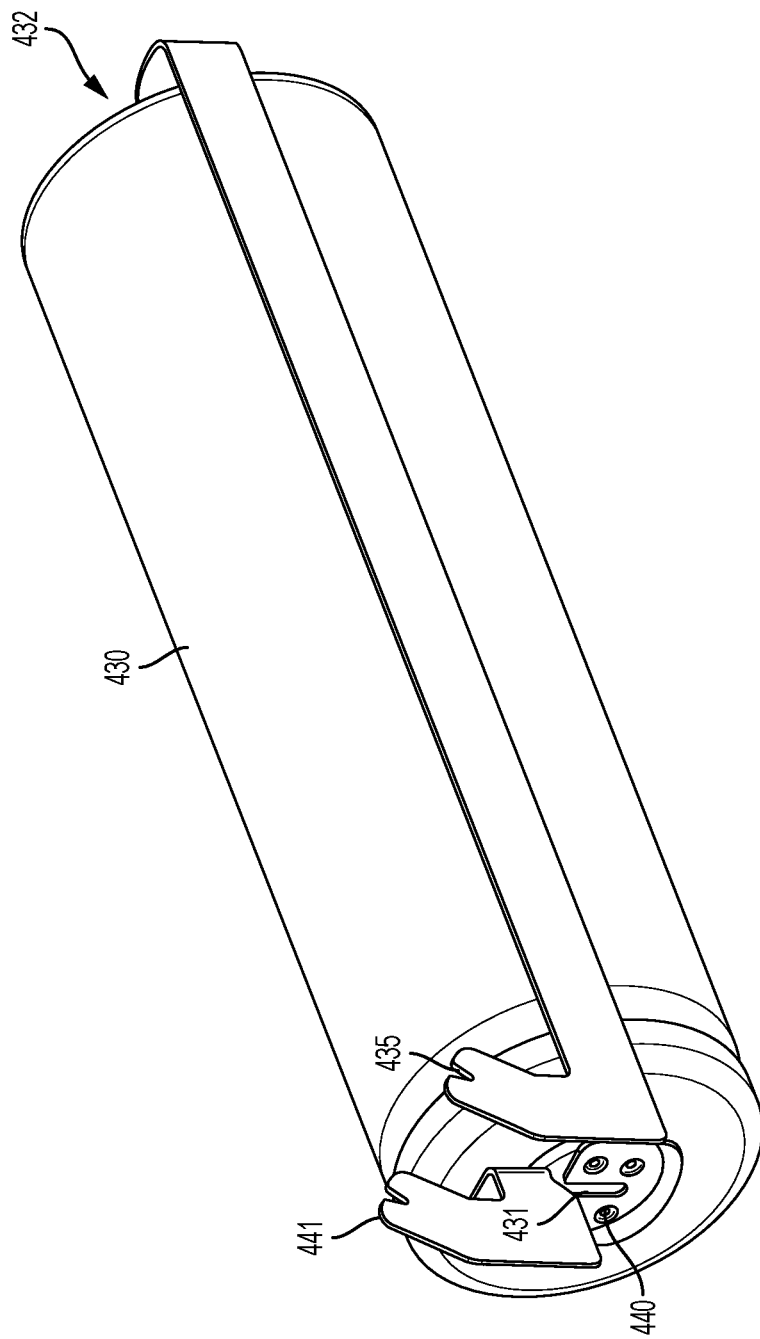
FIG. 35 is a perspective view of the battery cell with a pair of cell straps.

As shown in FIG. 35, a positive cell strap 440 may be subsequently welded onto the positive terminal 431 of the battery 430. As will be appreciated, the positive cell strap 440 is also conductive and may be a stamped metal connector. The positive cell strap 440 includes an end 441 which is parallel and adjacent to an end 435 of the negative weld strap 434.

Figure 36:
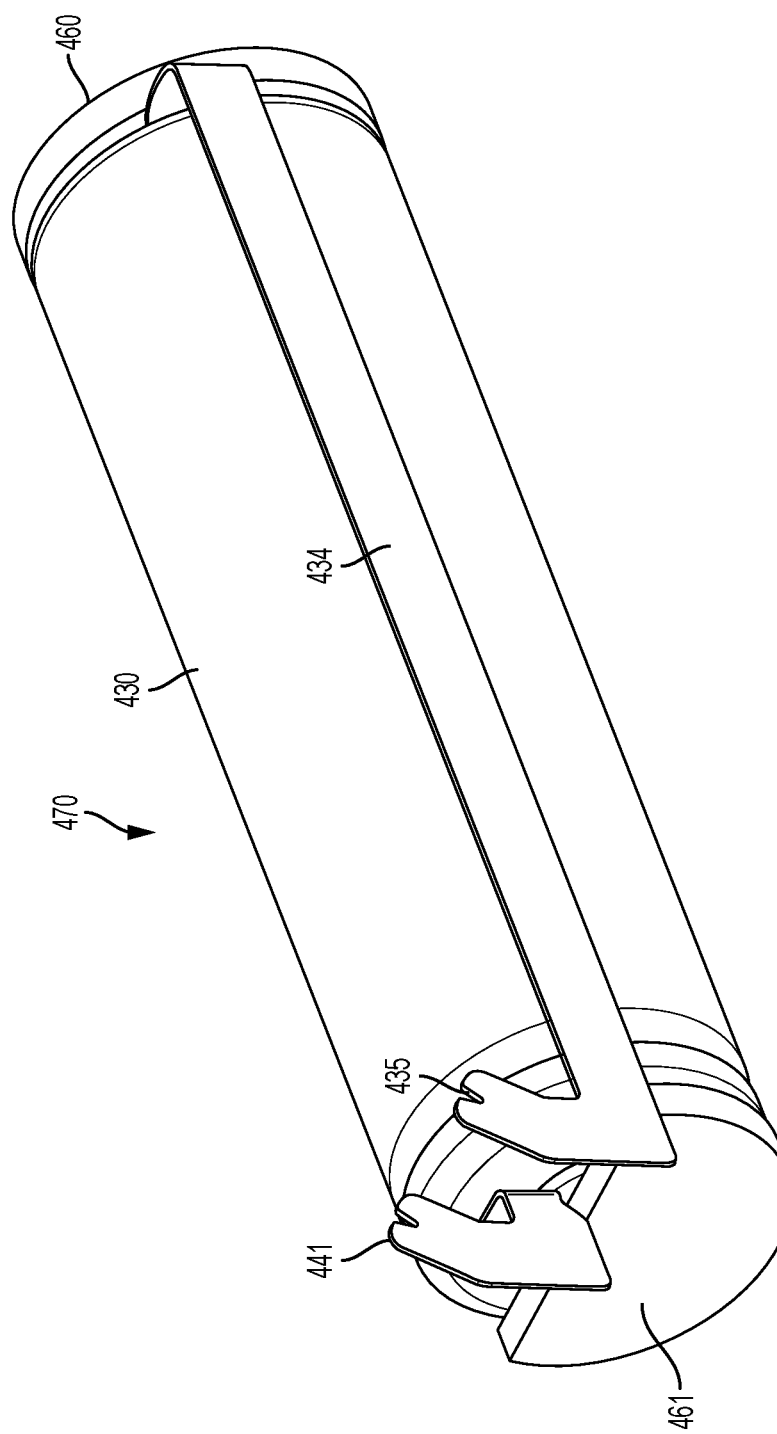
FIG. 36 is a perspective view of a battery assembly including the battery cell.

As shown in FIG. 36, foam pads 460 and 461 may then be applied to the battery cell 430. The foam pad 460 is a cylindrical foam pad and covers the negative terminal 430 of the battery 430 and a portion of the negative cell strap 434. The foam pad 461 is a partial cylinder, such that the ends 435 and 441 are allowed to project freely. In other embodiments, the foam pads may be different shapes or sizes. The foam pads 460, 461 may be attached by an adhesive or other means.

FIGS. 33-36 illustrate a progression of assembly steps related to the battery cell 430 and accompanying components. In the illustrated exemplary embodiment, the assembly steps are carried out in the order shown from FIGS. 33-36. Specifically, first the battery 430 is provided, as shown in FIG. 33. Then, the negative cell strap 434 is welded to a negative terminal 432 of the battery, as shown in FIG. 34. After that, the positive cell strap 440 is welded onto the battery 430, as shown in FIG. 35 and, finally, the foam pads 460, 461 are added, as shown in FIG. 36. Although that specific order is illustrated for this exemplary embodiment, this specification contemplates other orders of assembly. For example, the positive cell strap 450 may be welded to the battery 430 before the negative cell strap 434 is welded to the battery 430.

Additionally, the hand vac 607 includes two batteries 430. The battery assembly described with reference to FIGS. 33-36 is repeated for both batteries 430. In embodiments with only one battery 430, only one battery assembly per hand vac is necessary. When there are multiple batteries 430, the order of assembly for the different batteries may be different. For example, for a first battery 430, the positive cell strap 450 may be welded to the battery 430 before the negative cell strap 434 is welded to the battery 430 and for a second battery 430 the positive cell strap 450 may be welded to the battery 430 after the negative cell strap 434 is welded to the battery 430.

Figure 37:
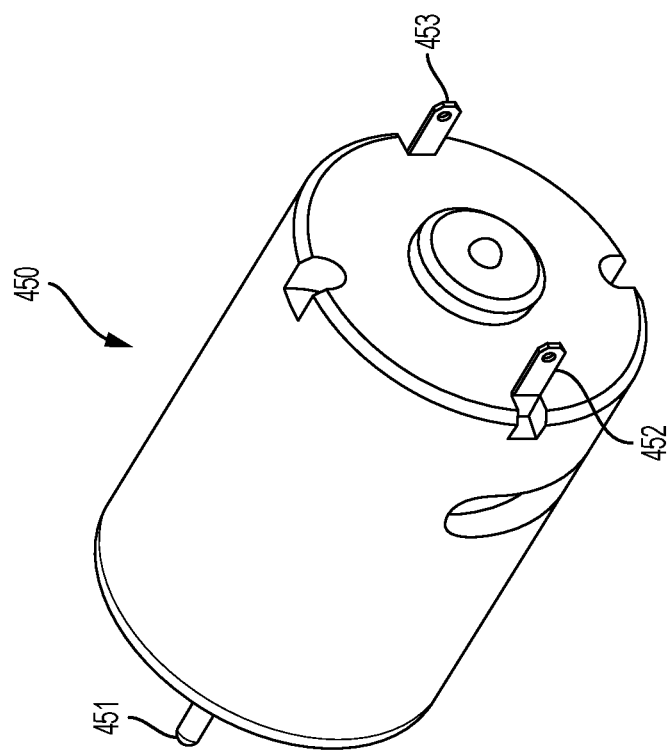
FIG. 37 is a perspective view of a motor.
Figure 38:
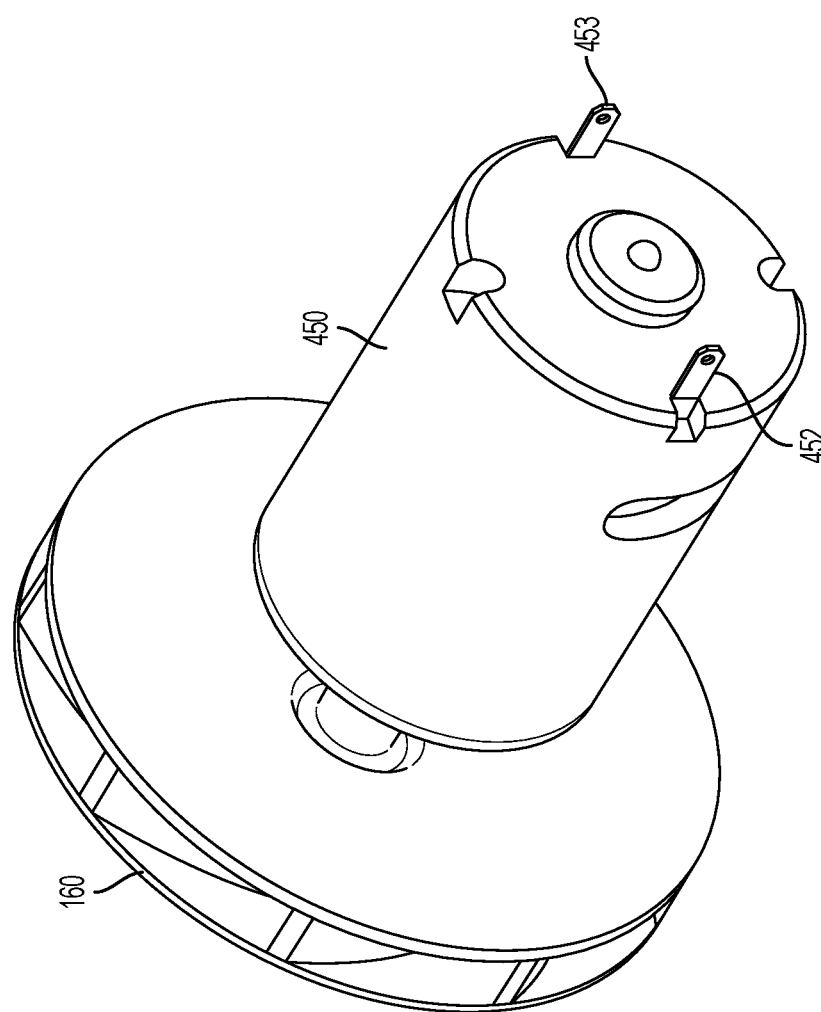
FIG. 38 is a perspective view of the motor with a fan attached.
Figure 39:
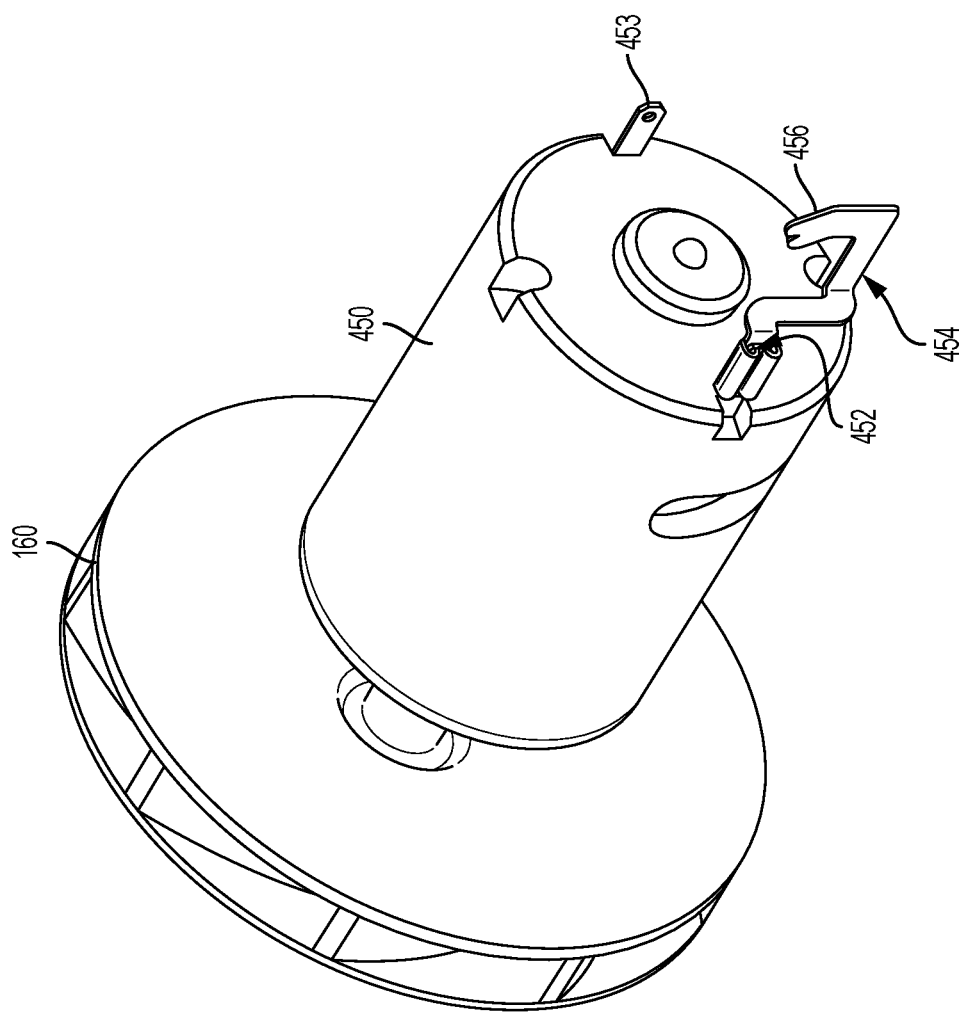
FIG. 39 is a perspective view of the motor with the fan and a positive connector attached.
Figure 40:
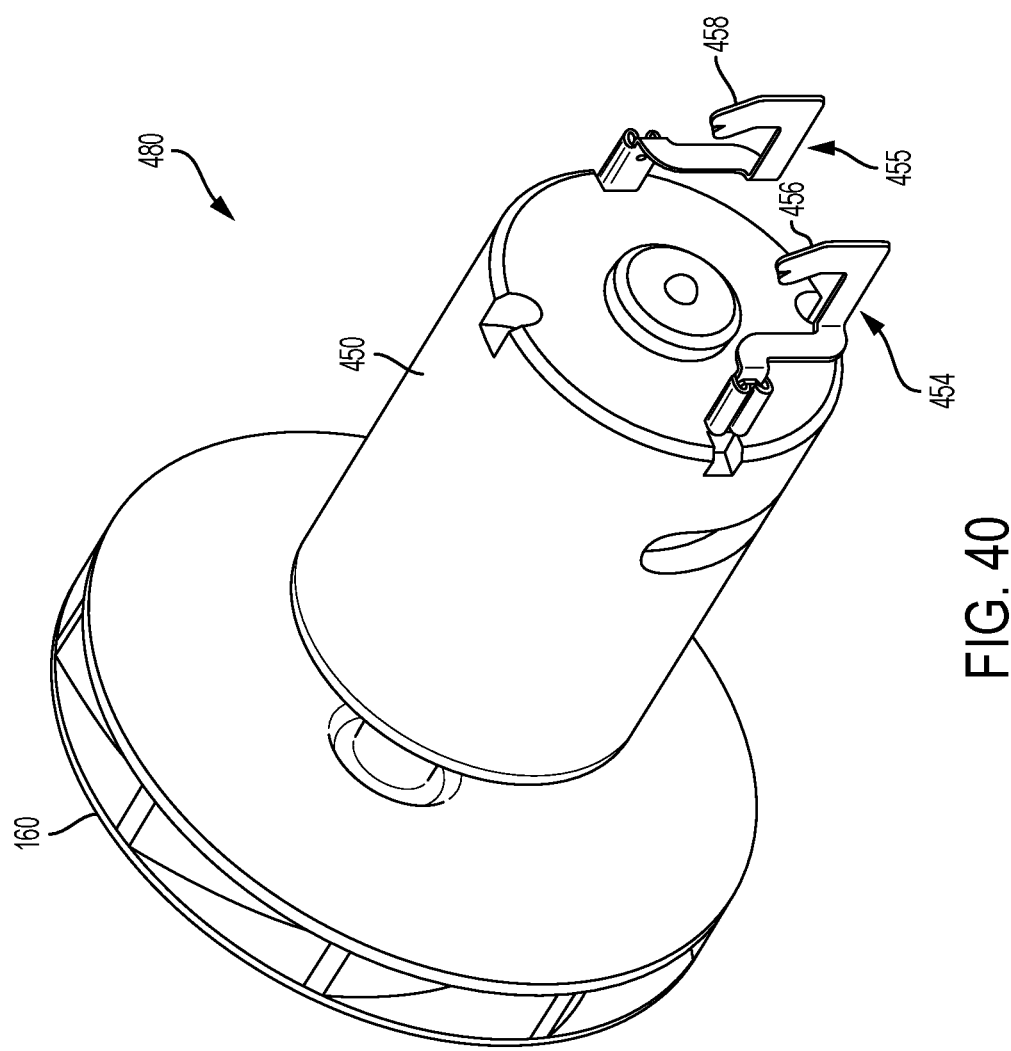
FIG. 40 is a perspective view of the motor with the fan and a pair of connectors attached.

A motor assembly operation will now be described with reference to FIGS. 37-40. FIG. 37 illustrates a motor 450. The motor 450 has an output shaft 451, a positive terminal 452 and a negative terminal 453. As shown in FIG. 38, after the motor 450 is provided, a fan 160 is pressed onto the output shaft 451 of the motor 450. Then, as shown in FIG. 39, a positive connector 454 is attached to the positive motor terminal 452. Next, as shown in FIG. 40, a negative connector 455 is attached to the negative motor terminal 453. The positive connector 454 has an end 456 which is parallel to an end 458 of the negative connector 455. The connectors 454 and 455 are conductive and may be made of metal.

This disclosure contemplates other orders of assembly as well. For example, the fan 160 may be attached to the motor output shaft 451 before, after or between the attachment of the positive connector 454 and the negative connector 455 to the motor 450. Additionally, in the shown exemplary embodiment, the positive connector 454 is attached before the negative connector 455. In other embodiments, the negative connector 455 may be attached before the positive connector 454.

Figure 47:
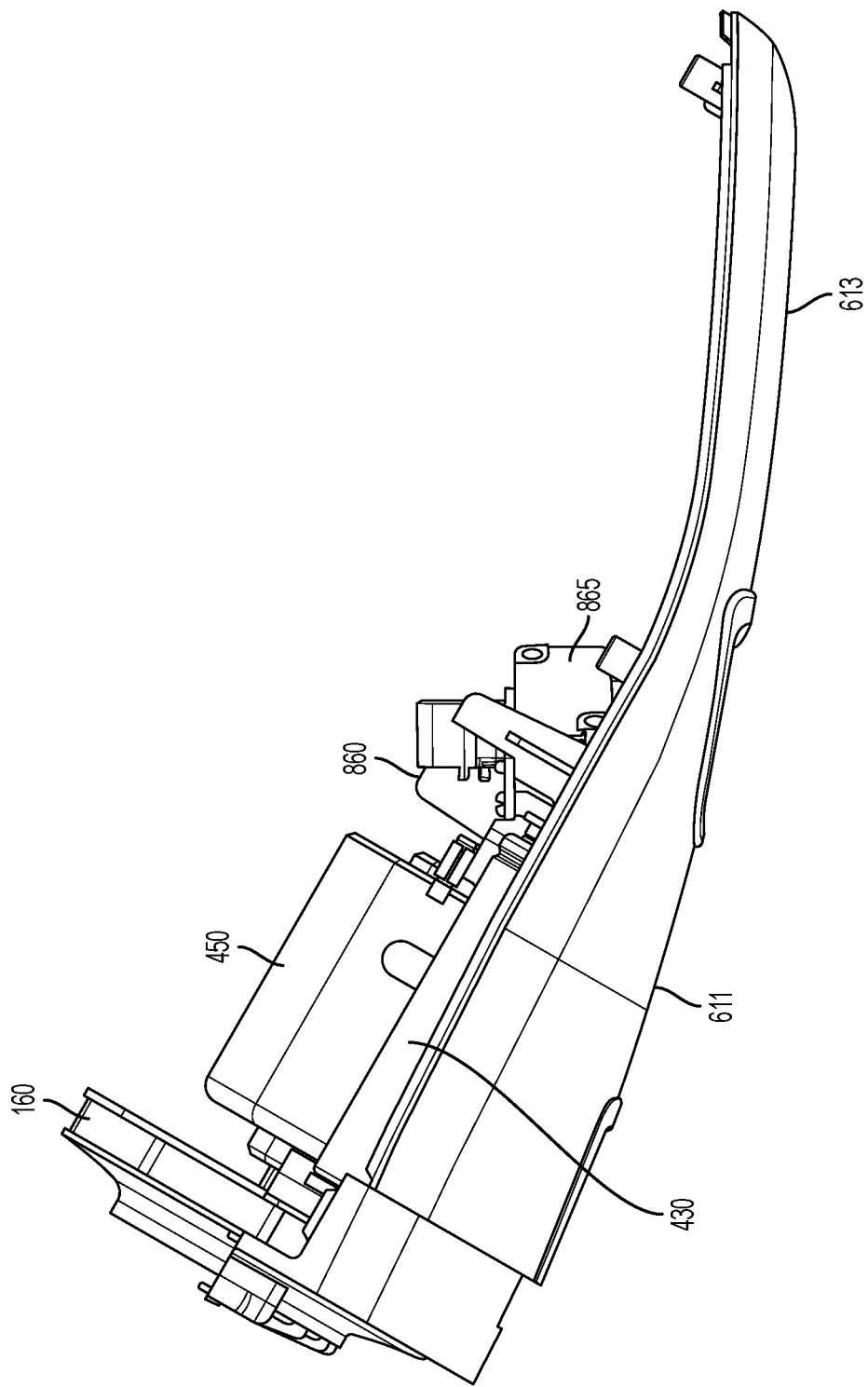
FIG. 47 is another side view of the exemplary embodiment of the hand-held vacuum cleaner with a housing shell section removed.
Figure 48:
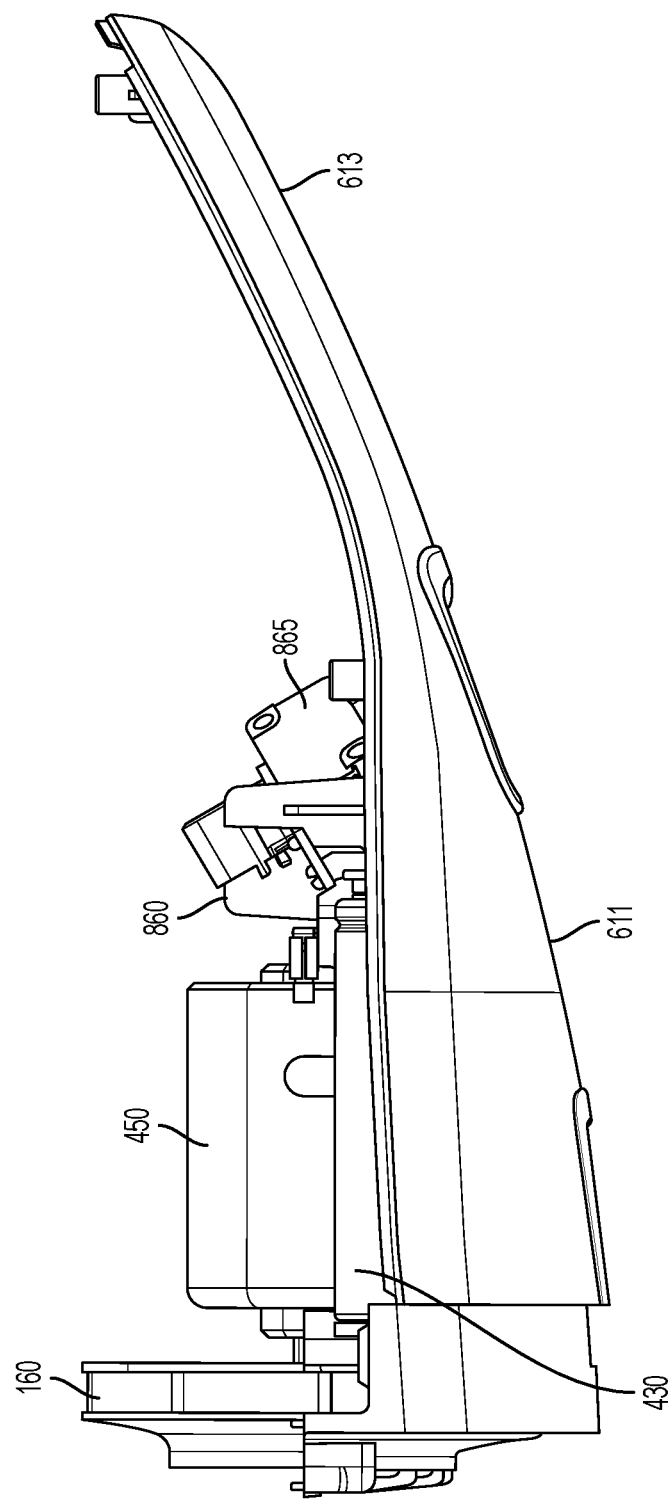
FIG. 48 is another side view of the exemplary embodiment of the hand-held vacuum cleaner with a housing shell section removed.
Figure 49:
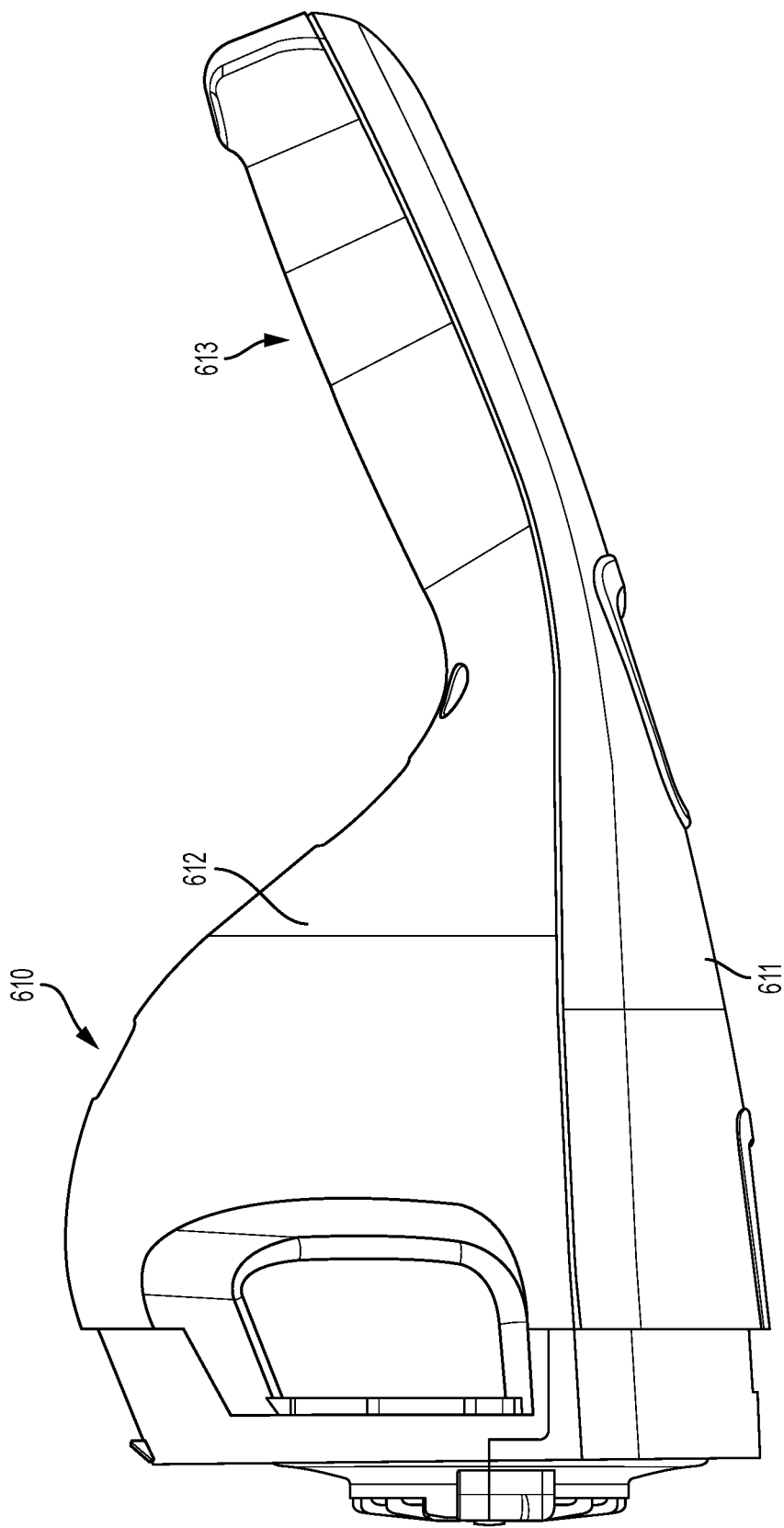
FIG. 49 is a side view of a portion of the exemplary embodiment of the hand-held vacuum cleaner.

FIGS. 41-51 illustrate assembly of the battery assembly and the motor assembly into the housing 610. As shown in FIG. 49, the housing 610 comprises a first housing shell 611 and a second housing shell 612. The first and second housing shells 611, 612 form the housing 610, including a handle portion 613, which the user can grip.

Figure 41:
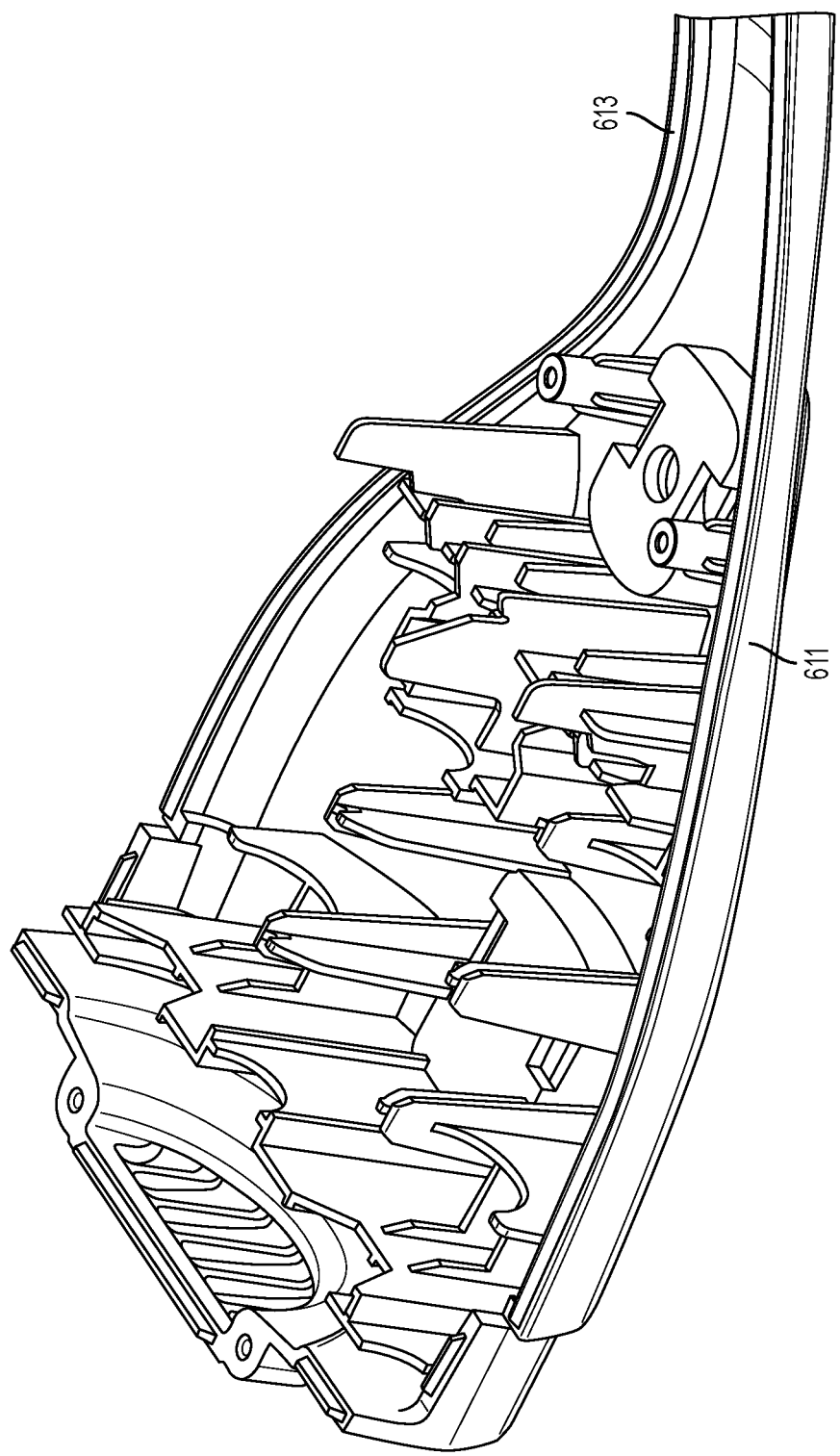
FIG. 41 is a perspective view of a housing shell of the hand-held vacuum cleaner of the exemplary embodiment.

FIG. 41 illustrates the first housing shell 611. The first housing shell 611 includes features for holding the batteries 430, motor 450 circuit board 860 and other components. That is, the components can be placed into the shell and the shell 611 holds them in the appropriate location. As shown in FIG. 41, there are a variety of ribs for holding the components. The later Figs. illustrate the ribs holding the components.

Figure 42:
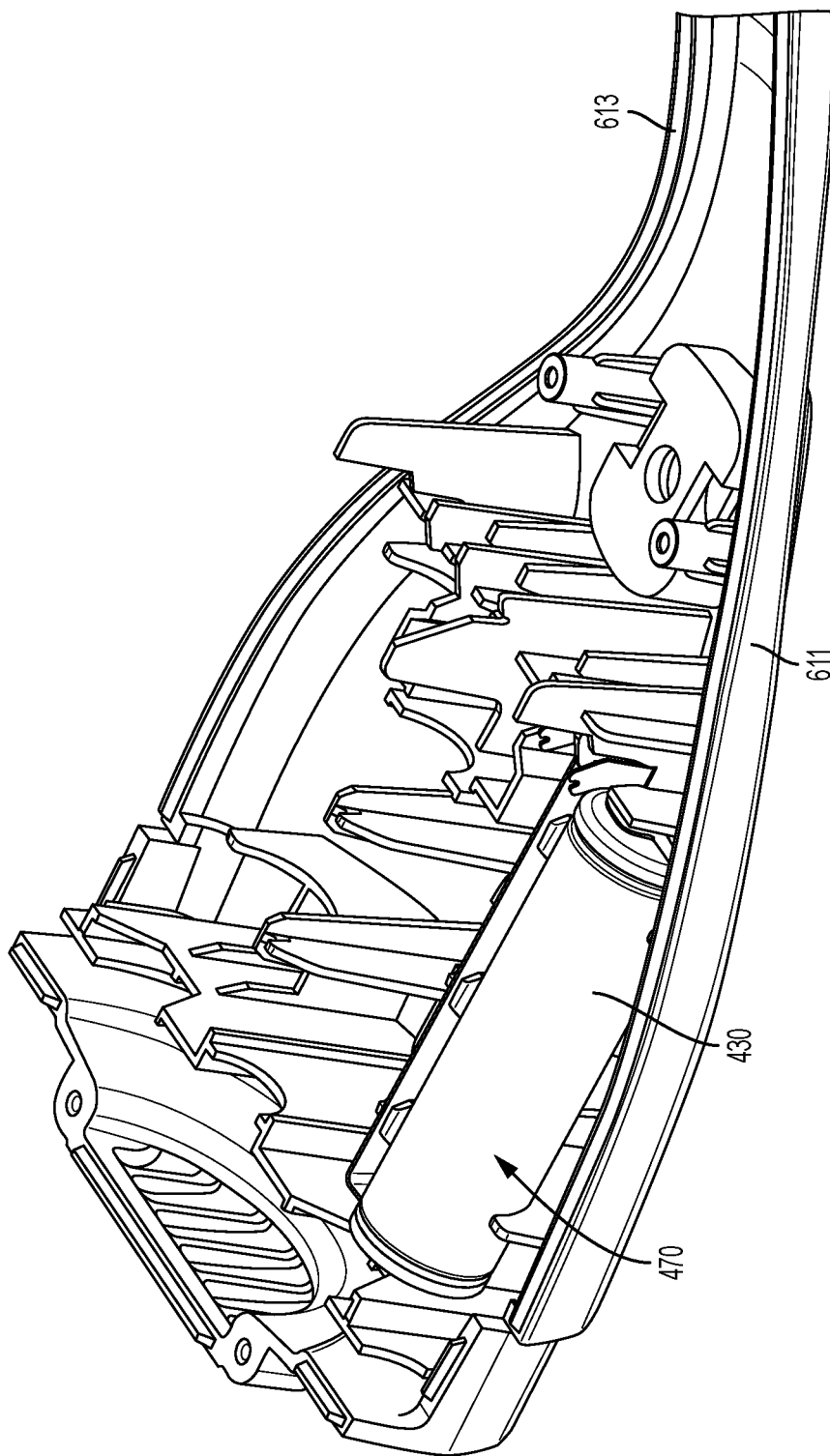
FIG. 42 is a perspective view of the housing shell with a battery assembly.
Figure 43:
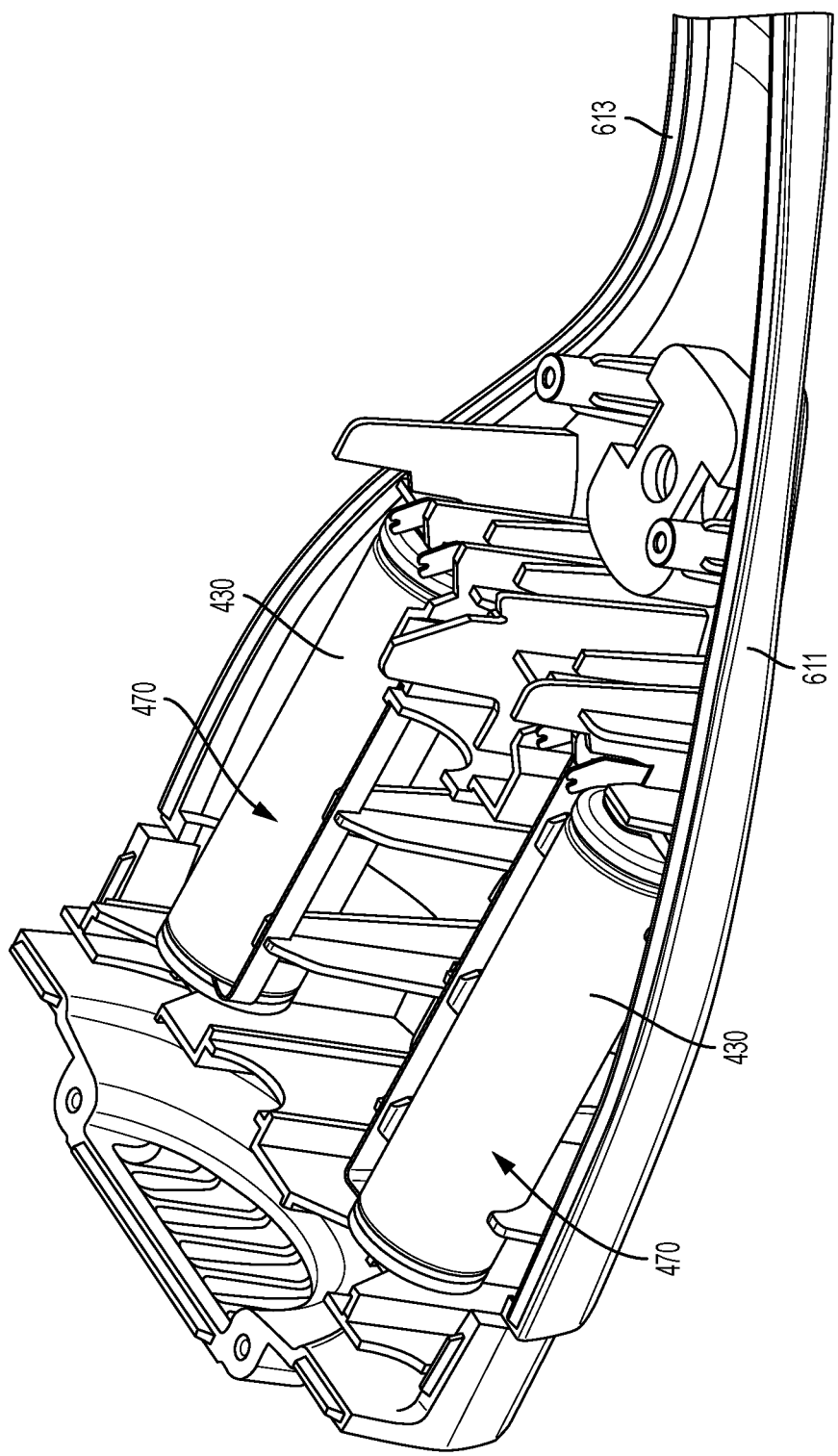
FIG. 43 is a perspective view of the housing shell with a pair of battery assemblies.

As shown in FIG. 42, the battery assembly 470 shown in FIG. 36 is placed into the first shell 611. Next, as shown in FIG. 43, a second battery assembly 470 is placed into the shell 611. In this instance two of the same battery assemblies 470 are placed into the shell 611. In other embodiments with multiple battery assemblies, the battery assemblies may be different from one another. Additionally, the order in which the two battery assemblies 470 are placed in the shell 611 may be switched.

Figure 44:
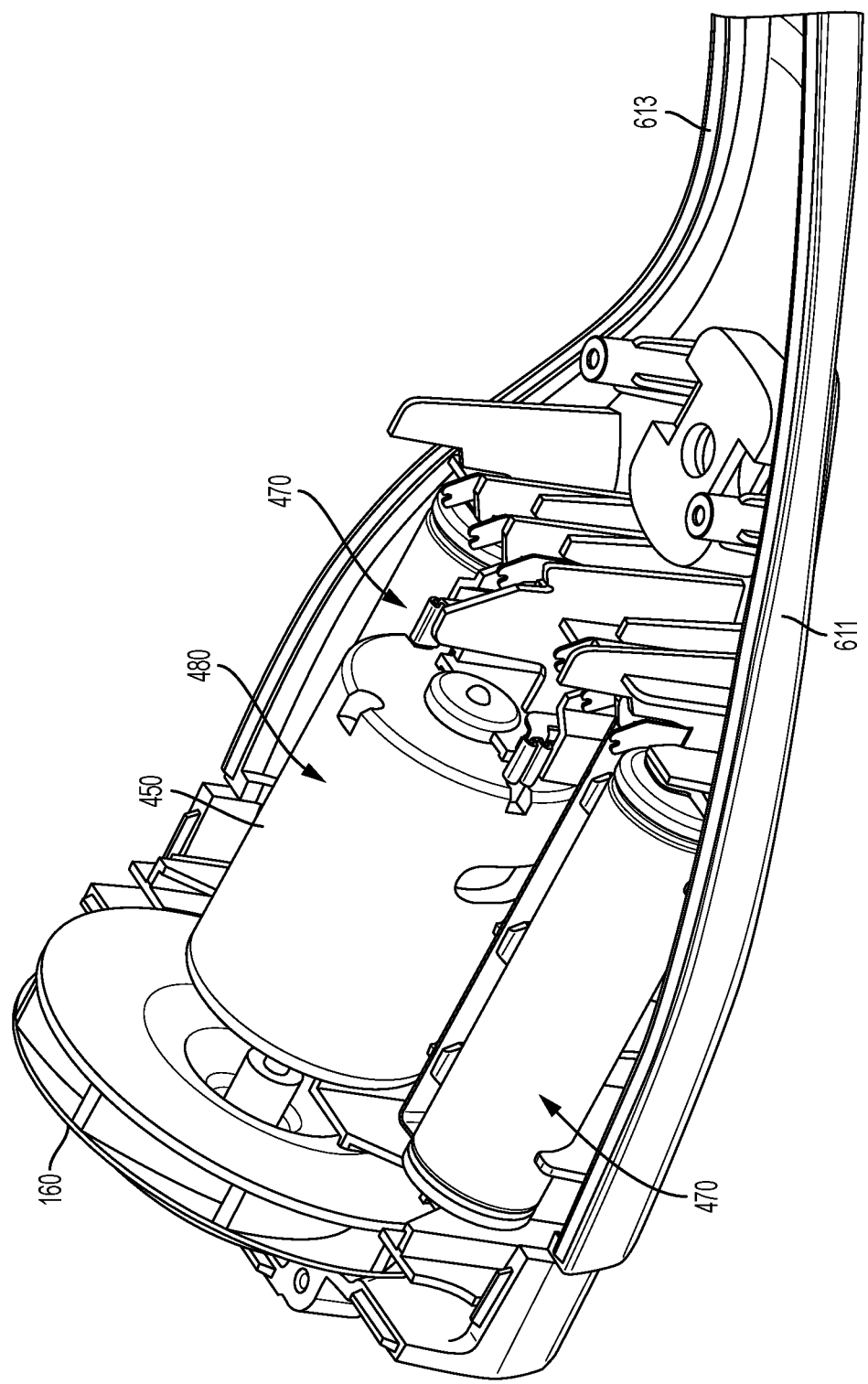
FIG. 44 is a perspective view of the housing shell with the pair of battery assemblies and a motor assembly.
Figure 45:
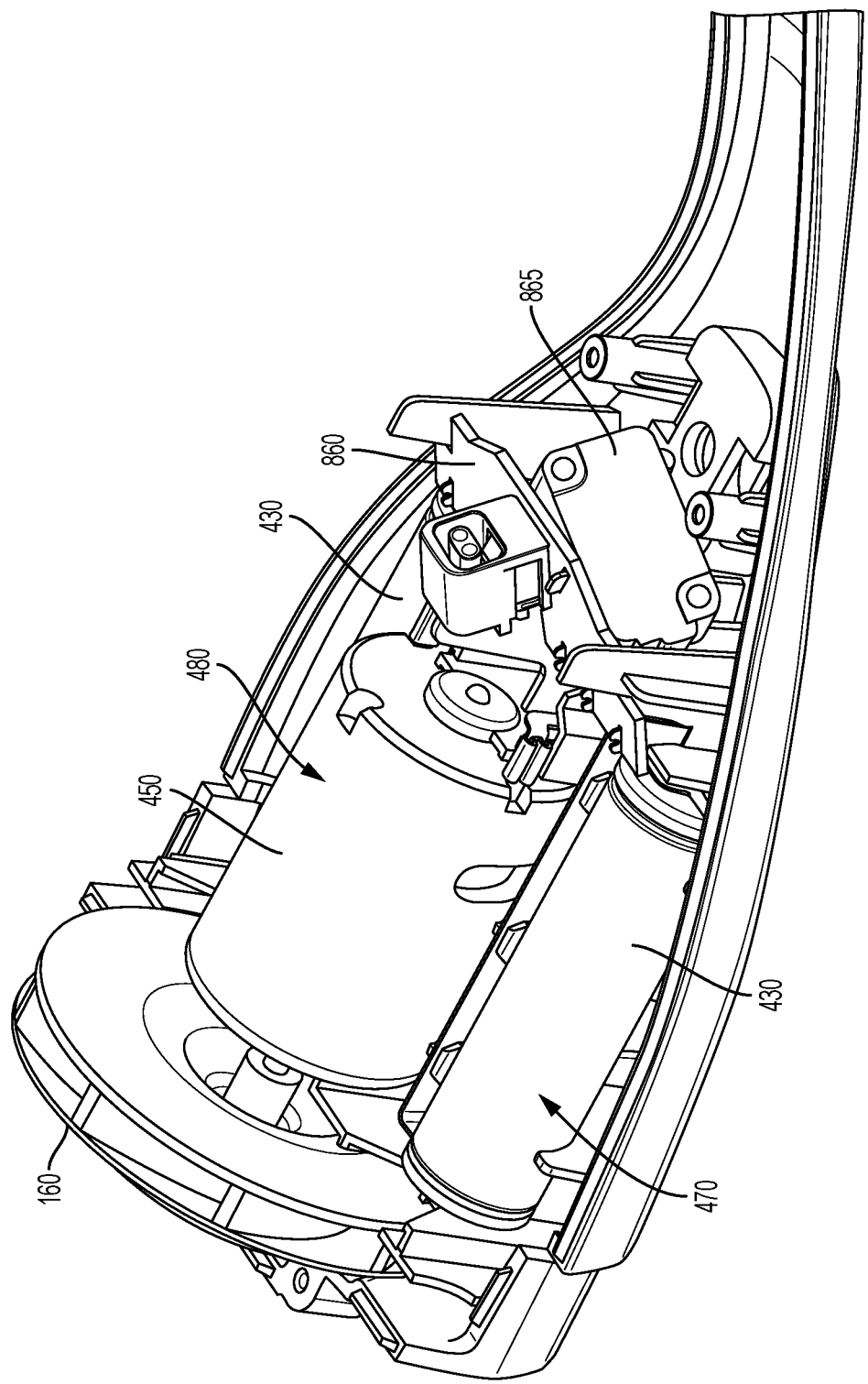
FIG. 45 is another perspective view of the exemplary embodiment of the hand-held vacuum cleaner with a housing shell section removed.
Figure 46:
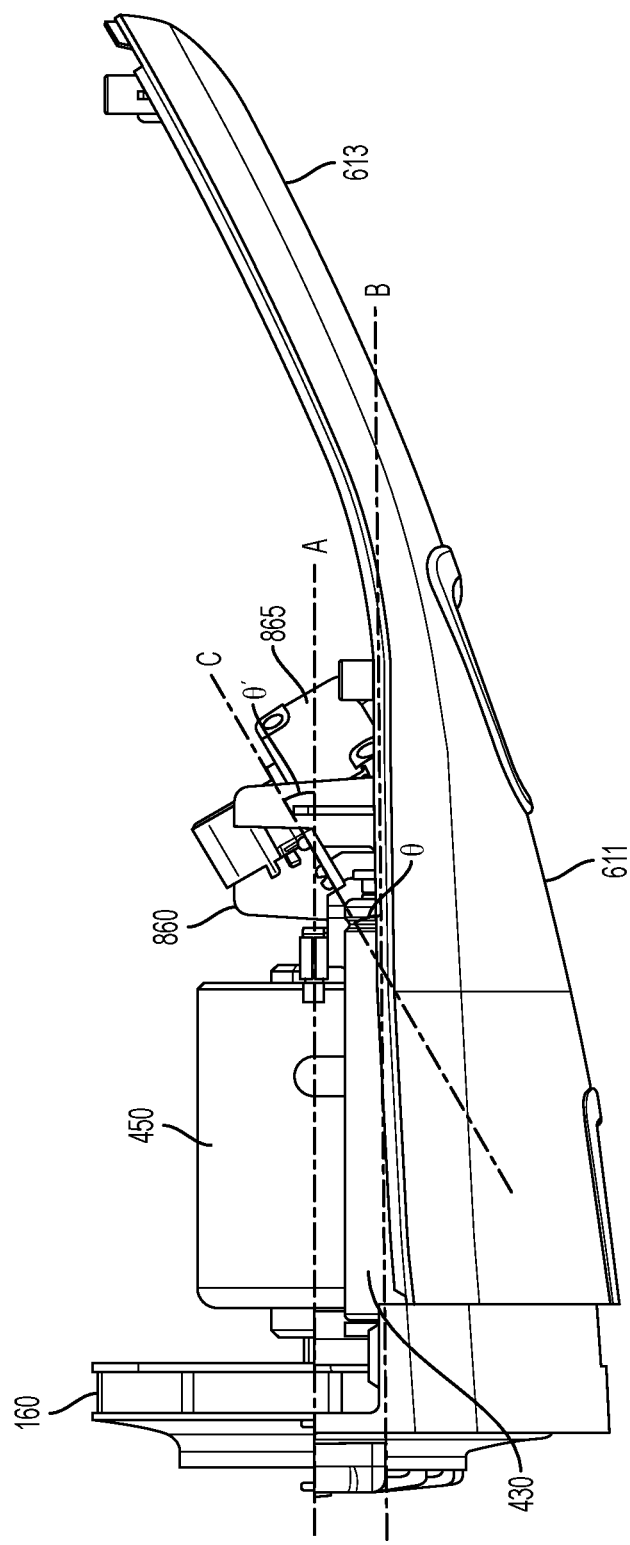
FIG. 46 is a side view of the exemplary embodiment of the hand-held vacuum cleaner with a housing shell section removed.

As shown in FIG. 44, the motor assembly 480 is then placed in the shell 611. As shown in FIGS. 45 and 46, the circuit board 860 and switch 865 are inserted into the shell 611. The switch 865 is attached to the circuit board 860 before the circuit board 860 is inserted into the shell 611. Next, as shown in FIG. 47, the housing shell 611 is rotated to aid in the soldering operation. Soldering is then performed. The soldering operations solders the battery assemblies 470 and the motor assembly 480 to the circuit board. Specifically, ends 441, 435, 456 and 458 of the connectors are all soldered to the circuit board 860. For the battery assemblies 470, both sets of ends 435, 441 are soldered. This electrically connects the batteries 430 and the motor 450 to the circuit board 860, and allows for connection from the batteries 430 to the motor 450 to power the motor 450 through the circuit board. Since the switch 865 is also connected to the circuit board 860, it can be used to turn on or off the hand vac 607 by the batteries 430 providing power to the motor 450 or not.

As shown, the circuit board 860 includes a number of places for receiving the ends 441, 435, 456 and 458. The circuit board 860 may have slots or other receiving portions such that an electrical connection can be formed when the ends contact the circuit board 860 at the receiving portion.

FIGS. 46, 47 and 48 illustrate the rotation of the housing shell 611. In the position shown in FIGS. 46 and 48, the motor 450 and the batteries 430 are horizontal. The circuit board 860 is angled with respect to the motor 450 and the batteries 430 at an angle of 30 degrees. Particularly, the motor 450 has a motor longitudinal axis A. The batteries 430 include a longitudinal axis B and the circuit board 860 is along a plane C. The angle Θ' between the longitudinal axis A and the plane C is 30 degrees. Likewise, the angle Θ between the longitudinal axis B and the plane C is 30 degrees. The motor 450 and the batteries 430 are parallel, such that the angle between them and the circuit board 860 is the same in this embodiment.

When the housing shell 611 is rotated to the position in FIG. 47, the circuit board 860 is disposed horizontally. This allows a vertically travelling and disposed soldering machine to more easily solder the connectors to the circuit board 860.

As shown in FIG. 48, after the soldering is completed, the shell 611 is rotated back from the position of FIG. 47 to its previous position. Next, as shown in FIG. 49, the second housing shell 612 is attached to the first housing shell 611. The first housing shell 611 and the second housing shell 612 may be attached by any of various means, such as screws, rivets or other attaching means. When the second housing shell 612 is attached to the first housing shell 611, the components which were placed in the first housing shell 611 are held therebetween.

Figure 50:
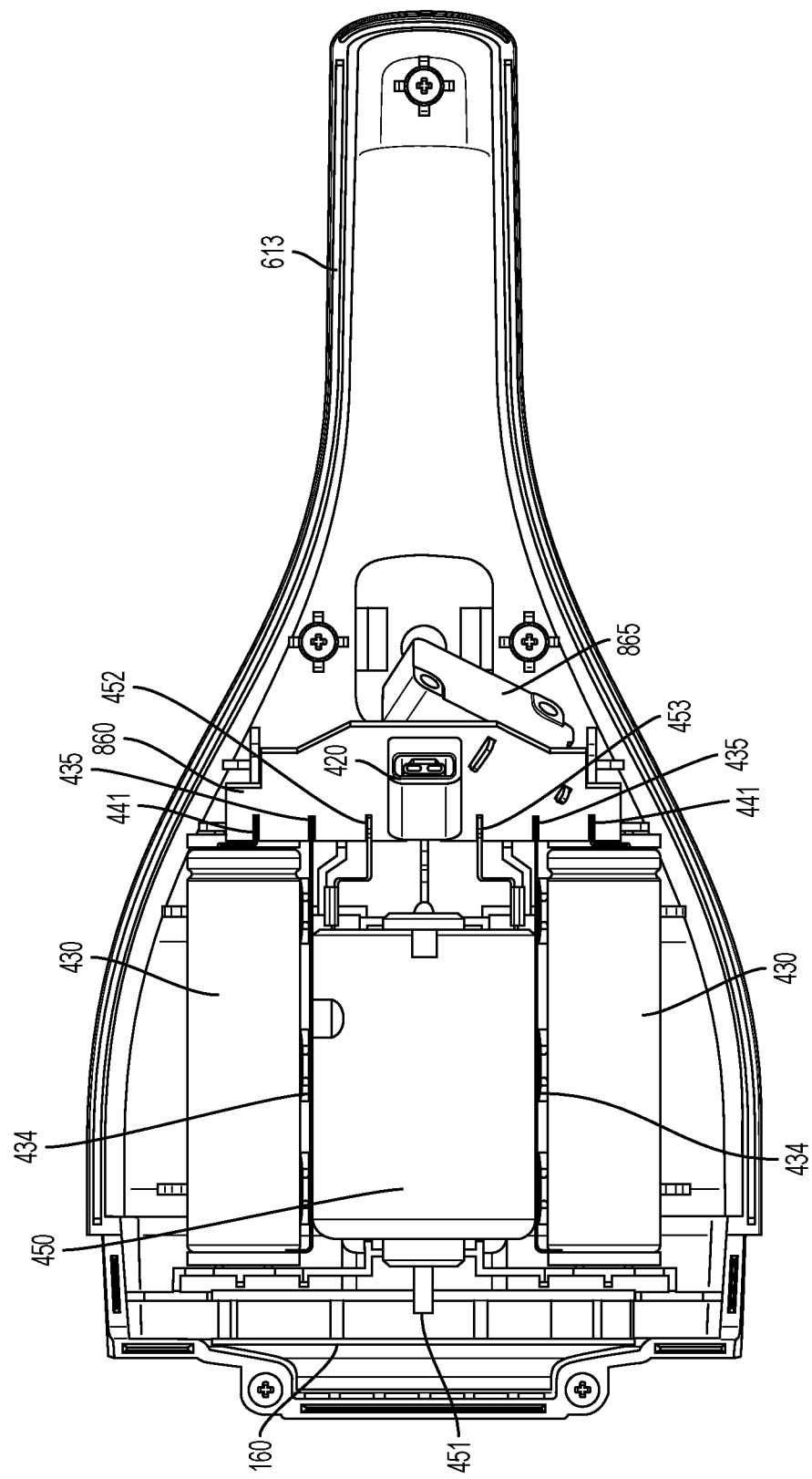
FIG. 50 is a top view of a portion of the exemplary embodiment of the hand-held vacuum cleaner with a housing shell section removed.
Figure 51:
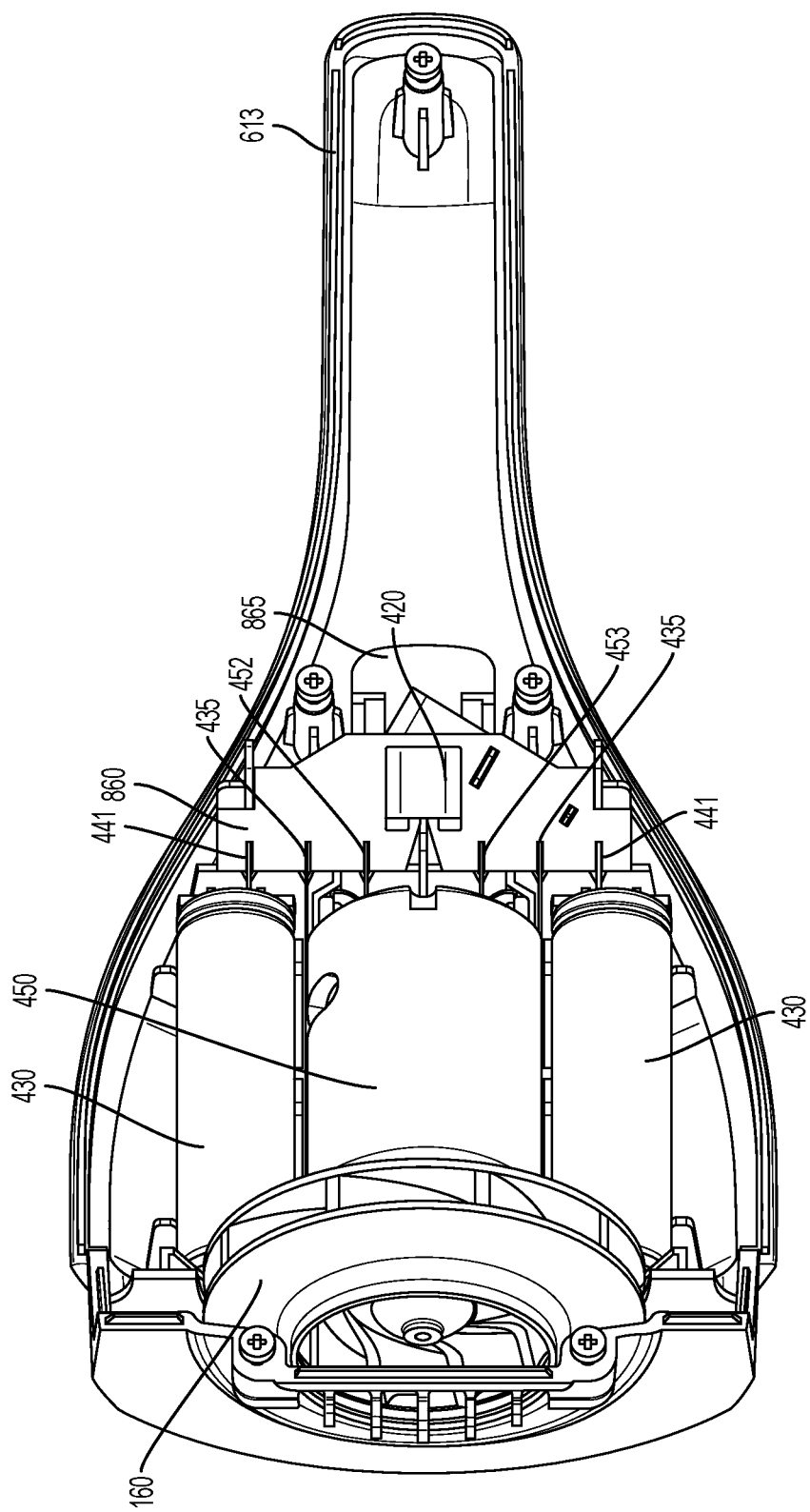
FIG. 51 is a rotated top view normal to the printed circuit board, of a portion of the exemplary embodiment of the hand-held vacuum cleaner with a housing shell section removed.

FIG. 50 is a top view of the housing shell 611 in the position of FIGS. 46 and 48. FIG. 51 is a top view of the housing shell 611 in the position of FIG. 47. A canister 901, as shown in FIG. 23, can then be added to complete the hand-held vacuum cleaner. The canister 901 is added adjacent the fan 160 and suction of air and debris is performed in the manner described above.

As is understood, the various conductive metal connectors described above are fixed. They are also rigid such that they do not move a significant amount under the normal forces of gravity, but stay in place. This is in contrast to, for example, the wires 170 discussed above which lack such rigidity. Accordingly, for example, when the battery assemblies 470 are assembled into the first housing shell 611, the connectors of the battery assembly 470 are sufficiently rigid that they can contact the circuit board at a particular location and can be soldered in place. In other embodiments, tulip or other connectors may be used instead of soldering.

As with the other embodiments, the general structure and method described above with respect to the hand vac 607 shown in FIGS. 32-51 may be applied to other home products or tools. For example, a similar structure and method may be employed to construct a drill or a screwdriver. In the event of constructing a drill or screwdriver, the fan may be omitted or a fan operable to cool operation of the tool may be used. Additionally, a transmission may be pressed onto the output shaft of the motor. As will be appreciated, in the case of a drill a chuck and other traditional drill components are added to the drill, such as the drill components shown in U.S. Pat. No. 7,497,275, which is incorporated herein, by reference. In the case of a screwdriver, a hex bit holder is added. In either event, a chuck may also be present. Similarly, a hand-held trimmer or other outdoor power tool may be constructed according to the above structure and method. The hand-held trimmer would include traditional trimmer components, such as those shown in U.S. Pat. No. 3,757,194 and U.S. Design Pat. No. 548,028. U.S. Pat. No. 3,757,194 and U.S. Design Pat. No. 548,028 are both incorporated herein, by reference, in their entireties.

Figure 52:
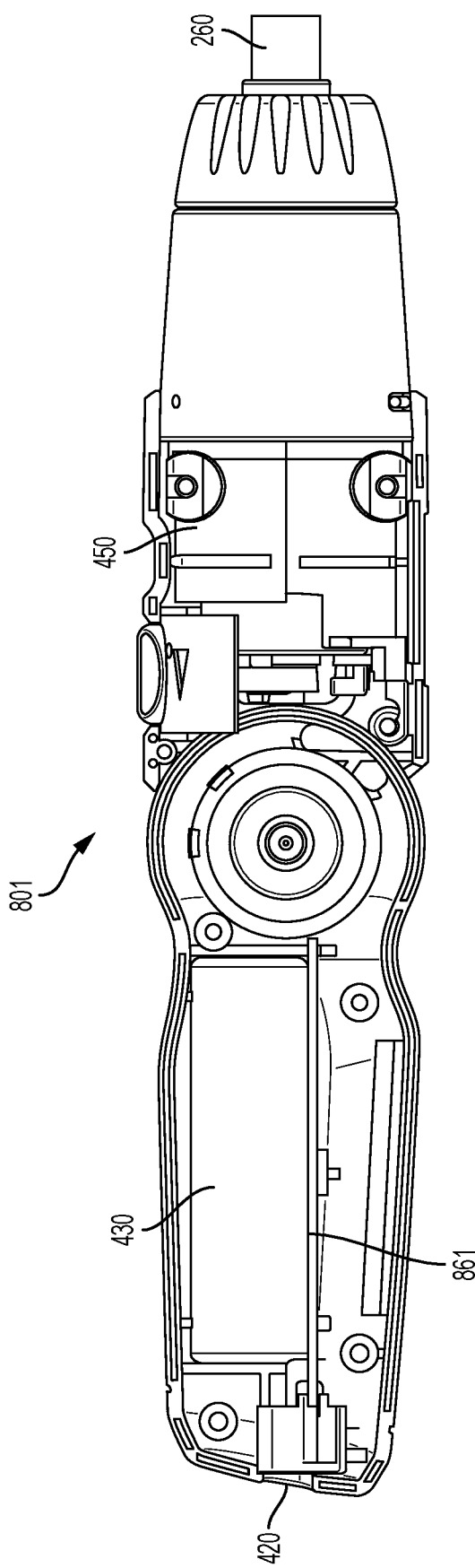
FIG. 52 is a side view of an exemplary embodiment of a screwdriver with housing parts removed.
Figure 53:
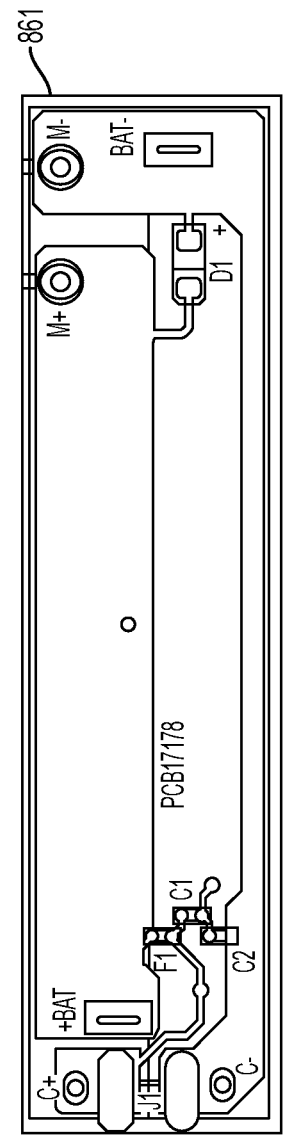
FIG. 53 is a top view of a circuit board.
Figure 55:
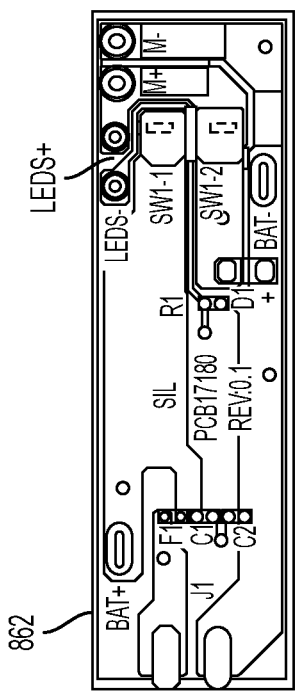
FIG. 55 is a top view of a circuit board.
Figure 56:
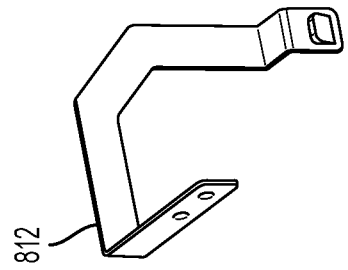
FIG. 56 is a perspective view of a connector.

Various embodiments of screwdrivers and their components are shown in FIGS. 52-62. FIG. 52 illustrates a screwdriver 801. The screwdriver 801 includes a motor 450 powered by a battery 430, the motor driving an output spindle 260. The output spindle 260 is configured to hold a hexagonal bit, such as a screwdriver or drill bit. A circuit board 861 is adjacent to the battery 430 and is directly connected to socket 420 (i.e., no connecting wires). Accordingly, power is provided directly to the circuit board 461 through the socket 420.

Figure 54:
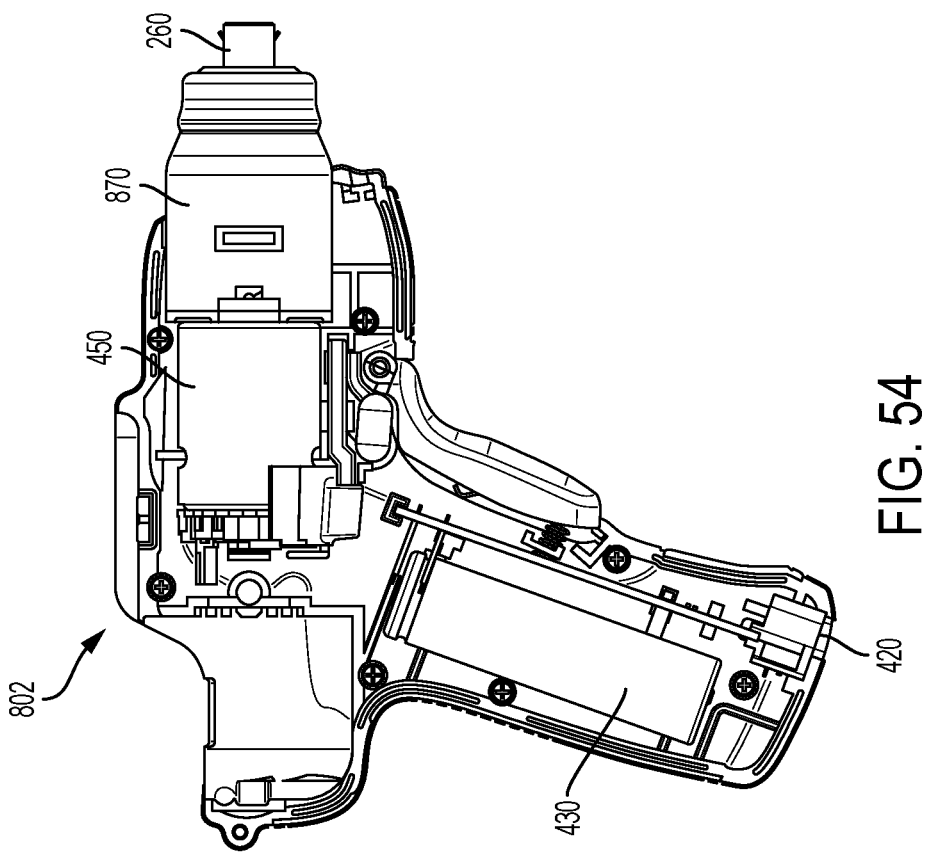
FIG. 54 is a side view of another exemplary embodiment of a screwdriver with housing parts removed.
Figure 62:
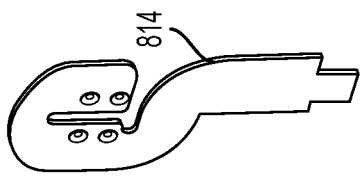
FIG. 62 is a perspective view of a connector.

FIG. 54 illustrates another screwdriver 802. The screwdriver 802 includes motor 450 powered by battery 430, and output spindle 260 driven by the motor 450. A transmission 870 is disposed between the motor 450 and the output spindle 260. A circuit board 862 is adjacent to the battery 430 and is directly connected to socket 420 so that power is provided directly to the circuit board 862 through the socket 420. The circuit board 862 is connected to the battery 430 by one or more connectors, such as connector 812, shown in FIG. 56. The connector 812 provides an electrical connection between the circuit board 862 and the battery 430. The connector 812 is conductive and may be made of metal. Connections are provided between the circuit board 862 and positive and negative terminals of the battery 430. Though not shown, similar connectors may be used to provide an electrical connection in the embodiment of FIG. 52.

FIG. 57 illustrates another screwdriver 803. The screwdriver 803 includes motor 450 powered by battery 430, and output spindle 260 driven by the motor 450. A transmission 870 is disposed between the motor 450 and the output spindle 260. The screwdriver 803 also includes a light 855. The light 855 is actuated by virtue of a switch 856. The light 855 and switch 856 can be connected to the circuit board 863, and thus power from the battery 430, by conventional means such as wires 170. Alternatively, or in combination, one or both of the light 855 and switch 856 may be connected to the circuit board 863 directly through a circuit board or by other structures, as taught by this specification.

The circuit board 863 is adjacent to the battery 430 and is directly connected to socket 420 so that power is provided directly to the circuit board 863 through the socket 420. The circuit board 863 is connected to the battery 430 by one or more connectors, such as connector 813, shown in FIG. 59. The connector 813 provides an electrical connection between the circuit board 863 and the battery 430. As with previous connectors, the connector 813 is conductive and may be made of metal. Connections are provided between the circuit board 863 and positive and negative terminals of the battery 430.

Figure 60:
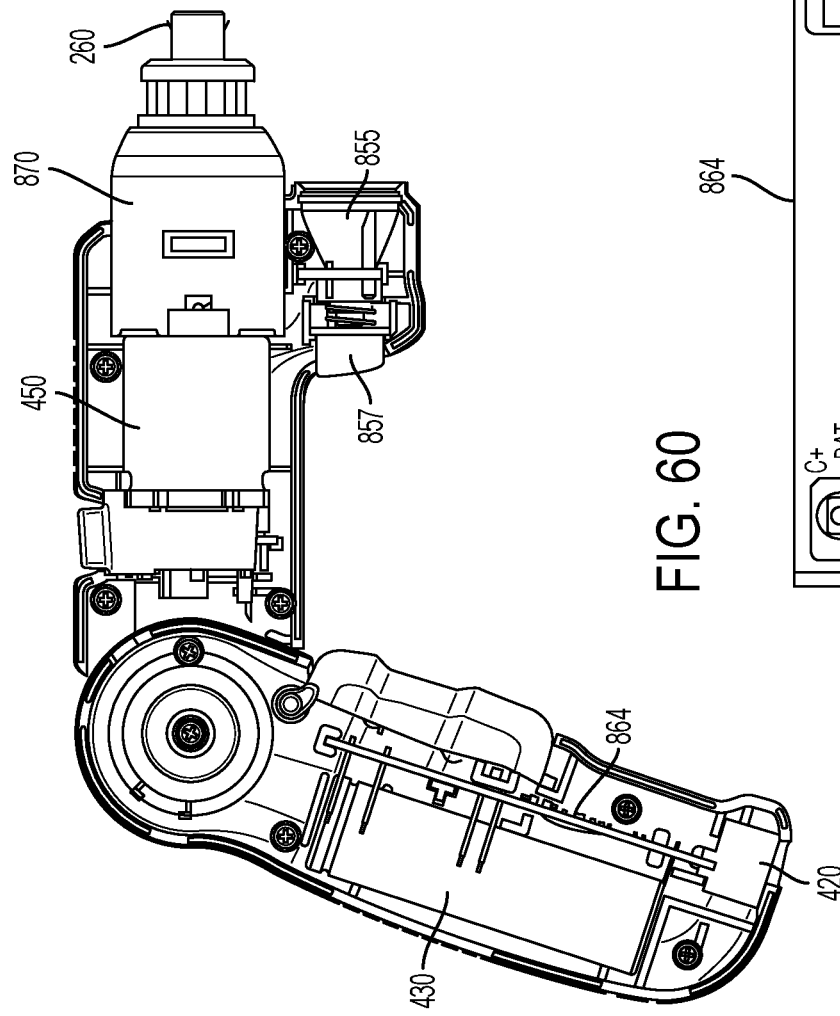
FIG. 60 is a side view of another exemplary embodiment of a screwdriver with housing parts removed.
Figure 61:
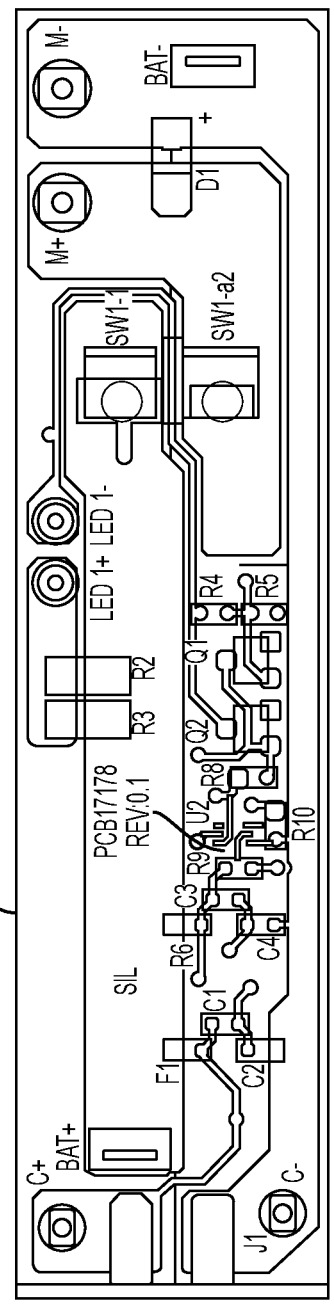
FIG. 61 is a top view of a circuit board.

FIG. 60 illustrates another screwdriver 804. The screwdriver 804 likewise includes motor 450 powered by battery 430, and output spindle 260 driven by the motor 450. A transmission 870 is disposed between the motor 450 and the output spindle 260. The screwdriver 804 also includes a light 855. The light 855 is activated via switch 857. The light 855 and switch 857 can be connected to the circuit board 864, and thus power from the battery 430, by conventional means such as wires 170. Alternatively, or in combination, one or both of the light 855 and switch 857 may be connected to the circuit board 864 directly through a circuit board or by other structures, as taught by this specification.

The circuit board 864 is adjacent to the battery 430 and is directly connected to socket 420 so that power is provided directly to the circuit board 864 through the socket 420. The circuit board 864 is connected to the battery 430 by one or more connectors, such as connector 814, shown in FIG. 59. The connector 814 provides an electrical connection between the circuit board 864 and the battery 430. As with previous connectors, the connector 814 is conductive and may be made of metal. Connections are provided between the circuit board 864 and positive and negative terminals of the battery 430.

Figure 64:
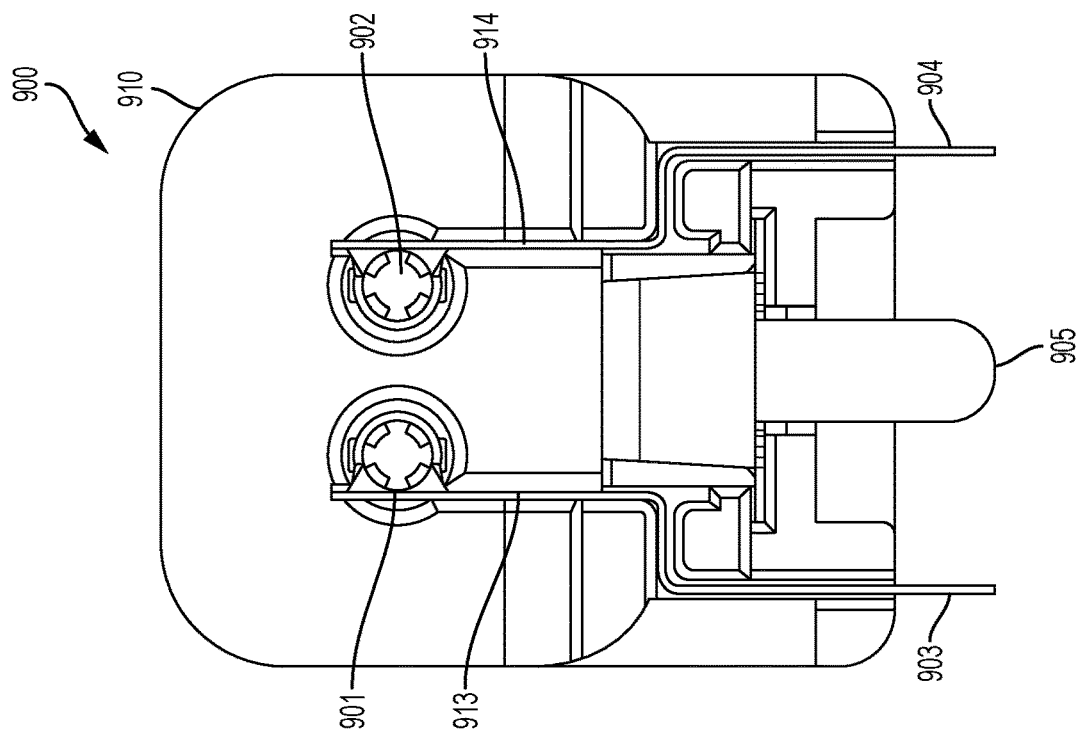
FIG. 64 is a rear view of the related art socket structure.
Figure 63:
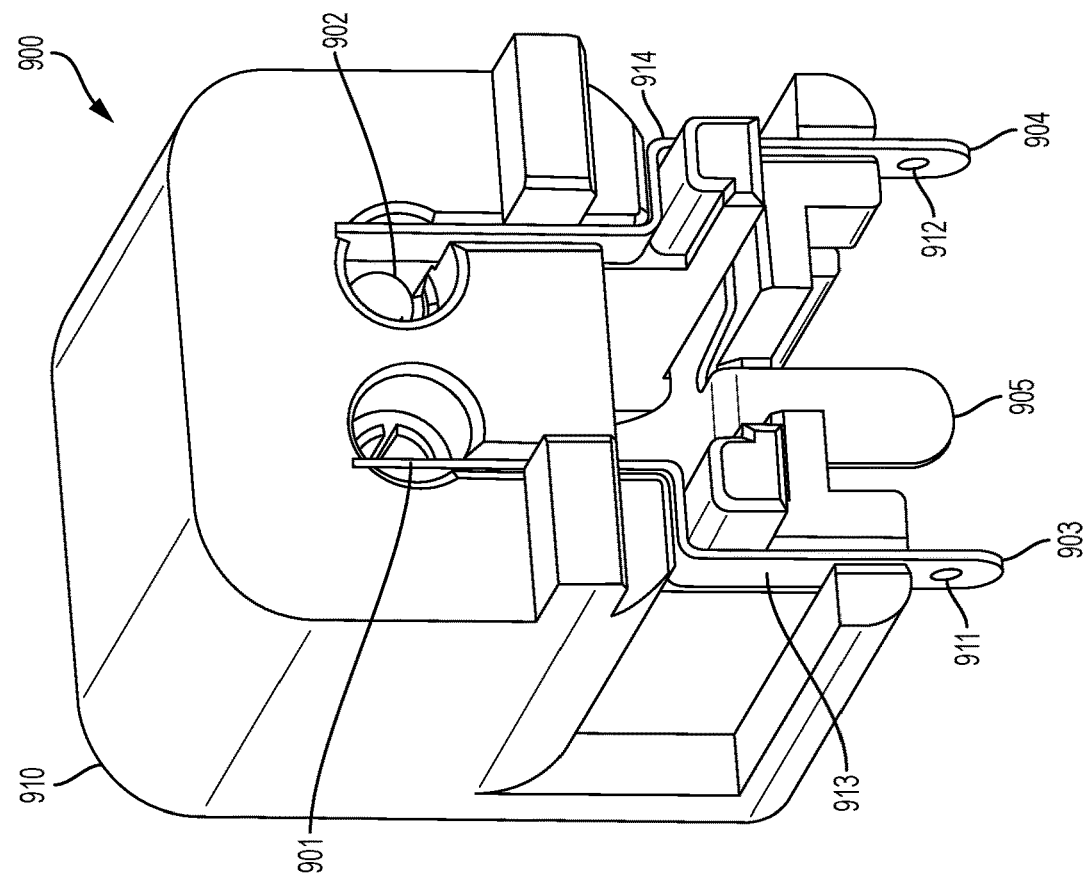
FIG. 63 is a rear perspective view of a related art socket structure.
Figure 66:
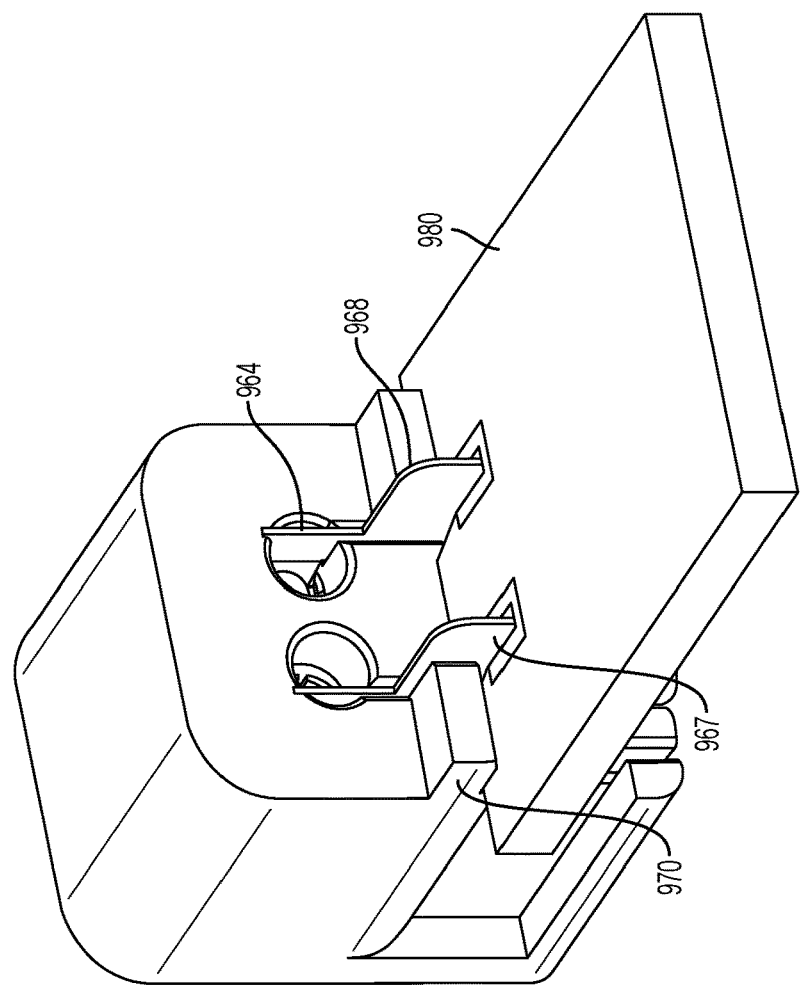
FIG. 66 is a rear perspective view of the exemplary embodiment of the socket structure with a printed circuit board connected thereto.
Figure 65:
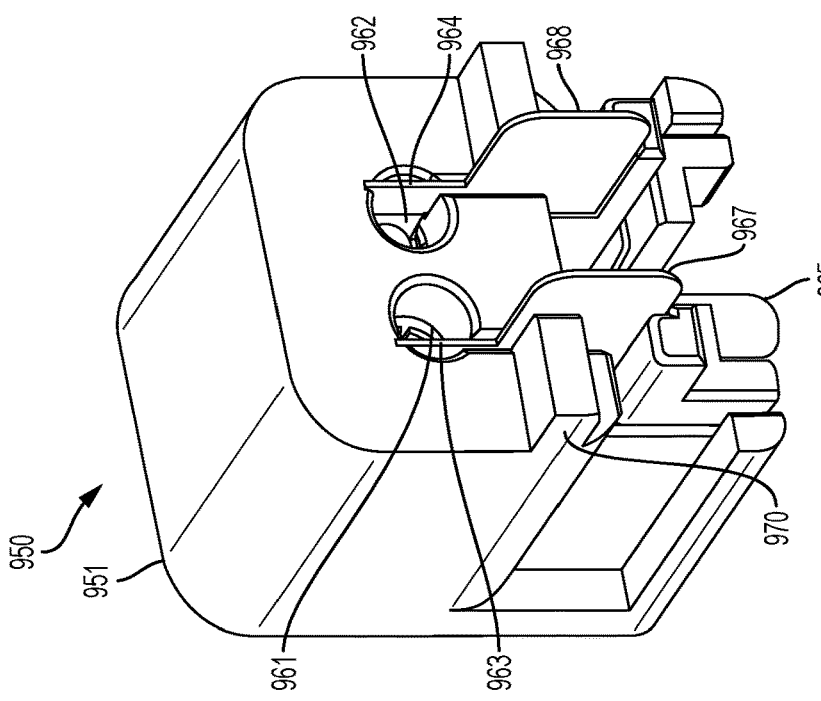
FIG. 65 is a rear perspective of an exemplary embodiment of a socket structure.
Figure 68:
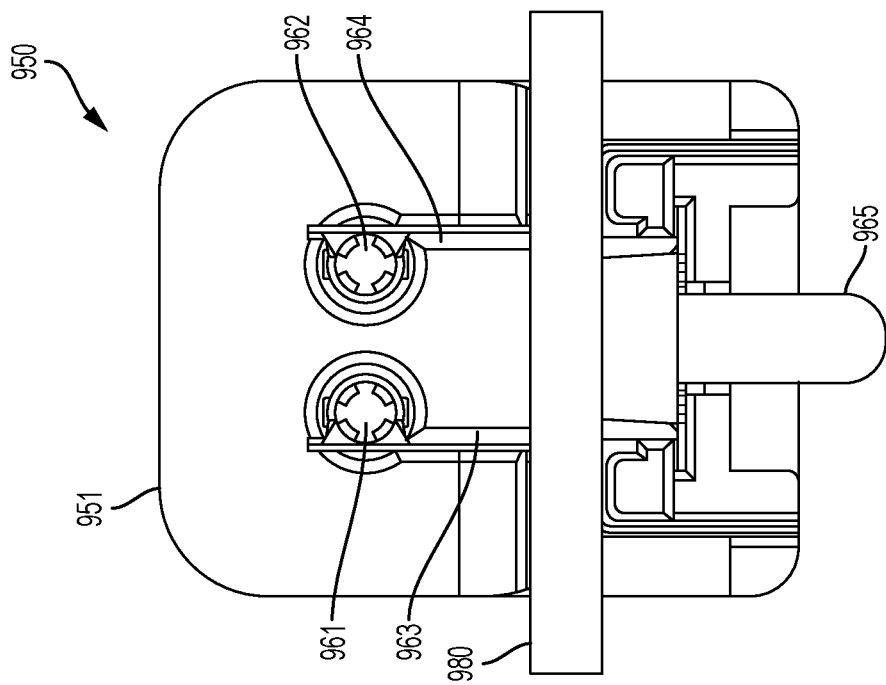
FIG. 68 is a rear view of the exemplary embodiment of the socket structure with a printed circuit board connected thereto.
Figure 67:
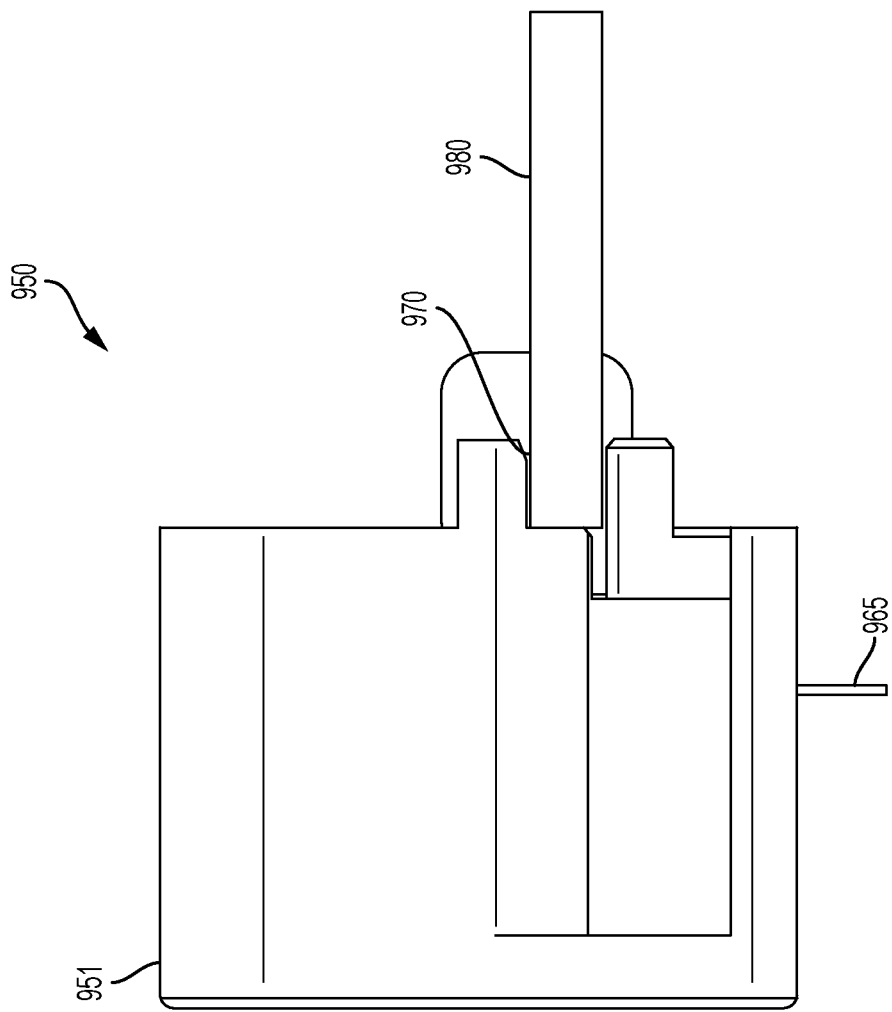
FIG. 67 is a side view of the exemplary embodiment of the socket structure with a printed circuit board connected thereto.

FIGS. 63-68 illustrate a structure for providing power into the tools discussed in the specification, such as the hand vacs and screwdrivers. FIGS. 63 and 64 illustrate a structure using wires. FIGS. 65-68 illustrate a method of direct connection to a circuit board.

FIGS. 63 and 64 illustrate a socket structure 900 for providing power into a tool. This socket structure 900 may be used for the socket 420, shown in the various illustrations if wires are being used. The socket structure 900 includes a housing 910. Power is provided into the socket through terminals 901 and 902. Terminal 901 may be a positive terminal and terminal 902 may be a negative terminal. The terminals may also be reversed. As shown, the terminal 901 is connected to a metal conductor 913 with an end 903. The end 903 has a hole 911. The end 903 and hole 911 are configured such that a wire can be connected and the wire is electrically connected to the positive terminal 901. The terminal 902 is connected to a metal conductor 914 with an end 904. The end 904 has a hole 912. The end 904 and hole 912 are configured such that a wire can be connected and the wire is electrically connected to the negative terminal 902. The socket structure 900 also includes a metal ground tab 905.

FIGS. 65-68 illustrate a socket structure 950 for providing power to the hand vacs or screwdrivers. The socket structure 950 is configured for direct connection to a circuit board. It may be used for the socket 420 and provides for direct connection to a circuit board. For example, the socket structure 950 may be used in the embodiment of FIG. 52 so that the circuit board 861 is plugged directly into the socket.

The socket structure 950 includes a housing 951. Power is provided into the socket through terminals 961 and 962. Terminal 961 may be a positive terminal and terminal 962 may be a negative terminal. The terminals may also have the reverse locations. As shown, the terminal 961 is connected to a metal conductor 963 with a projection 967. The projection is configured to engage with the circuit board 980. The projection 967 may be soldered to the circuit board 980 or electrical connection may be made by simple contact or other means.

Terminal 962 is connected to a metal conductor 964 with a projection 968. The projection is configured to engage with the circuit board 980. The projection 968 may be soldered to the circuit board 980 or electrical connection may be made by simple contact or other means. The socket structure 950 also includes a metal ground tab 965.

As shown in FIGS. 65-68, the socket structure 950, particularly the housing 951, includes a slot 970 for receiving the circuit board 980. Accordingly, the circuit board 980 may be slid into an appropriate position so that it can engage the projections 967 and 968.

In this manner, power is provided directly from the socket 950 to the circuit board 980. As noted above, the socket 950 may be used as the socket 420 in the various embodiments shown in this disclosure. Additionally, the circuit boards shown as plugging into the sockets may be used. For example, the circuit board 861 shown in FIGS. 52 and 52 may be used in the position of circuit board 980. Also, this socket and circuit board arrangement may be used for the various products shown in the various embodiments to provide power directly from the socket to the circuit board and, therefore, the product.

Figure 70:
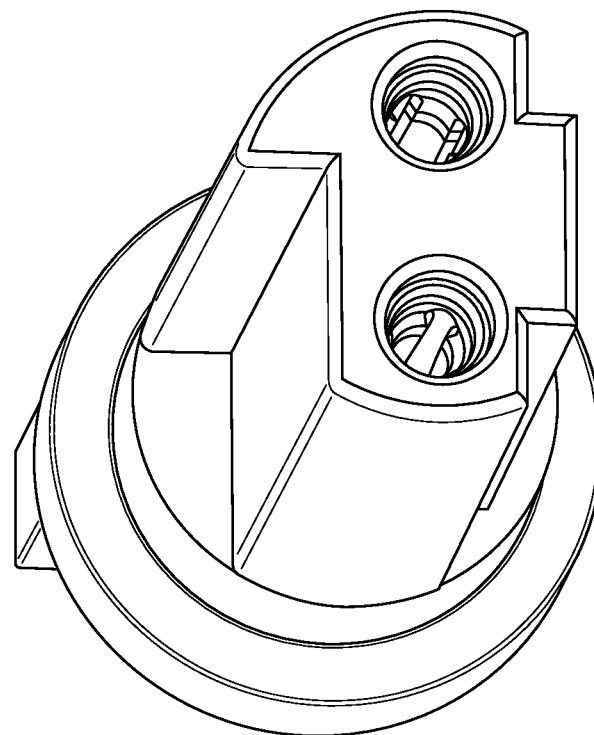
FIG. 70 is a perspective view of a related art socket structure.
Figure 69:
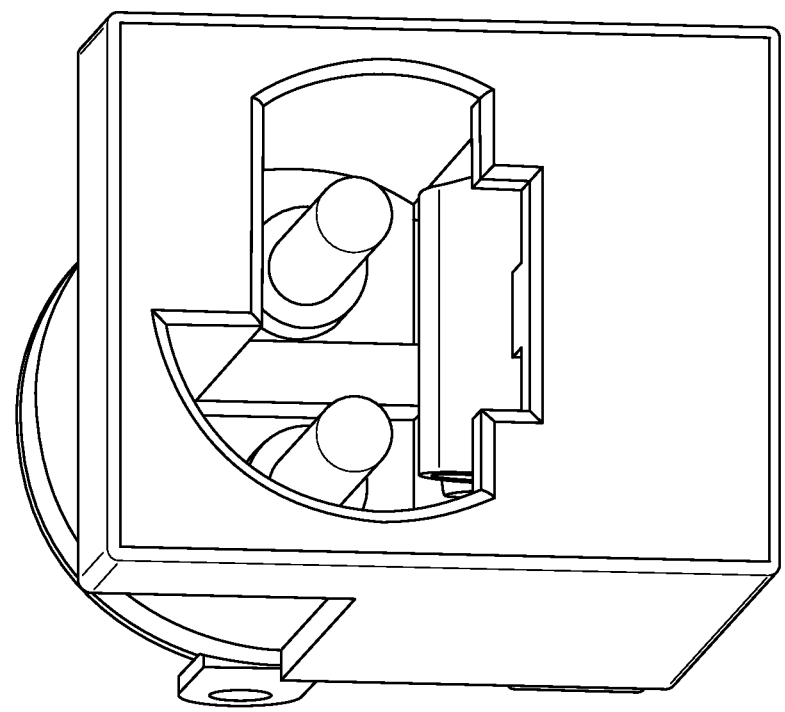
FIG. 69 is a perspective view of a related art socket structure.

FIGS. 69 and 70 illustrate a prior art plug configuration.

Figure 72:
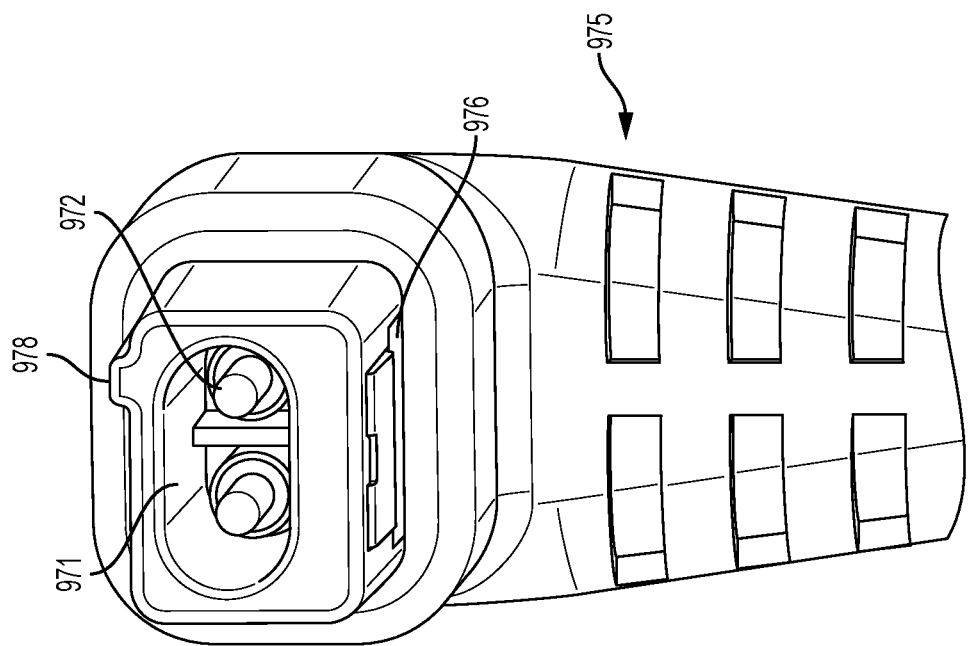
FIG. 72 is a perspective view of an exemplary embodiment of a charger plug.
Figure 71:
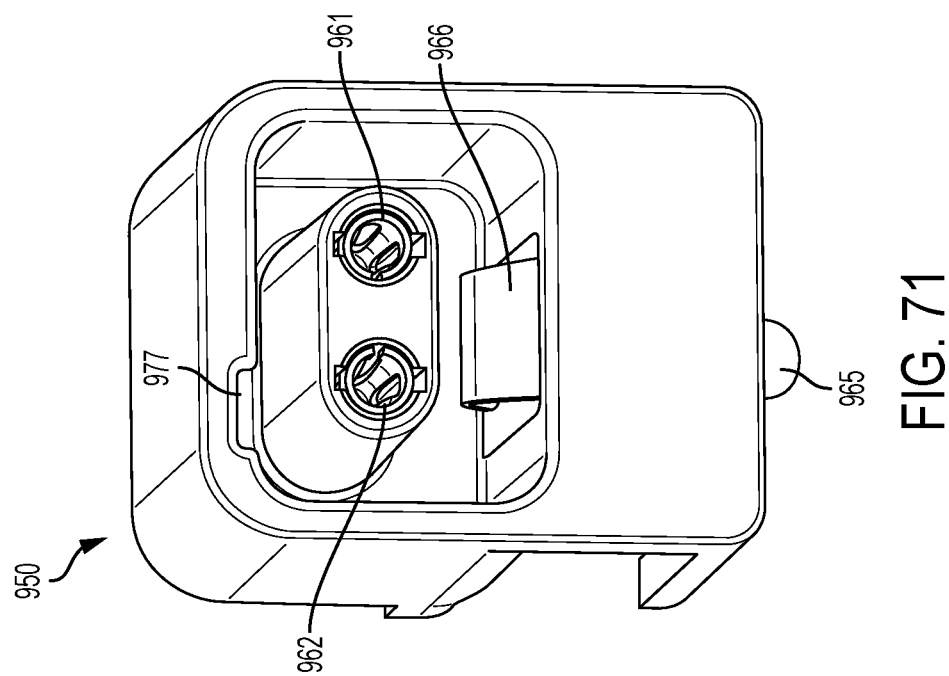
FIG. 71 is a front perspective of the exemplary embodiment of the socket structure.

FIGS. 71 and 72 illustrate an embodiment of a new plug configuration. FIG. 71 is a perspective view of the side of the socket structure 950 opposite that shown in FIGS. 63 and 64. The side shown in FIG. 71 is a charger receiving side, as it receives recessed pins 971 and 972 from the charger plug 975 shown in FIG. 72.

FIG. 72 illustrates a charger plug 975. The charger plug 975 provides power into the socket 950 it may receive power from a traditional wall power outlet, such as a 120V AC outlet (conventional, not shown). The charger plug includes two pins 971 and 972. The pin 971 engages terminal 961 and pin 972 engages terminal 962. Pin 971 is a positive pin and pin 972 is a negative pin, though these could be reversed if the terminals are reversed. Additionally, the charger plug 975 includes a ground connection 976 which engages a ground connection 966 on the socket 950, which is connected to the ground tab 965. As shown, the plug 975 and the socket 950 have corresponding lockout features 977 and 978. In this way, power is provided to the socket 950. The socket 900 of FIGS. 63 and 64 may have a similar configuration on a charger receiving side so that the socket 900 may similarly receive charger plug 975.

It will be appreciated that features of the various embodiments may be combined where compatible, and such combinations of various features is contemplated by this disclosure.

While the invention has been described by way of exemplary embodiments, it is understood that the words which have been used herein are words of description, rather than words of limitation. Changes may be made within the purview of the appended claims, without departing from the scope and spirit of the invention in its broader aspects.

What is claimed is:

1. A hand-held tool, comprising:
a housing, the housing including a handle;
a motor assembly including a motor;
a first battery assembly;
a circuit board; and
a actuator configured to selectively turn on the motor;
wherein the first battery assembly comprises a first battery cell with a first battery cell positive terminal and a first battery cell negative terminal;
wherein the first battery assembly further comprises a first rigid conductive electrical connector having a first end fixed to the first battery cell positive terminal and a second end fixed to the circuit board and a second rigid conductive electrical connector having a first end fixed to the first battery cell negative terminal and a second end fixed to the circuit board.

2. The hand-held tool of claim 1, wherein the first battery cell comprises a longitudinal axis which is disposed at an angle with respect to the circuit board, the angle being between 10 degrees and 90 degrees.

3. The hand-held tool of claim 1, wherein at least one of the first rigid conductive electrical connector and the second rigid conductive electrical connector runs parallel to a longitudinal axis of the first battery cell.

4. The hand-held tool of claim 1, wherein the first rigid conductive electrical connector and the second rigid conductive electrical connector are a stamped metal connectors.

5. The hand-held tool of claim 1, wherein the first rigid conductive electrical connector is soldered to the circuit board; and
wherein the second rigid conductive electrical connector is soldered to the circuit board.

6. The hand-held tool of claim 1, wherein the first rigid conductive electrical connector is fixed to the circuit board by a tulip connector; and
wherein the second rigid conductive electrical connector is fixed to the circuit board by a tulip connector.

7. The hand-held tool of claim 1, wherein the hand-held tool comprises a hand-held vacuum cleaner.

8. The hand-held tool of claim 1, wherein the hand-held tool comprises a power tool configured to hold and drive a bit.

9. The hand-held tool of claim 1, further comprising a second battery assembly comprising a second battery cell.

10. The hand-held tool of claim 9, wherein the second battery assembly further comprises a second battery cell positive terminal and a second battery cell negative terminal.

11. The hand-held tool of claim 10, wherein the second battery assembly further comprises a third rigid conductive electrical connector having a first end fixed to the second battery cell positive terminal and a second end fixed to the circuit board and a fourth rigid conductive electrical connector having a first end fixed to the second battery cell negative terminal and a second end fixed to the circuit board.

12. The hand-held tool of claim 9, wherein the motor has a longitudinal axis and the first battery cell is disposed parallel to the longitudinal axis of the motor.

13. The hand-held tool of claim 9, wherein the second battery cell is disposed parallel to a longitudinal axis of the motor.

14. The hand-held tool of claim 9, wherein the motor comprises a rotatable motor output shaft; and
   wherein the motor is connected to the circuit board by motor rigid conductive electrical connectors.

15. The hand-held tool of claim 1, wherein the first battery cell is adjacent to the motor.

16. The hand-held tool of claim 9, wherein the first battery cell is disposed on a first side of the motor; and
   wherein the second battery cell is disposed on a second side of the motor opposite the first side of the motor.

17. The hand-held tool of claim 1, wherein the first battery cell is configured to be charged by a battery charger that includes a primary cell monitor.

18. The hand-held tool of claim 17, wherein the first battery cell is configured to be charged by a battery charger that includes a secondary cell monitor.

19. The hand-held tool of claim 17, wherein the first battery cell is configured to be charged by a battery charger that includes an independent charge shut-off.

* * * * *